(12) United States Patent
Holcomb

(10) Patent No.: US 11,336,134 B2
(45) Date of Patent: May 17, 2022

(54) SOLID STATE MULTI-POLE AND UNI-POLE ELECTRIC GENERATOR ROTOR FOR AC/DC ELECTRIC GENERATORS

(71) Applicant: HOLCOMB SCIENTIFIC RESEARCH LIMITED, Dublin (IE)

(72) Inventor: Robert Ray Holcomb, Sarasota, FL (US)

(73) Assignee: HOLCOMB SCIENTIFIC RESEARCH LIMITED, Dublin (IE)

( * ) Notice: Subject to any disclaimer, the term of this patent is extended or adjusted under 35 U.S.C. 154(b) by 226 days.

(21) Appl. No.: 16/339,601

(22) PCT Filed: Nov. 17, 2017

(86) PCT No.: PCT/EP2017/079687
§ 371 (c)(1),
(2) Date: Apr. 4, 2019

(87) PCT Pub. No.: WO2018/065635
PCT Pub. Date: Apr. 12, 2018

(65) Prior Publication Data
US 2019/0238011 A1 Aug. 1, 2019

Related U.S. Application Data

(60) Provisional application No. 62/496,057, filed on Oct. 4, 2016.

(51) Int. Cl.
*H02K 1/24* (2006.01)
*H02K 1/14* (2006.01)
(Continued)

(52) U.S. Cl.
CPC ............... *H02K 1/24* (2013.01); *H02K 1/14* (2013.01); *H02K 19/10* (2013.01); *H02K 1/246* (2013.01);
(Continued)

(58) Field of Classification Search
CPC .... H02K 1/14; H02K 1/24; H02K 1/246; H02K 1/26; H02K 1/265; H02K 3/00;
(Continued)

(56) References Cited

U.S. PATENT DOCUMENTS 2,368,295 A 1/1945 Goran
5,183,222 A 2/1993 Ramsey
(Continued)

FOREIGN PATENT DOCUMENTS

EP 0866540 A2 9/1998
EP 2456054 A2 5/2012
(Continued)

OTHER PUBLICATIONS

Gomez et al., English Machine Translation of ES1070165U (Year: 2009).*
(Continued)

*Primary Examiner* — Rashad H Johnson

(57) ABSTRACT

A solid-state electromagnetic rotor, including a plurality of salient pole pieces arranged around a supporting structure, wherein a first end of each salient pole piece is attached to the support structure and a second end of each salient pole piece points outward away from the supporting structure. The wires wound around each salient pole piece, wherein when the wires of the plurality of salient pole pieces are sequentially excited by an excitation circuit. The salient pole pieces are energized to provide a moving polar magnetic field in the form of distinct magnetic poles as desired to accomplish power generation.

20 Claims, 55 Drawing Sheets

(51) Int. Cl.
*H02K 19/10* (2006.01)
*H02K 19/12* (2006.01)
*H02K 19/32* (2006.01)
*H02K 3/28* (2006.01)
*H02K 11/20* (2016.01)
*H02K 17/06* (2006.01)
*H02K 17/14* (2006.01)
*H02K 99/00* (2014.01)
*H02K 3/12* (2006.01)
*H02K 11/33* (2016.01)
*H02K 11/28* (2016.01)
*H02K 3/00* (2006.01)
*H02K 11/30* (2016.01)
*H02K 1/26* (2006.01)

(52) U.S. Cl.
CPC ............... *H02K 1/26* (2013.01); *H02K 1/265* (2013.01); *H02K 3/00* (2013.01); *H02K 3/12* (2013.01); *H02K 3/28* (2013.01); *H02K 11/20* (2016.01); *H02K 11/28* (2016.01); *H02K 11/30* (2016.01); *H02K 11/33* (2016.01); *H02K 17/06* (2013.01); *H02K 17/14* (2013.01); *H02K 19/12* (2013.01); *H02K 19/32* (2013.01); *H02K 99/00* (2016.11); *H02K 99/10* (2016.11); *H02K 99/20* (2016.11)

(58) Field of Classification Search
CPC . H02K 3/12; H02K 3/18; H02K 11/00; H02K 11/20; H02K 11/28; H02K 11/30; H02K 11/33; H02K 17/06; H02K 17/14; H02K 19/10; H02K 19/12; H02K 19/32; H02K 99/00; H02K 99/10; H02K 99/20
USPC ........... 310/46, 71, 154.33, 154.35, 216.001, 310/216.003, 208
See application file for complete search history.

(56) References Cited

U.S. PATENT DOCUMENTS

| | | | |
|---|---|---|---|
| 5,239,217 A | 8/1993 | Horst | |
| 2006/0131975 A1 | 6/2006 | Lee | |
| 2006/0186750 A1 | 8/2006 | Hosoe | |
| 2007/0182381 A1* | 8/2007 | Kamimura | H02P 9/48 322/28 |
| 2010/0327789 A1* | 12/2010 | De Belie | H02P 21/18 318/400.33 |
| 2012/0206003 A1 | 8/2012 | Holcomb | |
| 2013/0002077 A1 | 1/2013 | Conde | |
| 2016/0049838 A1 | 2/2016 | Dajaku | |
| 2016/0336891 A1* | 11/2016 | Seguchi | H02K 19/28 |
| 2017/0133916 A1* | 5/2017 | Mizutani | F03D 9/25 |

FOREIGN PATENT DOCUMENTS

| | | |
|---|---|---|
| ES | 1070165 U | 6/2009 |
| GB | 796998 A | 6/1958 |
| WO | WO 2013/171728 A2 | 11/2013 |
| WO | WO 2015/106891 A2 | 7/2015 |

OTHER PUBLICATIONS

International Search Report for International Application No. PCT/EP2017/079687, dated Feb. 13, 2018 (6 pages).
Written Opinion of the International Searching Authority for International Application No. PCT/EP2017/079687, dated Feb. 13, 2018 (6 pages).
International Search Report for International Application No. PCT/EP2017/084100, dated Apr. 10, 2018 (4 pages).
Written Opinion of the International Searching Authority for International Application No. PCT/EP2017/084100 dated Apr. 10, 2018 (10 pages).
International Search Report for International Application No. PCT/EP2018/051081, dated May 9, 2018 (3 pages).
Written Opinion of the International Searching Authority for International Application No. PCT/EP2018/051081, dated May 9, 2018 (6 pages).
International Search Report for International Application No. PCT/EP2018/053533 dated May 25, 2018 (5 pages).
Written Opinion of the International Searching Authority for International Application No. PCT/EP2018/053533 dated May 25, 2018 (21 pages).
International Search Report for International Application No. PCT/EP2018/053894 dated Jun. 4, 2018 (4 pages).
Written Opinion of the International Searching Authority for International Application No. PCT/EP2018/053894 dated Jun. 4, 2018 (14 pages).

* cited by examiner

SOLID STATE MULTI-POLE AND UNI-POLE ELECTRIC GENERATOR ROTOR FOR AC/DC ELECTRIC GENERATORS

This application is a U.S. national stage entry under 35 U.S.C. § 371 of International Application No. PCT/EP2017/079687 filed Nov. 17, 2017, which claims the benefit of priority from U.S. Provisional Application No. 62/496,057, filed Oct. 4, 2016, the contents of both of which are herein incorporated by reference in their entireties.

FIELD OF INVENTION

Systems and methods for generation of alternating current (AC) or direct current (DC) with reduced electromagnetic drag, commonly referred to as reverse torque, thereby improving the operating efficiency of a generator.

BACKGROUND

Rapid depletion of the Earth's fossil fuel sources along with environmental pollution of land, air, and water with simultaneous climate change makes obvious the clear and urgent need for alternative energy supplies which are efficient, requiring no fossil fuels and are non-polluting.

A significant contribution to safely resolving the Earth's population's demand for increasing energy consumption is to increase the efficiency of electrical power generation by removing reverse torque from a rotary electric power generator. Removal of reverse torque from rotary generators associated with converting mechanical energy into electrical power can provide an opportunity for an electrically powered, highly efficient power generation plant. Removal of the reverse torque allows an AC or DC generator to operate with a 4% to potentially 500% increase in efficiency, thereby driving the generator of a power generation plant with a smaller electric motor.

The World's first known electrical generator was Faraday's disk dynamo. Michael Faraday discovered the operating principle of electromagnetic generators in the years 1831-1889. His observations were later reduced into a principle called Faraday's Law written by James Clerk Maxwell. The Law simply states that an electromagnetic force is generated in an electrical conductor that encircles a varying magnetic flux. Faraday built the first magnetic rotary induction generator called a Faraday Disc. This first machine was a type of homo-polar generator, using a copper disc rotating between the poles of a horseshoe magnet. This generator produced a small DC voltage, but high amperage. The Faraday dynamo or uni-pole (or uni-polar) generator, however, did not lend itself well to practical commercial development because of the nature of its output, i.e., very low DC voltage at extremely high current. The Faraday generator does lend itself well, however, to the study of the mechanisms of reverse torque in electrical induction machines.

Conventional generators in use today require by common definition, 1 horsepower (HP) of kinetic energy input to generate 746 watts (W) of electrical energy. This relationship of mechanical horsepower to electrical watts involves derived units of power which have evolved from observations and measurements on physical and electrical machines (as well as horses).

The term "watt" was named after James Watt, a Scottish scientist, for his work on improving the steam engine and quantifying the power of the steam engine. The unit "watt" was recognized by the Second Congress of the British Association for the Advancement of Science in 1882, concurrent with the start of commercial power production. The dynamo was the first electrical generator capable of delivering power to industry and is still an important generator in use even to this day. The dynamo uses a particular machine design and electromagnetic principles to convert mechanical rotation of magnetic poles into an alternating electric current. The first commercial power plants, which were operated in Paris in the 1870's, were designed by Zenobe Gramme. The use of electric generators made it desirable to establish a common unit for electrical power in order to standardize this newly evolving energy source. The watt is a derived unit of power (i.e., an algebraic combination of base units). The watt is now an approved unit of the International System of Units (SI).

As defined, 1 watt is the rate at which work is done when an object's velocity is held constant at 1 meter per second against a constant opposing force of 1 Newton.

$$W=J/S=N\cdot M/S=Kg\cdot M^2/S^3$$

J=Joule M=Meter N=Newton Kg=Kilogram

Joule=Work done when a force of 1 Newton is displaced through a distance of 1 Meter 1 Joule=1 watt-second, $10^7$ ergs=0.2390 calories or 0.738 foot-pound (ft-lb).

Therefore, if one mechanical horsepower is equal to 550 ft-lb per second (or 33,000 ft-lb per minute), then by definition of the watt being 0.738 ft-lb per second, 1 HP=550 ft-lb per second/0.738 ft-lb per second=745.257 W, and by definition, the electrical watt is the rate at which work is done when 1 ampere (A) of current flows through an electric potential difference of 1 volt (V):

$$W=V\times A$$

745.257 watts=27.299 V×27.299 A or any combination of amps and volts in which the product is equal to 745.257 watts. Therefore, by definition and derivation, 1 HP=746 watts.

The original work on which these units hinge was performed by James Watt who introduced the term "horsepower" when he wanted to explain how powerful his steam engines were compared to horses. After some tests (not with engines, rather with horses), he established that, on average, the horses being used could pull coal up a mine shaft at the rate of 22,000 ft-lb per minute. For whatever reason, he decided to raise this number by 50% and arrived at a number which is commonly accepted as 33,000 ft-lb per minute. So, if an engine or any rotary machine can push 33,000 lbs. of something 1 foot in 1 minute, the machine is considered a 1 HP engine.

As noted above, a conventional generator requires, by definition, 1 HP to generate 746 watts plus enough additional horsepower to turn the physical mechanisms of the rotor at proper speed to maintain the desired frequency. The horsepower required to spin the mechanism is usually about 0.2 HP in a conventional generator to generate 746 watts for a total 1.2 HP needed to generate the 746 watts, although only 0.2 HP of that energy is used to actually generate the electrical power. The remaining 1 HP, which is equal to 746 watts, is required to overcome the reverse torque or so-called "back electromotive force" (back EMF).

The back EMF or reverse torque of rotary generators in use today can best be described by reference to "Lenz's Law." It, in summary, states that when an EMF is generated by a change in magnetic flux, according to Faraday's Law, the polarity of the induced EMF is such that it produces a current whose magnetic field opposes the magnetic flux which produces it. The induced magnetic field inside any loop of wire acts to keep the magnetic flux in the loop constant. If the magnetic field B is increasing, the induced magnetic field acts in equal and opposite direction to it; if it is decreasing, the induced magnetic field acts in the direction of the applied field with equal force. In conventional generators, the rotor is stationed inside the coil loops of the stator and rotates to generate a current in the stator which in turn generates a magnetic field which is equal in force and opposite in polarity to magnetic field B. Thus, reverse torque is a product of the design or design flaw of conventional generators.

In the case of the generator of the present disclosure, the rotors do not rotate. Instead, the magnetic poles rotate and, thus, there is no reverse torque or pole to pole magnetic drag between the rotor and the stator. This induced pole in the stator iron is induced by current flow and is not responsible for a current flow, as is evidenced by the fact that the generator can reach full voltage prior to current going to an electrical load.

Due to the reverse torque, about 85% more mechanical energy is required to turn the rotor than is required to generate power. However, in the case of the current disclosure, the generator only requires energy to excite the rotor to generate the rotating magnetic poles. Therefore, the systems and methods take the power required and cycles it back to aid in driving the generator and the remaining power is usable electric power to be used for whatever purpose is required.

The Lenz losses, as noted above, are related to inductive coupling between the rotor standing poles and the stator induced poles. Concerning efforts to reduce reverse torque, Nikola Tesla published an article entitled "Notes on an Unipolar Dynamo", Nikola Tesla, The Electrical Engineer, N.Y. Sep. 2, 1891. Tesla reported on a modification of the Faraday Dynamo design. Tesla's design varied in two major ways:

1. First, he used a magnet that was bigger in diameter than the disc, so that the magnet completely covered the disc.
2. Second, he divided the disc into sections with spiral curves out from the center of the outside edge.

The Tesla modifications caused the current to make a full trip around the outside edge of the disc. Because the current is flowing in a large circle at the rim of the disc, the magnetic field created does not work against the field magnet. This modification eliminated a significant problem of electric power generation, i.e., the reaction to every action or, as is commonly called, reverse torque or back EMF.

This design change and its effect on reverse torque was accomplished by geometric isolation of the standing pole from the induced pole of the machine. In the case of the present disclosure, the rotor is static, i.e., non-rotating, and, therefore, reverse torque is not an issue. The induced pole is induced by current flow which is generated by the standing pole. The induced pole is not responsible for current flow or power generation in the induced coils. This design change removes Lenz losses produced by the induced stator poles attracting and repelling polar coupling between the stator poles and the rotor poles.

The solid state rotor of the present disclosure is virtually free of reverse torque due to four design changes when compared to conventional electric generators with rotating rotors:

1. The rotor has no moving parts.
2. The rotor does not rotate in the stator cavity.
3. The magnetic poles rotate in proper frequency and sequence to generate the desired electric power output.
4. The rotor can be used to retrofit any conventional generator—single-phase, two-phase, or three-phase.

SUMMARY

Consistent with the present disclosure, systems and methods are provided for a generator with reduced reverse torque. Embodiments consistent with the present disclosure include systems and methods for one or more electric generator rotors, which may be solid state and may be used to convert any conventional rotary generator into efficient power generator. In accordance with some exemplary embodiments, a system is provided for generating power with a reduced reverse torque. For example, a solid-state electromagnetic rotor, consistent with the present disclosure may include a plurality of salient pole pieces arranged around a supporting structure, wherein a first end of each salient pole piece is attached to the support structure and a second end of each salient pole piece points outward away from the supporting structure; and wires are wound around each salient pole piece such that when the wires of the plurality of salient pole pieces are sequentially excited by an excitation circuit, the salient pole pieces are energized to provide a moving polar magnetic field in the form of distinct magnetic poles as desired to accomplish power generation.

In accordance with an aspect, a method is disclosed for removing reverse torque from a rotary electric generator that includes replacement of the conventional dipole or multi-pole spinning rotor with a uni-pole, dipole or multi-pole, static solid state rotor insert which creates rotating magnetic poles and generates electric power without rotating the rotor. Since the rotor does not rotate, there is no energy consuming interaction between the magnetic poles formed in the stator iron when the generator is connected to an electric load. Nor does the generator require energy to spin a rotor at the proper frequency.

Before explaining certain embodiments of the present disclosure in detail, it is to be understood that the disclosure is not limited to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. Furthermore, the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments. In the drawings.

DETAILED DESCRIPTION

Figure 1:
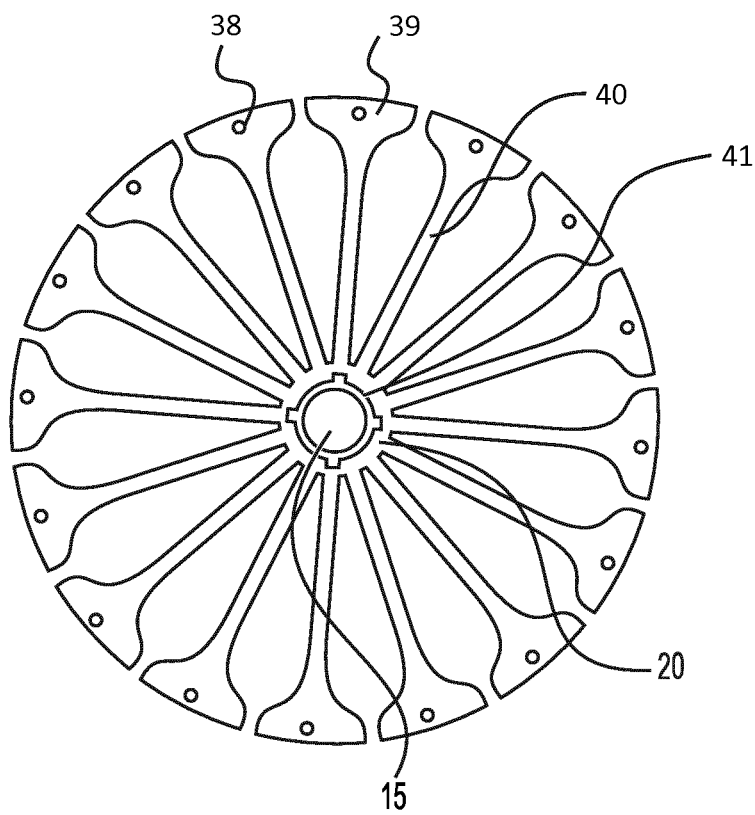
FIG. 1 is a diagram illustrating a cross-sectional end view of an exemplary rotor laminate revealing salient pole irons and mu metal flux return ring, consistent with embodiments of the present disclosure.

Embodiments herein include systems and methods. At least some disclosed methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Embodiments of the present disclosure provide numerous advantages over prior systems and methods. For example, various exemplary embodiments are discussed and described herein involving aspects of an electric machine, such as a generator that produces power with high efficiency and very low electromagnetic drag. The relevance of elimination of the drag to its uses and applications along with the use of superconductor coils is presented and discussed. For example, embodiments of the present disclosure provide systems and methods for a generator design virtually free of reverse torque due to four design changes when compared to a conventional electric rotary generator. These design features, including Geometric Isolation, Singular Stator Winding Pattern, Shielding and Unique Rotor Design are explained next.

Geometric Isolation: Each stator armature induction coil may be located in two separate rotor cavities, such that only one side of a stator coil is in close proximity to a first magnetized rotor, while the opposite side of the coil is in close proximity to a second magnetized rotor. Both rotors are outside of a closed induction loop. Reverse torque of a conventional generator may be formed when a single rotor excites both sides of a stator coil, one being at least one north pole and the other at least one south pole. Based on Lenz's Law, there is an induced current in a closed loop if the magnetic flux through the loop is changing. The direction of the induced current is such that the induced magnetic field opposes a change in flux. In the case of the present disclosure, the magnetic field of the rotor is geometrically removed and isolated from a magnetic axis or center line of a stator magnetic pole. Therefore, reverse torque does not occur to any significant extent due to this geometric separation of the would-be opposing magnetic poles.

Singular Stator Winding Pattern: A stator armature may be wound with lapping coils in wire slots such that a direction of current flow in the lapping coils is identical in all slots of an individual rotor cavity. However, as the coils exit stator induction slots, the coils are physically wound in opposite directions thereby creating opposite magnetic polarities and effectively canceling available magnetic polarity which may otherwise form a small amount of effective reverse torque.

Shielding: A stator armature iron also contains a series of mu metal shields between wire slots, which allow flux linkage between narrow segments of side iron and back iron and a uni-pole rotor flux such that an armature coil inductive power generation may be attained. However, no significant reverse torque is developed.

Unique Rotor Design: A modified salient pole rotor may be a singular alternating uni-pole (function as single-pole) rotor. The design of the modified salient pole rotor allows north magnetic pole flux for 360° of rotation followed by south magnetic pole flux for 360° of rotation. This rotor design does not exhibit a detectable magnetic center pole or center line which could tend to line up on small magnetic poles of a stator and thereby develop some counter torque. Rotor magnetic coils are excited through slip rings by a solid state DC power excitation system which allows alternation between north magnetic pole and south magnetic pole for a full 360° of rotor surface. The frequency may be controlled by a separate small motorized sensor wheel or a solid-state frequency generator and programmable logic center, which may be regulated to any desired frequency through a master computer control regardless of the speed of generator rotors.

The solid state static rotor disclosed herein allows the generator rotors to be operated in any embodiment or design of generator stator. It allows the magnetic poles of the rotor to be rotated at any speed without consideration of power output frequency. The frequency can be controlled by an excitation circuit rather than by the speed of the rotors. This design allows flexibility in power output by increasing and decreasing the speed of the rotor field without altering the frequency. For example, a generator operated at 3,000 rpm's can double the power output by increasing the operating speed of the rotor magnetic poles up to 6,000 rpm's or more. Also by decreasing the power, the power can be reduced as low as desired by progressively decreasing the speed of the rotor but maintaining the frequency by timed excitation of the rotor coils. If the conductor material with very low resistance to electron flow is employed (a room temperature superconductor, such as graphene coated magnet wire, is used to wind both stator and rotor, an increase in power output can be realized with no change in input power. Alternatively, a generator $1/5^{th}$ or $1/10^{th}$ the size could be built to generate the same power output if using such superconductor coils.

According to some embodiments, these aforementioned design changes in the generator allow an unchanged mechanical energy demand by the generator onto a prime mover regardless of the electrical load across the stator coils of a generator all the way up to its maximum power output capacity. The aforementioned design changes encapsulate a rotor of a solid state system with no moving parts, the rotor does not rotate within a stator cavity, the magnetic poles rotate in proper frequency and sequence so as to generate a desired electrical power output and the solid state rotor may be used to retrofit any conventional generator, single-phase, two-phase or three-phase.

According to some embodiments, the first and second members do not have to be driven in a synchronized manner because the alternating first and second magnetic polarities are synchronized by a solid state PLC excitation system which fires an appropriate lead of the uni-pole magnetic polarity when the PLC receives a signal from a photocell sensor and wheel sensor driven by a drive motor at any desired frequency, for example 60 Hz. A solid state frequency generator may also be used.

According to some embodiments, AC power can be generated when both the first and second members of the slot rotor pairs are provided with appropriate alternating first and second magnetic polarities. DC power may be generated from the same slot rotor pairs when the first slot rotor of the pair generates only a first polarity and the second slot rotor generates only a second polarity. This allows for changing the generator from AC power to DC power and/or back to AC power by changing a direction and duration of the excitation currents in the appropriate pole, which may be accomplished in a programming change in the excitation PLC which may be "slaved" to a master computer.

According to an embodiment, each slot rotor member has at least an alternating pair of uni-pole magnetic poles, i.e., alternating the first magnetic polarity with a second magnetic polarity, wherein each slot rotor member is capable of rotating about a longitudinal axis. In this embodiment, the first and second rotors are uni-pole for an entire 360° of circumference of the first and second rotors. The uni-pole circuit excited by a solid state switching system allows all of the rotor windings to be switched in alternating directions, i.e., switch the entire rotor from north pole to south pole and south pole back to north pole. This design change allows a PLC solid state commutator circuit, which controls the excitation circuit to apply excitation current to the first slot rotor member and the second slot rotor member to generate magnetic flux in one of the magnetic poles of a first polarity associated with the slot rotor member 50 times per second (50 Hz) or 60 times per second (60 Hz) regardless of the position of the rotor in the rotational space and to generate the magnetic flux when the associated one of the magnetic poles of the second polarity associated with the second slot rotor member is applied with an excitation current thereby generating a magnetic flux of opposite polarity such that magnetic coupling occurs between the rotor magnetic pole, side iron, back iron and stator slot coils. This embodiment allows a generator rotor to be operated at any speed with the frequency being controlled by an excitation circuit rather than the speed of the rotors.

According to some embodiments, structure of the rotor windings must be altered in order to operate as a functional uni-pole rotor. When a bipolar rotor is excited simultaneously with north pole-north pole or south pole-south pole, internal poles cancel a large portion of external flux. The uni-pole is in actuality two complete dipole electromagnets combined and separated by a mu metal/steel flux return plate, but contained within the single rotor. When a dipole magnet, for example magnet A with coils, for example (a) and (b), is excited, (a) is excited in a north pole direction while (b) is excited in a north pole direction with (a) being on an outer rotor surface with the rotor; simultaneously, a dipole magnet, for example magnet B of the uni-pole with coils, for example, (c) and (d) is excited, (c) is excited in a north pole direction while (d) is excited a north pole direction. This isolation of magnetic coils A and B from each other allows full north pole flux for 360° of rotor surface and allows alternation with south pole flux for 360° of rotor surface.

Functionality of this rotor design is further improved by a necessary skewing of coil winding slots which are separated 180° from each other. The skew is required to be about 2 cm and skewed in opposite direction from the stator slot skew.

In accordance with embodiments of the present disclosure, a method for reducing drag in an electric generator that includes a change in geometric design and placement of a series of uni-pole either static or rotary rotors in relation to stator coils along with a system of magnetic shielding which results in very minimal interaction of the rotor magnetic fields with inductive magnetic fields of the stator when the generator is connected to an electric load is disclosed. This change in design comprises distributing first numbers of slot rotor pairs along an outer periphery of a first stator section having induction windings accommodated in slots. Second numbers of the slot rotor pairs may be distributed along an outer periphery of a second stator section having induction windings accommodated in slots. The slots of the first stator section and the second stator section may be axially aligned along a length wise and depth wise access. The outer periphery of the second stator section may also correspond to an inner circumference where reference is made to a circular or other suitable shape stator. The inner periphery of the first stator section and the inner periphery of the second stator section may be adjacent to each other. The first members and second members of the slot rotor pairs may include slot uni-pole rotors having at least one pair of wound armature pole sections of an alternating first and second magnetic polarity. The first and second members of the slot rotor pairs may be rotated in a synchronized manner such that a first one of the pole sections of the first member having a first magnetic polarity and a second one of the pole sections of the second member having a second magnetic polarity may be aligned with the slots to provide maximum flux density in the induction windings to induce a current flow therein. In other words, the first and second magnetic polarity may be alternated in sequence such that each rotor operates as an alternating uni-pole rotor, i.e., north pole for 360° of rotor surface, alternated with south pole for 360° of rotor surface. The alternating north pole-south pole for 360° of surface is made possible by a design and winding pattern. The first and second magnetic polarity of slot rotor pairs may be rotated in a magnetically synchronized manner such that the first pole having a first magnetic polarity and a second magnetic polarity of a second pole are located in geometric adjacent corners of the first stator and second stator. Accordingly, a first side of a stator armature coil may be excited with a first magnetic polarity and a second side of the stator armature coil may be excited with a second magnetic polarity such that maximum flux density may be provided in the induction windings in order to induce a current flow therein.

The first member and the second member of the respective slot rotor pairs may be aligned with aligned slots of the first stator section and the second stator section along respective length wise axis of the first and second members and the slots such that the length wise axis of the first and second members are in normal alignment with the depth wise axis of aligned slots.

According to some embodiments, the first and second members may be magnetically shielded such that flux generated by the first and second members may be directed only into the slots so as to minimize flux leakage and magnetic drag resulting from interaction of the rotor pairs with the stator magnetic fields. The first members and the second members shielding means may be inserted into respective openings provided in the first and second stator sections, for example in a tooth iron between skewed stator slots such that only the tooth iron directly over the area of the slot may be exposed to the magnetic field of the first and second magnetic polarity of the rotors. The respective openings may be arranged in a length wise alignment with the slots, to partially shield the first and second members and can be provided with a longitudinal opening corresponding to a longitudinal opening of the slots in order to provide magnetic communication with the corresponding longitudinal openings of the slots and ultimately to the windings disposed therein. AC power may be generated when the first and second members of the slot rotor pairs are provided with appropriate alternating first and second magnetic polarities. DC power may be generated from the same slot rotor pairs when the first slot rotor pair generates only a first polarity and the second slot rotor pair generates only a second polarity. This allows changing the generator from AC power to DC power by changing the excitation current in appropriate poles, which may be accomplished by programming changes in the excitation PLC controller. According to an embodiment, the first and second members may be shielded such that flux generated when an excitation current supplied to the armatures of the first and second members may be directed substantially toward the slots.

Each slot rotor member may have at least a pair of magnetic poles with one of the pair of magnetic poles having a first magnetic polarity and another of the pair of magnetic poles having a second magnetic polarity. Each slot rotor member is capable of rotating about a longitudinal axis. The slot rotor pairs may be disposed along the slot pairs such that the induction coil winding disposed in the slot pairs are exposed to magnetic flux generated by the slot rotor pairs.

According to one embodiment, the first polarity of slots may include four wire slots and the second polarity of slots may include four wire slots. Each of the first stator section and the second stator section may have a substantially square shape with the wire slots located in corners of the square, where the first stator section and the second stator section are concentric about a longitudinal axis of the dual stator. In this embodiment, geometric isolation from the magneto motive poles in the stator greatly reduces the drag forces between the stator and magnetized rotors. According to one embodiment, the first polarity of slots and the second polarity of slots may contain up to 12 wire slots, but not limited to 12, each without significant increase in drag forces.

According to some embodiments, the excitation circuit may include a commutator circuit (either mechanical or solid state) associated with the first and second slot rotor members, the commutator circuit selectively coupling one of the first and second slot rotor members to the excitation current as the appropriate ones are rotated in timing sequence.

In accordance with embodiments of the present disclosure, a method is disclosed for reducing drag in an electric generator, including a change in geometric design and placement of the rotors in relation to stator magnetic poles such that the stator magnetic poles that are created by the flow of load current in the generator are geometrically isolated from the rotor cavities and are shielded by a system of magnetic shielding as well as a winding which provides electromagnetic shielding and canceling of the effective stator magnetic poles secondary to electrical load currents in the stator winding.

According to some embodiments, induction coils are bisected by cutting each turn of a coil and placing connectors on the severed ends such that as the coils are placed into the induction wire slots the coil turns may be reconnected. The physical shielding consists of metallic mu metal shielding and electromagnetic shielding around a rotor cavity. Further, shielding is provided by a winding pattern in the rotor cavity portion of a stator. Still further, reduction in magnetic interaction between the rotor magnetic poles and the potential stator magnetic poles may be accomplished by the further uniqueness of the stator winding patterns, which consists of bi-directional current flow in adjacent windings during load current flow which neutralizes inductive magnetic polarity of the stator. This shielding and geometric isolation of the rotors from the potential stator magnetic poles created by the stator induction windings results in very minimal magnetic flux linkage of the rotor magnetic fields with the inductive magnetic fields of the stator when the generator is connected to a full electric load. This design alteration from conventional generators comprises distributing first members of slot rotor pairs along an outer periphery of a first stator section having induction windings accommodated in slots in an inner periphery of the rotor pair cavities.

According to some embodiments, the slots are multiple axially aligned slots which may be skewed by one stator slot tooth width or slot pitch. The skewing of the slots is utilized to reduce the air gap permanence harmonics caused by the slots as the rotors rotate past the wire slots. Second members of the rotor pairs along an outer periphery of a second stator section may have induction windings accommodated in slots in the inner periphery of the slot rotor pair cavities.

According to some embodiments, the slots of the first stator section and the second stator section are axially aligned with a skew by one stator slot tooth width or one slot pitch, along a length-wise and depth-wise access. According to some embodiments, an outer periphery of a second stator section may correspond to an inner circumference, where reference is made to a circular or other similar shaped stator.

According to some embodiments, an inner periphery of the first stator section and an inner periphery of the second stator section may be adjacent to each other. The first members and the second members of the slot rotor pairs may include slot rotors having at least one wound armature alternating pole section which may be excited by a solid state excitation with a gating mechanism which allows the entire rotor pole section of the wound armature to alternate between a first and second magnetic polarity.

According to some embodiments, the first and second members of the slot rotor pairs may be rotated in a synchronized manner such that a first magnetic polarity and a second magnetic polarity are aligned with the slots to provide maximum flux density in the induction windings to induce a current flow therein.

According to some embodiments, the first member and the second member of the respective slot rotor pairs may be aligned with the skewed aligned slots of the first stator section and the second stator section along respective length wise axes of the first and second members and the slots such that the length-wise axes of the first and second members are in normal alignment with the depth-wise axes of the aligned slots.

According to some embodiments, the first and second members may be magnetically shielded such that the flux generated by the first and second members may be directed into the induction wire slots with minimal interaction among the rotor pairs and/or the stator magnetic field. The first members and the second members shielding is accomplished by two means. First, a mu metal shielding means may be installed at strategic locations to separate the rotor magnetic fields among the rotors and from the stator magnetic fields. Second, the rotor cavity and stator induction windings provide a net zero magnetic flux interaction or flux linkage between the magnetic fields of the rotors and the stator.

According to some embodiments, the rotor pair cavity openings in the first and the second stator sections are only sufficient to accommodate the stator coil winding process. After the winding process is complete, the openings may be closed by placement of removable laminated stator sections. This 360° laminated tunnel along with skewing of the stator slots provides equal flux linkage between the magnetized rotors and the stator iron for the entire 360° of rotation. In operating conditions, a magnetic bearing effect may be provided thereby eliminating drag between the magnetized rotor poles and the stator iron due to irregular flux linkage and resultant air gap harmonics.

In an embodiment, there are no stator openings. The skewed stator slots are wound by severing the coil turns and placing connectors on the severed ends. When the coil turns are laid into the skewed slots of the stator, the connectors allow the coil turns to be reconnected.

According to some embodiments, the first and second members may be driven in a synchronized manner that includes turning on an excitation current in an armature of the first one of the magnetized uni-poles of the first member having a first magnetic polarity at an instant in time when the first member is driven in a first direction. An excitation current in an armature of the second member having a second magnetic polarity can be similarly turned on. The slot openings in the rotors are skewed in opposite direction to the skew of the stator to eliminate any remaining harmonics in the air gap between the rotors and the stator. AC power can be generated when both the first and second members of the slot rotor pairs are provided with appropriate alternating first and second magnetic polarities. DC power may be generated from the same slot rotor pairs when the first slot rotor of the pairs generates only a first polarity and the second slot rotor pair generates only a second polarity. This allows changing the generator from AC power to DC power by changing sequencing of the excitation currents in appropriate poles, which may be accomplished by a programming change in the excitation PLC controller. According to some embodiments, the induction windings can be connected for AC power, DC power and in single-phase or 3-phase "high-wye" or "low-wye"; however, a delta connection is not prohibited.

According to some embodiments, the frequency of the generated power may be changed by altering the speed of the first and second members of the slot rotor pairs and/or altering the frequency of the excitation to the first and second rotors.

In accordance with embodiments of the present disclosure, an electromagnetic assembly for an electric generator may be provided that includes a dual stator having a first stator section and a second stator section. Rotor cavities of a first polarity are arranged on an outer periphery of the first stator section. Rotor cavities of a second polarity are arranged on an outer periphery of the second stator section. Again, as noted above, with respect to a closed geometric stator arrangement, the outer periphery of the second stator section can refer to an inner circumference. Respective inner peripheries on the first and second sections are disposed in adjacent relation and can include a back-iron of any desired dimension disposed there between to improve magnetic coupling through the induction wire slots. Each of the first and second polarity rotor cavities are aligned along a length wise axis and may contain induction wire slots which are skewed the distance of a slot pitch or width of a slot tooth, aligned along a length wise and depth wise axis, respectively. Each of the slots has induction coil windings disposed therein. The assembly may further include slot rotor pairs within the rotor cavities. Each slot rotor has an alternating magnetic pole, alternating between 360° of the first pole and 360° of the second pole. Each slot rotor member is capable of rotating about a longitudinal axis. The slot rotor pairs are disposed along the slot pairs such that the induction coil windings disposed in the rotor cavities of the stator may be exposed to magnetic flux generated by the slot rotor pairs. Each slot rotor member may be provided with a magnetic shield placed in appropriate slots separating the rotor cavities from the stator magnetic poles. The shielding may be made from mu metal.

In an embodiment, slots associated with the first polarity are contained in four rotor cavities and slots associated with the second polarity are contained in four separate rotor cavities. Each of the first stator sections and the second stator sections may have a substantially square shape, but not confined to square shape, with the rotor cavities located in the corners of the square, wherein the first stator sections and the second stator sections are concentric about a longitudinal axis of the dual stators. This embodiment affords geometric isolation from the magneto motive poles in the stator, thereby greatly reducing the drag forces between the stator and the magnetized rotors.

According to some embodiments, the first polarity of slots and the second polarity of slots may contain up to 48 wire slots, but not limited to 48. The slots are wired such that the 360° of slots are wound in a counter-clockwise direction and are lapped by 360° of slots wound in a clock-wise direction.

Therefore, the induced north pole cancels the induced south pole, thereby electromagnetically isolating the rotor magnetic fields from the induced potential stator magnetic fields.

According to some embodiments, an excitation circuit may be provided to apply an excitation current to the first slot rotor member and the second slot rotor member so as to generate the magnetic flux when one of the magnetic unipoles of the first polarity associated with the slot rotor member is excited when the associated one of the second polarity is excited. The excitation circuit can further remove the excitation current from the first slot rotor member and the second slot rotor member in order to remove the magnetic flux in an instant.

According to some embodiments, the magnetic pole or poles of the first slot rotor member and the second slot rotor member may be supplied with a constant excitation current or may be activated in such a fashion that the entire 360° circumference of the rotor may alternate between first magnetic polarity and second magnetic polarity.

In an embodiment, the first and second rotors are uni-pole, i.e., north-pole alternating with south-pole for the entire 360° circumference of the first and second rotors of the rotor pair. The uni-pole circuit excited by a solid state switching system allows all of the rotor windings to be switched in alternating directions, i.e., switch the entire rotor from north pole to south pole and south pole to north pole. This design allows the program PLC or commutator circuit, which controls the excitation circuit to apply an excitation current to the first slot rotor member and the second slot rotor members so as to generate the magnetic flux in the one of the magnetic poles of the first polarity associated with the slot rotor member, for example 50 times per second (50 Hz) or 60 times per second (60 Hz) regardless of the position of the rotor in rotational space and to generate the magnetic flux when the associated one of the magnetic poles of the second polarity associated with the second slot rotor member is applied with an excitation current thereby generating a magnetic flux of opposite polarity such that magnetic coupling occurs through each slot and the intervening back iron and stator coils. This allows the generator rotors to be operated at any speed with the frequency being controlled by the excitation circuit rather than being controlled by the speed of the rotors.

In another embodiment, a conventional rotor or armature may be replaced by flat members of high efficiency electric steel and/or graphene laminated high efficiency electrical steel alone and/or laminated with graphene. The armature and stator may be fabricated from laminated material of high magnetic permeability. The two members may be flat and may be in a variety of shapes, for example, square, rectangular, etc. The armature and stator may be manufactured with wire slots in parallel. Preformed or pre-wound coils are placed into the slots and connected in proper fashion. The two parts may be assembled by placing them with wire slots facing each other and wire slots in parallel.

Reference will now be made in detail to the exemplary embodiments implemented according to the disclosure, the examples of which are illustrated in the accompanying drawing.

FIG. 1 is a diagram illustrating a cross-sectional end view of an exemplary rotor laminate revealing salient pole irons and mu metal flux return ring, consistent with embodiments of the present disclosure. The rotor body may be made of laser cut 20 of, for example 0.34 mm annealed electrical steel which may be stacked on a jig in such a fashion that salient poles 40 are formed. The jig contains shaft 15 which has been slip fit with a mu metal sleeve 41. The rotor body and salient poles may be pressed and retained through bolts in holes 38. The insulated salient pole windings may be then wound around pole pieces 39.

Figure 2:
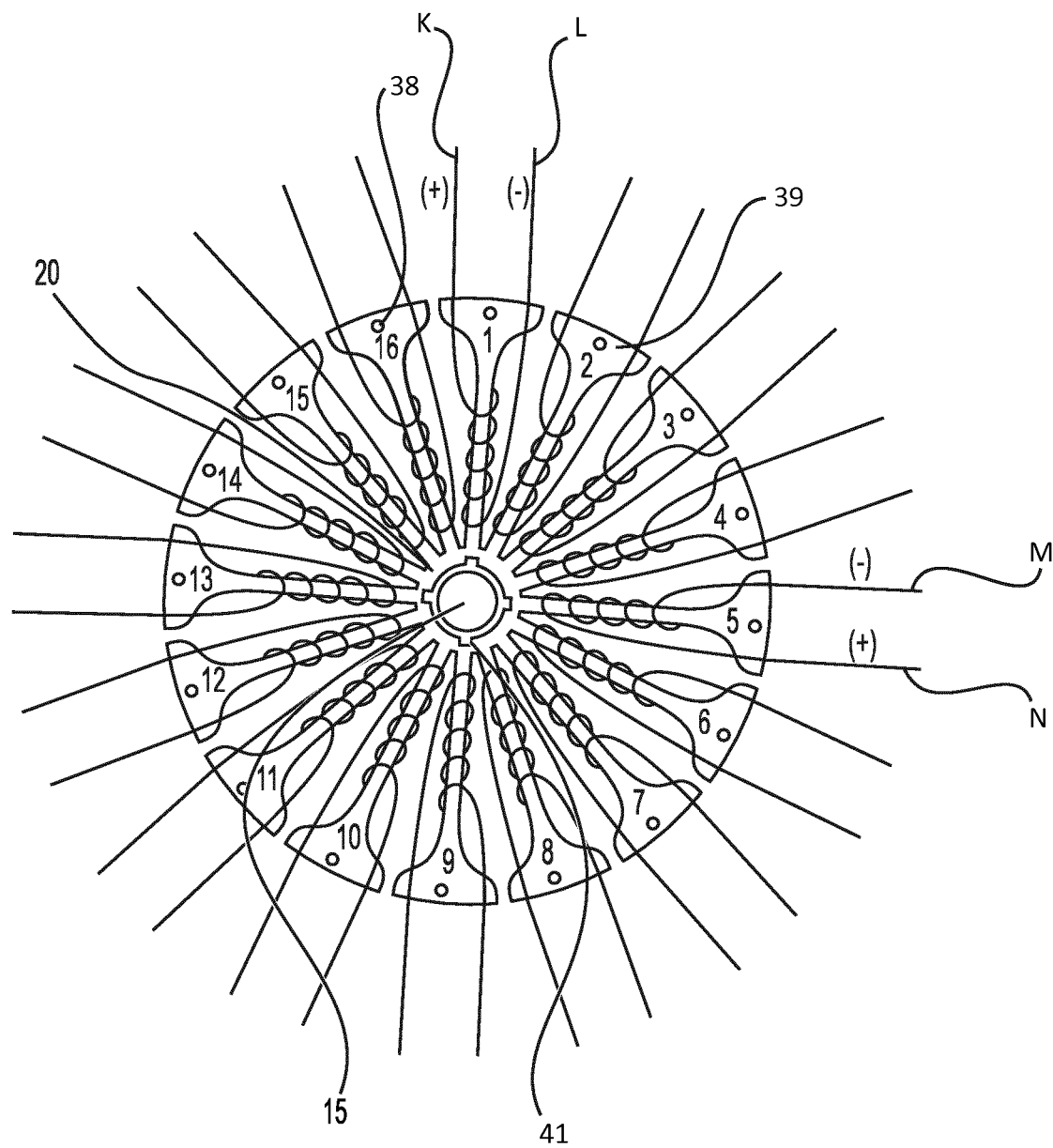
FIG. 2 is a diagram illustrating a cross-sectional end view of an exemplary rotor laminate revealing salient pole irons, mu (μ) metal flux iron and pole iron windings, consistent with embodiments of the present disclosure.

FIG. 2 is a diagram illustrating a cross-sectional end view of an exemplary rotor made of laser cut 20 revealing salient poles 39, mu metal flux iron, and pole iron windings consistent with embodiments of the present disclosure. Each salient pole may have two leads which, for example, pole 1 may be excited north pole with leads K and L, and pole 5 may be excited south pole with leads M and N. Retention holes 38 containing retention bolts are shown along with support shaft 15 and mu metal sleeve 41.

Figure 3:
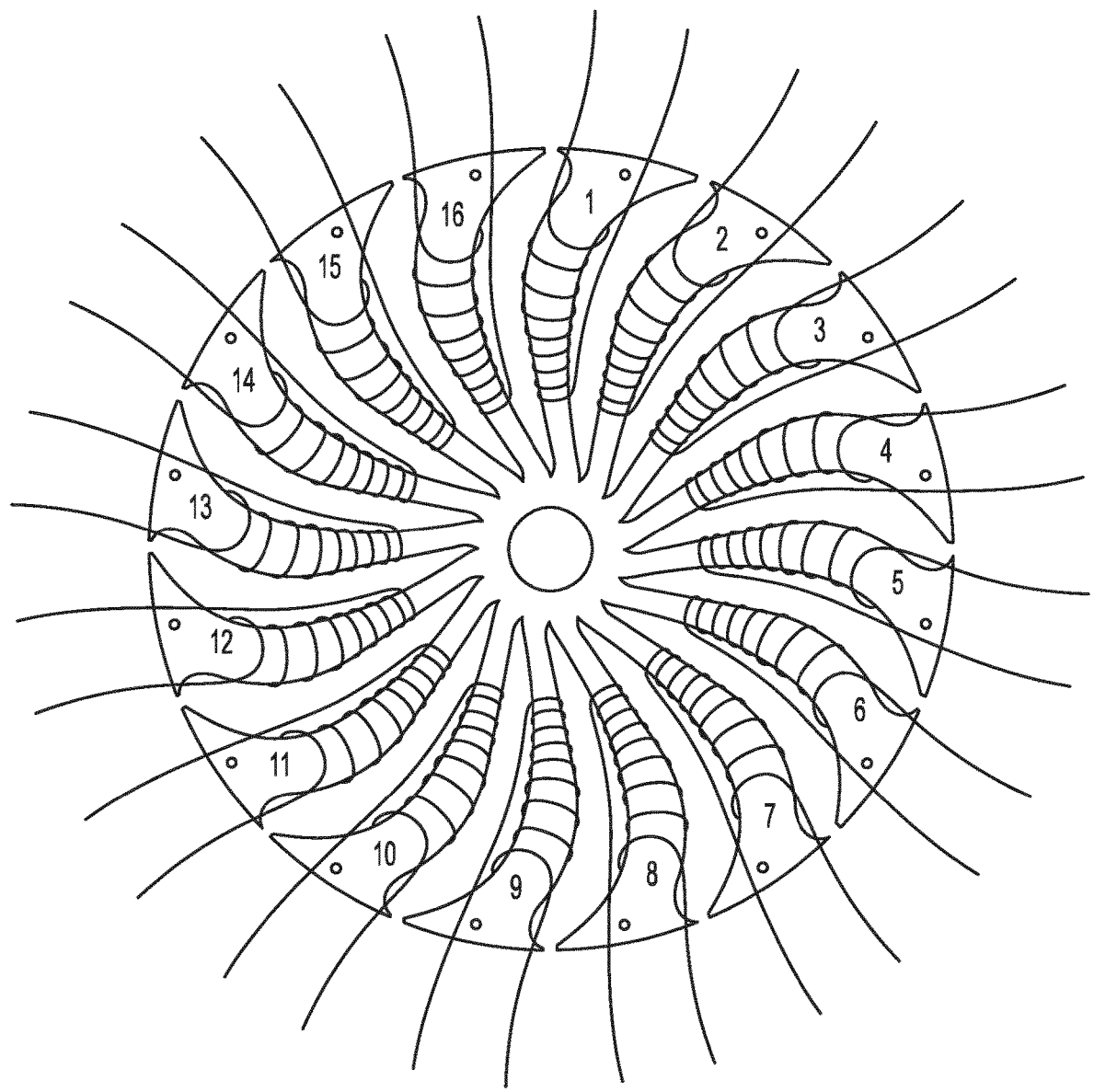
FIG. 3 is a diagram illustrating a cross-sectional end view of an exemplary rotor laminate revealing salient pole irons with angulation in a clockwise fashion and pole iron windings, consistent with embodiments of the present disclosure.

FIG. 3 is a diagram illustrating a cross-sectional end view of an exemplary rotor laminate revealing salient pole irons with angulation in a clockwise fashion and pole iron windings consistent with embodiments of the present disclosure. This angle may allow the evolving magnetic field from each pole to emanate at a 45° angle in a clockwise direction and as the field is repelled by the existing like adjoining pole, the flux may rotate parallel to the surface of the rotor in a clockwise direction.

Figure 4:
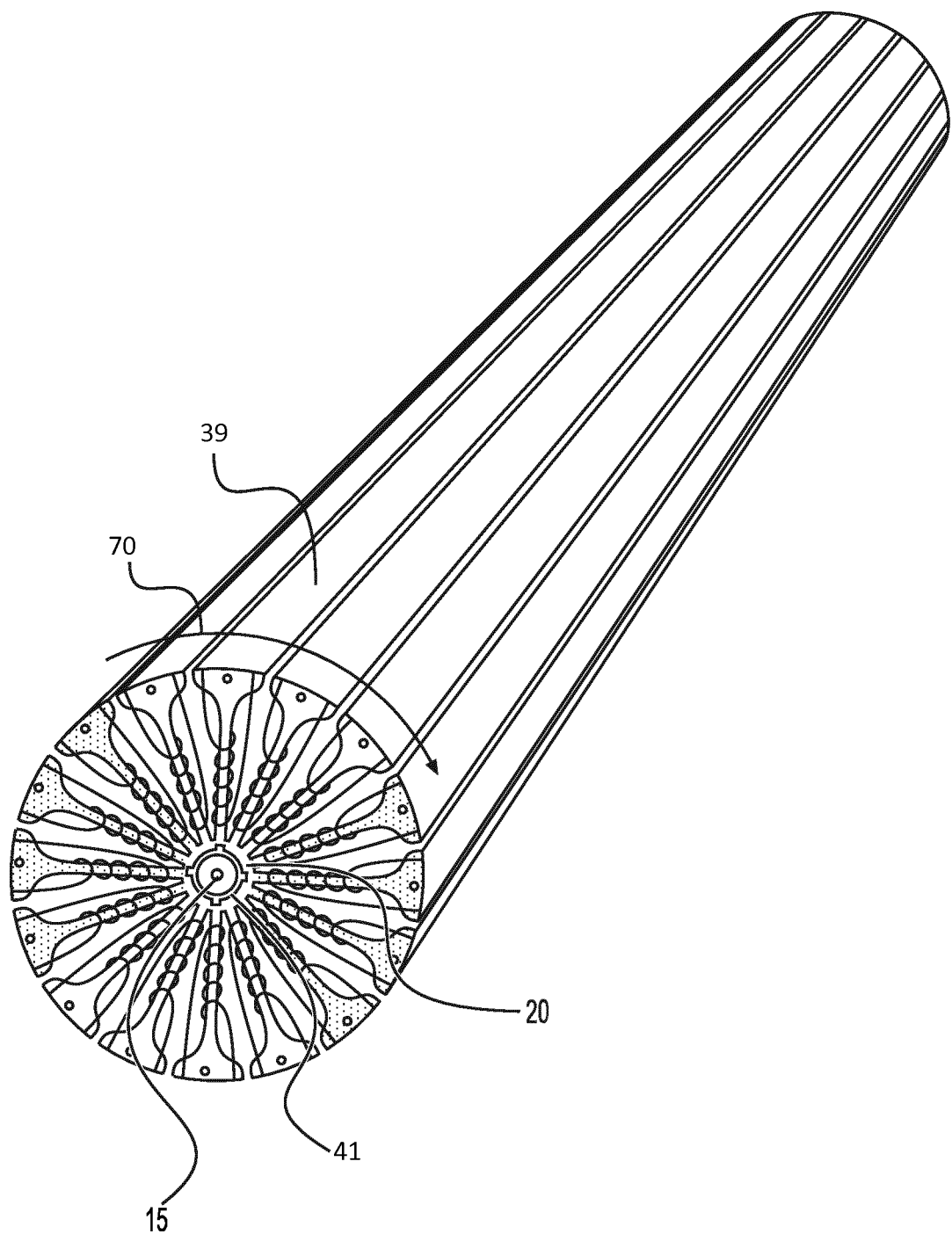
FIG. 4 is a diagram illustrating an end view of an exemplary solid state rotor revealing 16 wound salient poles as well as a flux return insert, consistent with embodiments of the present disclosure.

FIG. 4 is a diagram illustrating a view of an exemplary solid state rotor body 70 revealing 16 wound salient poles as well as a flux return insert, consistent with embodiments of the present disclosure. Rotor 70 is illustrated with stacked and pressed laminates 20, salient poles 39, and mu metal sleeve 41, as the flux return insert, along with support shaft 15.

In accordance with embodiments of the present disclosure, a method is disclosed for removing reverse torque from a rotary electric generator that includes replacement of the conventional dipole or spinning rotor with a uni-pole, dipole, or multi-pole static solid state rotor insert which creates rotating magnetic poles and generates electric power. Since the rotor is stationary, there is no energy consuming interaction between the magnetic poles formed in a stator iron when the generator is connected to an electric load, nor does the generator require energy to spin a rotor at a proper frequency.

This redesign of the rotor is accomplished by, for example, but not limited to cutting laminates from electrical steel in a desired diameter, for example, 6 inches, but not limited to 6 inches with, for example, 16 salient pole pieces, but not limited to 16 of equal size and distribution. FIGS. 5-21 described later illustrate this redesign. The pole pieces may be wound with a desired and appropriate electrical magnet wire. The magnet wire coils may be terminated in two leads which may be connected to an a computer controlled gating system using, for example, a programmable logic center (PLC), allowing switching in an alternate fashion from a first polarity to a second polarity and from the second polarity to the first polarity by use of, for example, a MOSFET gating system in an excitation circuit. In a case of a four-pole rotor described later in FIGS. 23, 26-31 and 33-35 for example, the salient poles are wired into four groups of four poles per group, or two groups of eight poles per group, but not limited to two or four groups.

In a case of a 60 Hz power and a four-pole rotor, pole 1 of group #1 is a first polarity and pole 1 of group #2 is a second polarity. Pole 1 of group #3 is a first polarity and pole 1 of group #4 is a second polarity. Pole 1 from each group may be excited by a solid state exciter board channel #1 (CH1). Pole 2 from each group may be excited by a solid state exciter board channel #2 (CH2). Pole 3 from each group may be excited by a solid state exciter board channel #3 (CH3). Pole 4 from each group may be excited by a solid state exciter board channel #4 (CH4). Pole 1 of each group may be excited and, for example, 2.084 milliseconds later, pole 2 may be excited; then again, for example, 2.084 milliseconds later, pole 3 may be excited; then again, for example, 2.084 milliseconds later, pole 4 may be excited; and, for example, 2.084 milliseconds later pole 1 may be excited again, and the cycle repeats.

Pole circuits may be excited with a first polarity DC power current in a first cycle and the second polarity DC power current in a second cycle. The first and second cycles make up one AC cycle every 16.667 milliseconds in the case of a 60 Hz current. Appropriate adjustments may be made for other frequencies, such as 50 Hz. Each pole may be excited for, for example, 4.167 milliseconds with, for example, a 4.167 millisecond collapse time for each magnetic salient pole. The excitation wave progresses clockwise which distorts each pole as it is forming, which pushes the magnetic flux in a progressive clockwise fashion by the repelling flux of the preceding poles. This in effect constantly pushes discrete separated magnetic poles in a clockwise circular fashion at a desired frequency and the poles are separated, alternate first polarity and second polarity. Accordingly, every complete 16.667 millisecond cycle, the excitation switches from first polarity to second polarity such that the four distinct magnetic poles continue to rotate without physical rotation of the rotor member itself.

In a case of a two pole magnetic rotor described later in FIGS. 22 and 32, salient poles may be wired into two groups of eight pole pieces per group. Pole pieces in each group may be connected to a circuit from the exciter system. For example, pole 1 and group #1 is a first polarity, pole 1 of group #2 is a second polarity. Pole 1 for each group may be excited by solid state exciter channel #1. Pole 2 for each group may be excited by solid state exciter board channel #2. Pole 3 for each group may be excited by solid state exciter board channel #3. Pole 4 for each group may be excited by solid state exciter board channel #4. Pole 5 for each group may be excited by solid state exciter board channel #5. Pole 6 for each group may be excited by solid state exciter board channel #6. Pole 7 for each group may be excited by solid state exciter board channel #7. And pole 8 for each group may be excited by solid state exciter board channel #8.

For example, pole 1 of each group may be excited and, for example, 1.042 milliseconds later, pole 2 of each group may be excited. Pole 2 of each group may be excited and, for example, 1.042 milliseconds later, pole 3 of each group may be excited. Pole 3 of each group may be excited and, for example, 1.042 milliseconds later, pole 4 of each group may be excited. Pole 4 of reach group may be excited and, for example, 1.042 milliseconds later, pole 5 may be excited. Pole 5 of each group may be excited and, for example, 1.042 milliseconds later, pole 6 may be excited. Pole 6 of each group may be excited and, for example, 1.042 milliseconds later, pole 7 may be excited. Pole 7 of each group may be excited and, for example, 1.042 milliseconds later, pole 8 may be excited. Pole 8 of each group may be excited and, for example, 1.042 milliseconds later pole 1 of each group may be excited, and the cycle repeats.

The excitation polarity changes with each cycle. Therefore, in the case of the four pole unit, the polarity switches two times per each 16.667 milliseconds and with the two pole unit, the polarity of the excitation switches two times per 16.667 milliseconds/cycle for a 60 Hz current.

For example, in a case of a uni-pole magnetic rotor described later in FIGS. 24, 25 and 38-40, 16 salient poles are wired into four groups of four pole pieces per group. All 16 pole pieces may be excited north pole, for example, for 8.3335 milliseconds; and then all 16 may be excited south pole, for example, for another 8.3335 milliseconds, such that each complete cycle is of 16.667 milliseconds. Pole pieces in each group may be connected to a circuit from a PLC driven exciter system. Accordingly, pole piece #1 of group #1 may be a first polarity; pole pieces #1 of group 2, 3, and 4 may be a first polarity for one cycle; and then all switch to a second polarity for pole piece #1, 2, 3 and 4. That is, the entire rotor alternates between first polarity for 360° and second polarity for 360°. Alternating polarity may be controlled by, for example, a MOSFET gating system. The speed of the rotating field is not relevant to the generated current frequency. The frequency may be controlled by a computer controlled gating system, for example, for a 50 Hz, a 60 Hz, or any other desired frequency. The speed of rotation of the magnetic field may be controlled by a rate of progression of excitation.

For example, to obtain a rotation rate of the magnetic field at, for example 7,500 rpm, the following sequence applies. Pole piece #1 of each group may be excited and, for example, 0.5 milliseconds later, pole piece #2 may be excited; and, for example, 0.5 milliseconds later, pole piece #3 may be excited; and, for example, 0.5 milliseconds still later, pole piece #4 may be excited and, for example, 0.5 milliseconds later, pole piece #1 may be again excited, and the cycle is repeated until an excitation polarity is switched. Each pole piece may be excited, for example, 0.1 millisecond. The pole circuits may be excited with a first polarity DC current in the first cycle and a second polarity DC current in the second cycle. Number one cycle plus number two cycle make a complete AC cycle.

The structure of rotor laminates and rotor windings must be altered in order to operate as a functional rotating magnetic field. When a conventional bipolar rotor is wired and excited such that both poles of the rotor are either north pole or south pole, i.e., north-north or south-south, the internal poles cancel a large portion of the external magnetic flux. As is discussed below with respect to FIGS. 46-51, the external flux dropped from 4000 gauss to 100 gauss for a 40-fold deterioration in flux density when the polarity was changed from north-south to north-north or south-south.

In order to correct this deterioration issue, a uni-pole solid state rotor may be constructed such that the poles of a uni-pole rotor which opposes another pole of a uni-pole rotor by 180° is actually wound and constructed as two complete dipole magnets, combined and separated by mu metal-steel flux return structure positioned between the two dipoles. When dipole magnet A side with outer coil (a) and inner coil (b) is excited, (a) may be excited north pole facing out toward the observer and (b) may be excited north pole facing out toward the observer with (a) being wound in the outer rotor slot and (b) being wound in the inner rotor slot. Simultaneously, magnet B side of the uni-pole may be excited with the outer coils (c) and inner coils (d), where (c) may be excited north pole facing outward toward the observer and (d) may be excited north pole facing outward toward the observer. Isolation of magnets A from B by a mu metal steel flux return apparatus along with the above winding pattern allows full north pole flux of, for example 6,000 gauss on the pole surface of every activated rotor pole and alternating with south pole flux of, for example 6,000 gauss for full 360° of salient pole shoe surface attained by alternation of positive and negative excitation of the leads via a MOSFET gating system.

The excitation polarity may be controlled by altering a DC power feed current by the above mentioned PLC. The DC power feed may be controlled by a master PLC which alternates the DC polarity by use of the MOSFET gating system, which alternates the polarity, for example, every 8.3335 milliseconds in the case of a 60 Hz current and, for example every, 10 milliseconds in the case of a 50 Hz current.

The design of the solid state static rotor of the present disclosure allows the generator rotors to be operated in any embodiment or design of a generator stator. The design allows the rotor magnetic poles to be rotated at any speed without consideration of power output frequency. The frequency can be controlled by an excitation circuit rather than by the speed of the rotors.

As noted earlier, the redesign of the rotor is accomplished by, for example, cutting laminates from electrical steel in a desired diameter, for example, 6 inches, but not limited to 6 inches, with, for example, 16 salient pole pieces, but not limited to 16, of equal size and distribution. FIGS. 5-21 described next illustrate this redesign, where the pole pieces may be wound with a desired and appropriate electrical magnet wire.

Figure 5:
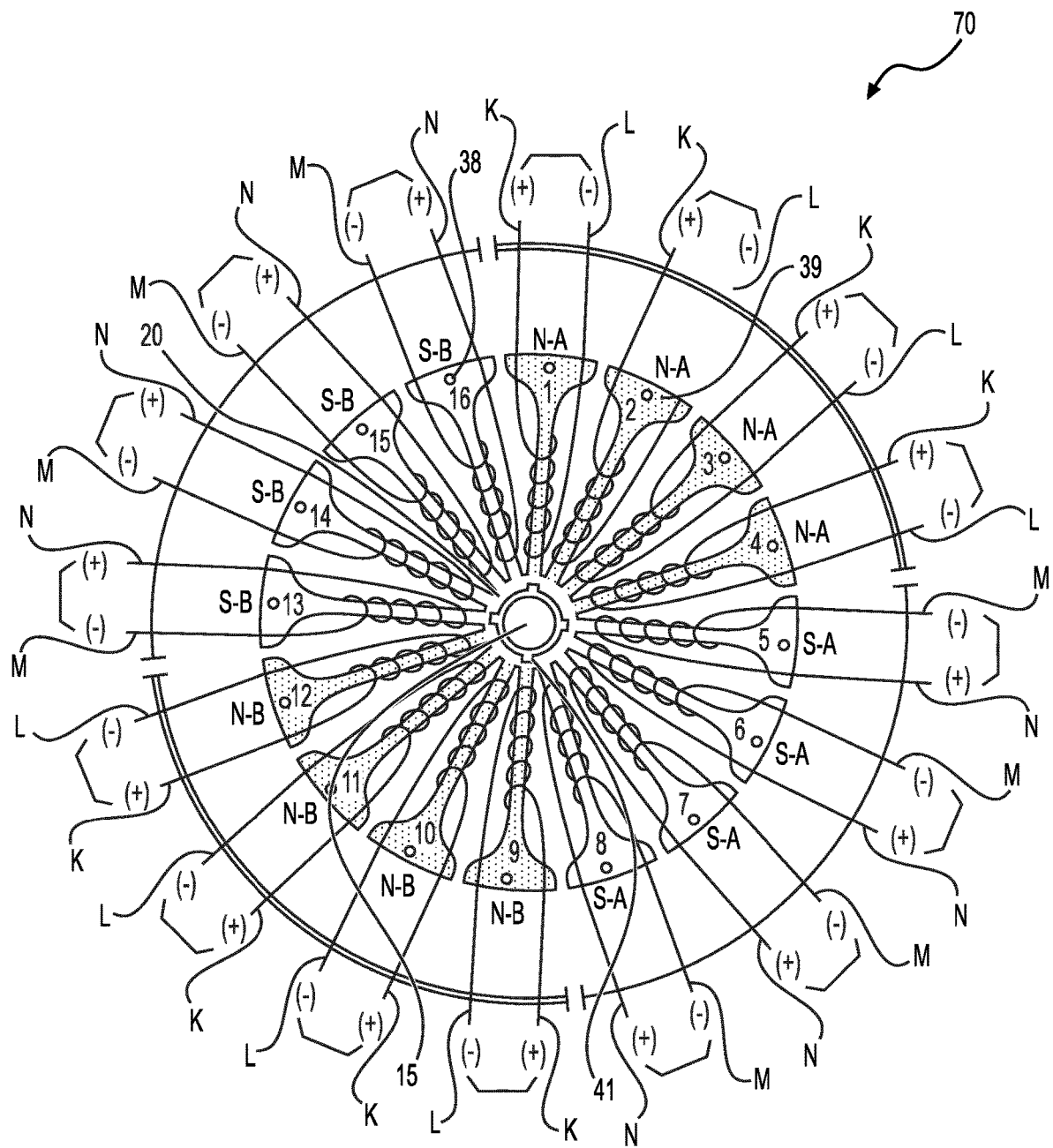
FIG. 5 is a diagram illustrating an end view of an exemplary solid state rotor with pole windings and excitation polarity sequencing circuits demonstrated for all 16 salient poles through a four-pole, 60 Hz cycle—pulse #1, consistent with embodiments of the present disclosure.

FIG. 5 is a diagram illustrating an end view of an exemplary solid state rotor 70 with pole windings and excitation polarity sequencing circuits demonstrated for all 16 salient poles through a four-pole, 60 Hz cycle—pulse #1, which generates the rotating magnetic poles, consistent with embodiments of the present disclosure. Solid state rotor 70 reveals an end laminate 20 and retention bolt holes 38. FIG. 5 is a depiction of a static state rotor with 4 magnetic poles and the excitation scheme of the salient poles associated with each magnetic pole. Salient poles 39 are numbered 1-16. The 4 rotor magnetic poles include north pole #1 (labeled N-A), south pole #1 (labeled S-A), north pole #2 (labeled N-B) and south pole #2 (labeled S-B). Each magnetic rotor pole comprises 4 electrically excited wound salient pole pieces. North pole excitation leads K and L, and south pole excitation leads M and N are sequentially excited in the following manner.

In pulse #1 as shown in FIG. 5, the first magnetic pole group (salient poles 1-4) is excited in a first polarity and the second magnetic pole group (salient poles 5-8) is excited in a second polarity. The third group (salient poles 9-12) is excited in a first polarity and the fourth magnetic pole group (salient poles 13-16) is excited in a second polarity. Salient poles 1, 5, 9, and 13 are excited by a solid state exciter hoard channel #1 (CH1) and channel #2 (CH2). Salient poles 2, 6, 10, and 14 are excited by a solid state exciter board channel #3 (CH3) and channel #4 (CH4). Salient poles 3, 7, 11, and 15 are excited by a solid state exciter board channel #5 (CH5) and #6 (CH6). Salient poles 4, 8, 12, and 16 are excited by a solid state exciter board channel #7 (CH7) and channel #8 (CH8). Within each group, the salient pole pieces are not excited simultaneously, but sequentially. For example, in the first group (poles 1-4), salient pole 1 is excited in a first polarity and, for example 2.084 milliseconds later, salient pole 2 is excited in a first polarity; for example, 2.084 milliseconds later, salient pole 3 is excited in a first polarity; and, for example, 2.084 milliseconds later, salient pole 4 is excited in a first polarity. After all the poles have been excited in one polarity sequentially, the polarity is switched. For example, after pole 4 is excited in the first polarity for 2.084 milliseconds, salient pole 1 is excited again, this time in a second polarity, and the cycle repeats. In other words, the poles are excited by a first polarity DC in a first half cycle and a second polarity DC in a second half cycle. The first and second half cycles make up one AC cycle every 16.667 milliseconds, in the case of a 60 Hz current. Appropriate adjustments may be made for frequencies other than 60 Hz.

In the case of 60 Hz current, each pole is excited, for example, 4.167 milliseconds with, for example, a 4.167 millisecond relaxation time for each salient pole. The excitation wave progressive clockwise, which distorts each magnetic pole as it is forming with the result being a pushing of the flux in a progressive clockwise fashion parallel to a surface of the rotor as a result of the repelling of the flux from the preceding pole. The effect in the case of FIG. 5 is that four discreet alternating magnetic poles circulate in a clockwise circular fashion at a desired frequency. The poles are separated at an alternating first polarity and second polarity. Every 16.667 millisecond complete cycle involves first polarity and second polarity in 180° of rotation in each half cycle. Two half cycles involve 360° of rotation. The four distinct magnetic poles continue to rotate without physical rotation of the rotor member.

Figure 6:
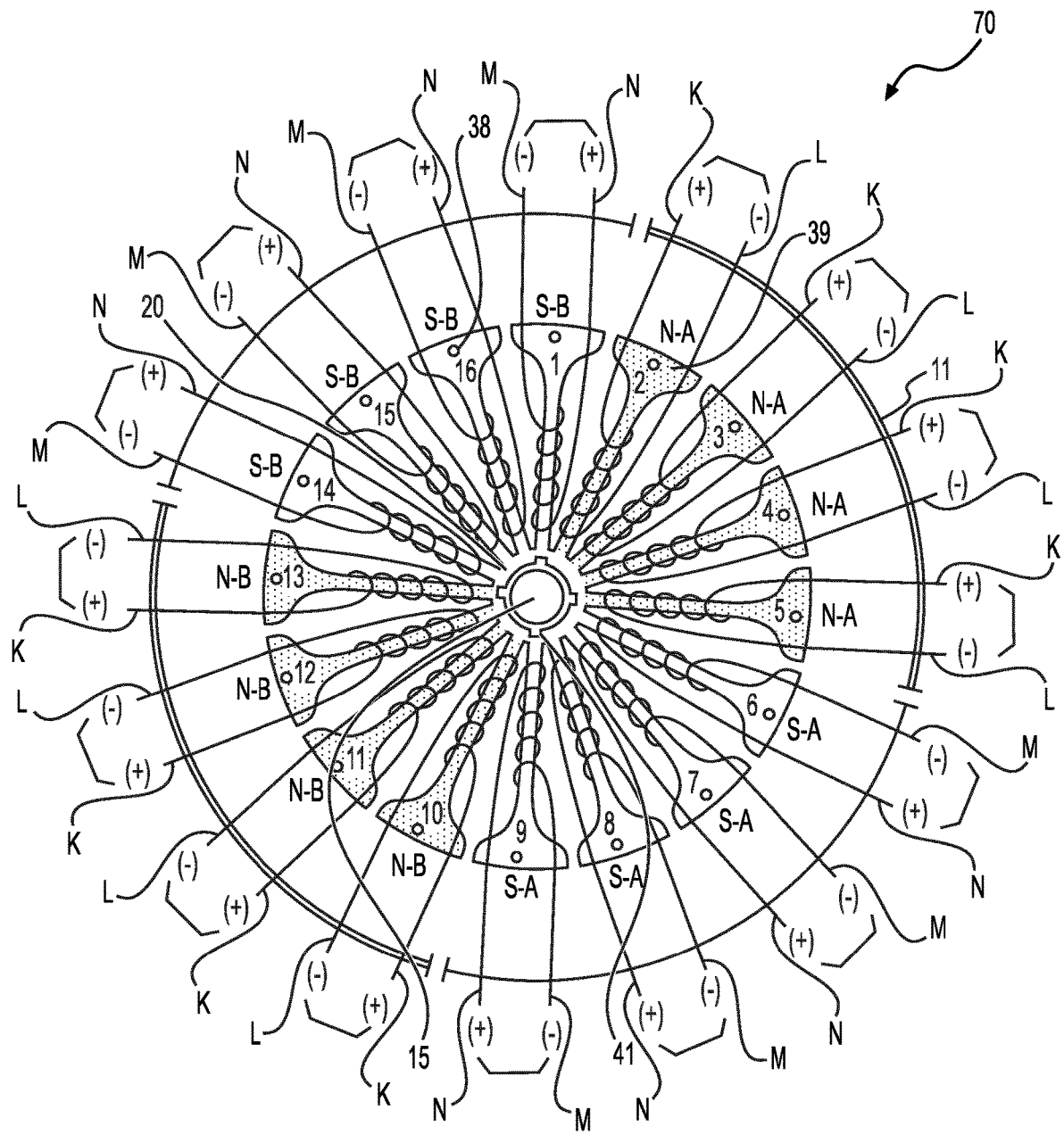
FIG. 6 is a diagram illustrating an end view of an exemplary solid state rotor with pole windings and excitation polarity sequencing circuits demonstrated for all 16 salient poles through a four-pole, 60 Hz cycle—pulse #2, consistent with embodiments of the present disclosure.

FIG. 6 is a diagram illustrating an end view of an exemplary solid state rotor 70 with pole windings and excitation polarity sequencing circuits demonstrated for all 16 salient poles through a four-pole, 60 Hz cycle—pulse #2, consistent with embodiments of the present disclosure. Rotor 70 reveals an end laminate 20 and retention bolt holes 38. FIG. 6 is a depiction of a four-pole rotor in a static state view of an excitation cycle of the salient poles which generates the rotating poles. Salient poles 39 are numbered 1-16. In this pulse #2 of a 16 step rotation of the discreet magnetic poles, mu metal ring 41 and shaft 15 are also revealed. The 4 magnetic poles are labeled: north pole #1 is labeled N-A (salient poles 2-5), south pole #1 is labeled S-A (salient poles 6-9), north pole #2 is labeled N-B (salient poles 10-13), and south pole #2 is labeled S-B (salient poles 14-16 and 1). Like FIG. 5, each magnetic rotor pole in FIG. 6 also consists of four electrically excited salient pole pieces wound with a suitable conductor, such as magnet wire. However, these pole groups have rotated clockwise by one pole, compared to their positions in FIG. 5. For example, the first magnetic pole group now includes rotor poles 2-5, the second magnetic pole group now includes rotor poles 6-9, the third magnetic pole group now includes rotor poles 10-13, and the fourth magnetic pole group now includes rotor poles 14-16 and 1. Among these groups, rotor poles with N-A and N-B polarities (i.e., rotor poles 2-5 and 10-13) are excited through the north pole wound magnet wire leads K–L, and rotor poles with S-A and S-B polarities (rotor groups 6-9 and 14-46 and 1) are excited through the south pole wound magnet wire leads M–N, where, K (+), L (−), M (−) and N (+). These excitation leads are sequentially excited similarly as described in connection with FIG. 5, except the polarity groups have shifted by one rotor pole.

Figure 7:
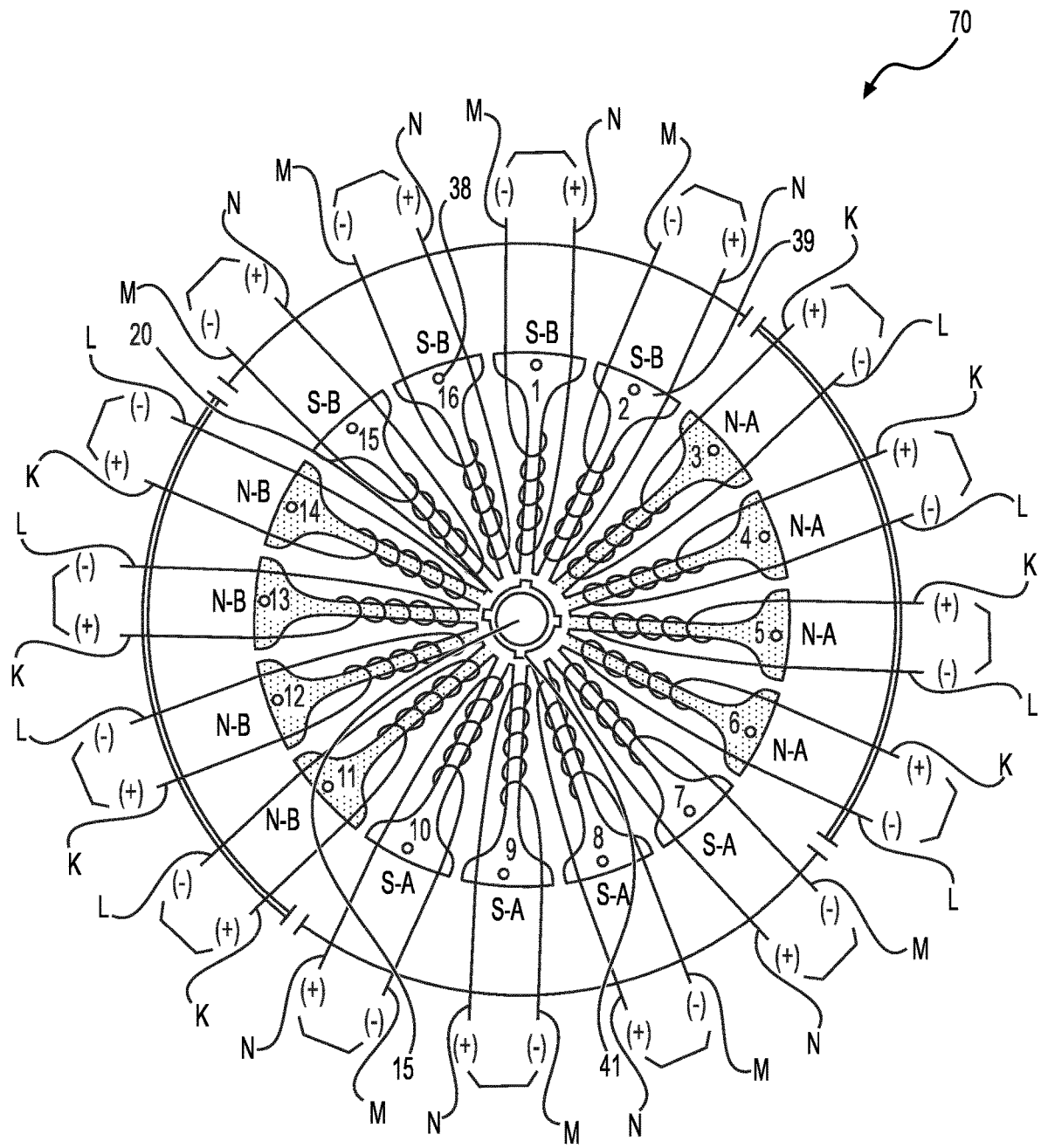
FIG. 7 is a diagram illustrating an end view of an exemplary solid state rotor with pole windings and excitation polarity sequencing circuits demonstrated for all 16 salient poles through a four-pole, 60 Hz cycle—pulse #3, consistent with embodiments of the present disclosure.

FIG. 7 is a diagram illustrating an end view of an exemplary solid state rotor 70 with pole windings and excitation polarity sequencing circuits demonstrated for all 16 salient poles through a four-pole, 60 Hz cycle—pulse #3, consistent with embodiments of the present disclosure. Rotor 70 reveals an end laminate 20 and retention bolt holes 38. FIG. 7 is a depiction of a four-pole rotor in a static state view of an excitation cycle of the salient poles which generates the rotating poles. The salient poles 39 are numbered 1-16. This is pulse #3 of a 16 step rotation of the four discrete magnetic poles. The mu metal ring 41 and shaft 15 are also revealed. The magnetic poles are labeled: North #1 is labeled N-A (salient poles 3-6), south pole #1 is labeled S-A (salient poles 7-10), north pole #2 is labeled N-B (salient poles 11-14), and south pole #2 is labeled S-B (salient poles 15-16 and 1-2). Each magnetic r pole group consists of four electrically excited salient pole pieces wound with magnet wire. The north pole wound magnetic wire leads are expressed as K–L and south pole wound magnetic wire leads are expressed as M–N, with K (+) and L (−) M (−) and N (+). The excitation leads are sequentially excited as in FIG. 5, except the polarity groups have shifted by two rotor poles.

Figure 8:
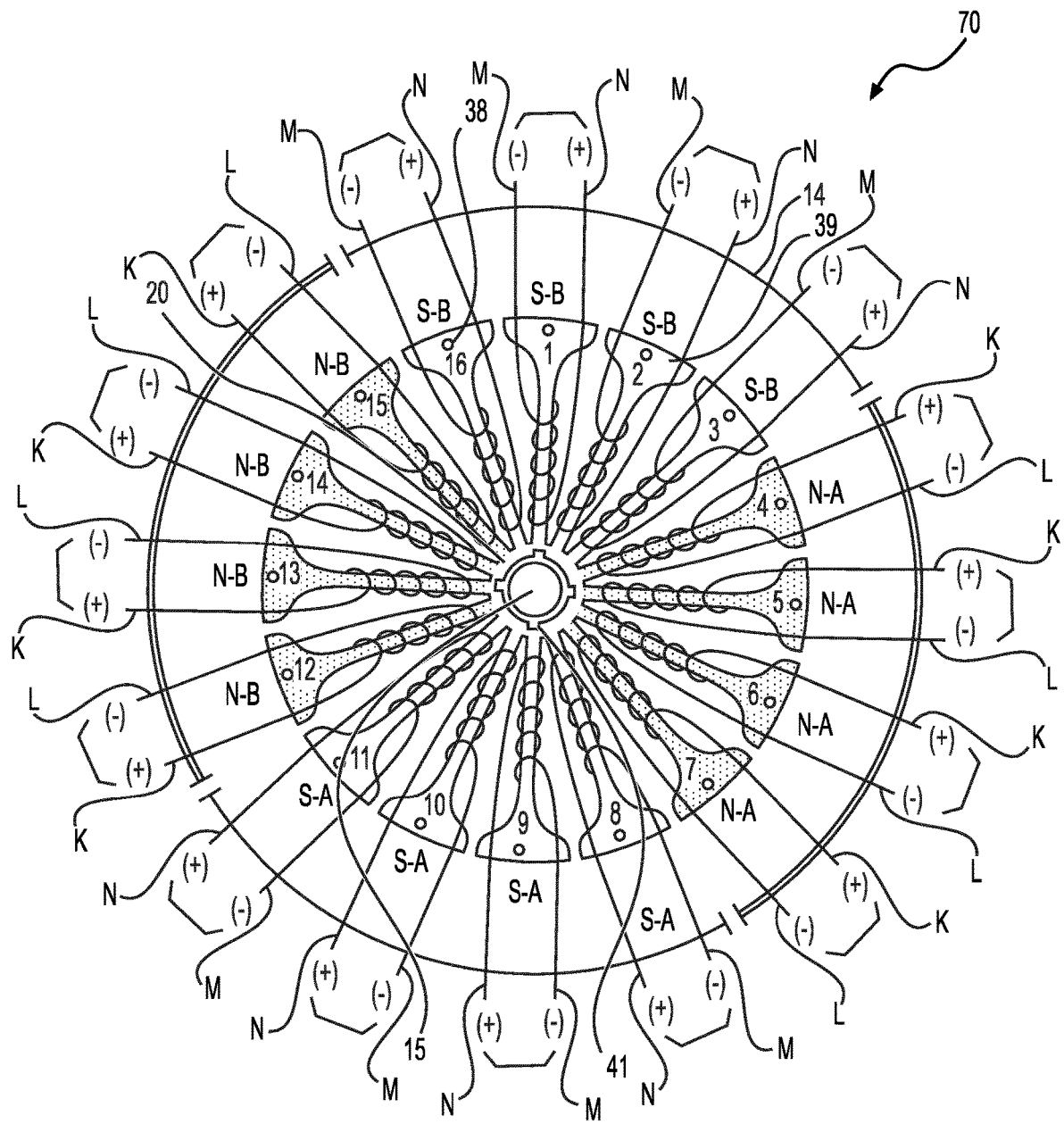
FIG. 8 is a diagram illustrating an end view of an exemplary solid state rotor with pole windings and excitation polarity sequencing circuits demonstrated for all 16 salient poles through a four-pole, 60 Hz cycle—pulse #4, consistent with embodiments of the present disclosure.

FIG. 8 is a diagram illustrating an end view of an exemplary solid state rotor 70 with pole windings and excitation polarity sequencing circuits demonstrated for all 16 salient poles through a four-pole, 60 Hz cycle—pulse #4, consistent with embodiments of the present disclosure. Rotor 70 reveals an end laminate 20 and retention bolt holes 38. FIG. 8 is a depiction of a four-pole rotor in a static state view of an excitation cycle of the salient poles which generates the rotating poles. The salient poles 39 are numbered 1-16. This depicts pulse #4 of a 16 step rotation of the four discrete magnetic poles involving 360° of rotation. The mu metal ring 41 and shaft 15 are also revealed. The four magnetic poles are labeled: North pole #1 is labeled N-A (salient poles 4-7), south pole #1 is labeled S-A (salient poles 8-north pole #2 is labeled N-B (salient poles 12-15), and south pole #2 is labeled S-B (salient poles 16 and 1-3). Each magnetic rotor pole consists of four electrically excited salient pole pieces wound with magnet wire. The north pole wound magnet wire leads are expressed as K–L, and south pole wound magnet wire leads are expressed as M–N, with K (+), L (−), M (−) and N (+). These excitation leads are sequentially excited similarly as in FIG. 5, except the polarity groups have shifted by three rotor poles.

Figure 9:
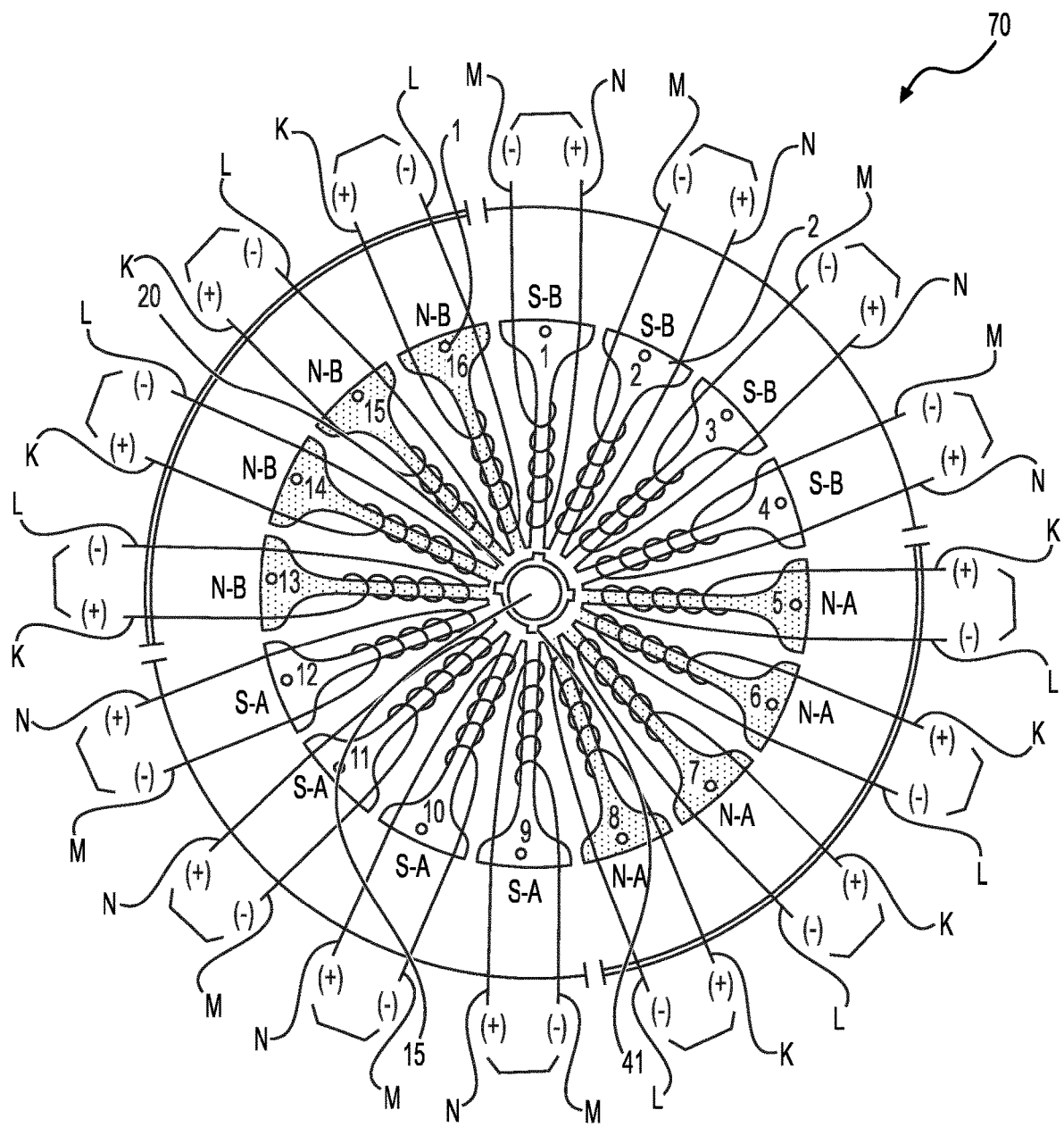
FIG. 9 is a diagram illustrating an end view of an exemplary solid state rotor with pole windings and excitation polarity sequencing circuits demonstrated for all 16 salient poles through a four-pole, 60 Hz cycle—pulse #5, consistent with embodiments of the present disclosure.

FIG. 9 is a diagram illustrating an end view of an exemplary solid state rotor 70 with pole windings and excitation polarity sequencing circuits demonstrated for all 16 salient poles through a four-pole, 60 Hz cycle—pulse #5, consistent with embodiments of the present disclosure. Rotor 70 reveals an end laminate 20 and retention bolt holes 38. FIG. 9 is a depiction of a four-pole rotor in a static state view of an excitation cycle of the salient poles which generates the rotating poles. The salient poles 39 are numbered 1-16. This depicts pulse #5 of a 16 step rotation of the discrete magnetic pole involving 360° of rotation. The mu metal ring 41 and shaft 15 are also revealed. The 4 magnetic poles are labeled: North pole #1 is labeled N-A (salient poles 5-8), south pole #1 is labeled S-A (salient poles 9-12), north pole #2 is labeled N-B (salient poles 13-16), and south pole #2 is labeled S-B (salient poles 1-4). Each magnetic rotor pole consists of four electrically excited salient pole pieces wound with magnet wire. The north pole wound magnet wire leads are expressed as K–L and south pole wound magnet wire leads are expressed as M–N, with K (+), L (−), M (−) and N (+). These excitation leads are sequentially excited as in FIG. 5, except the polarity groups have shifted by four rotor poles.

Figure 10:
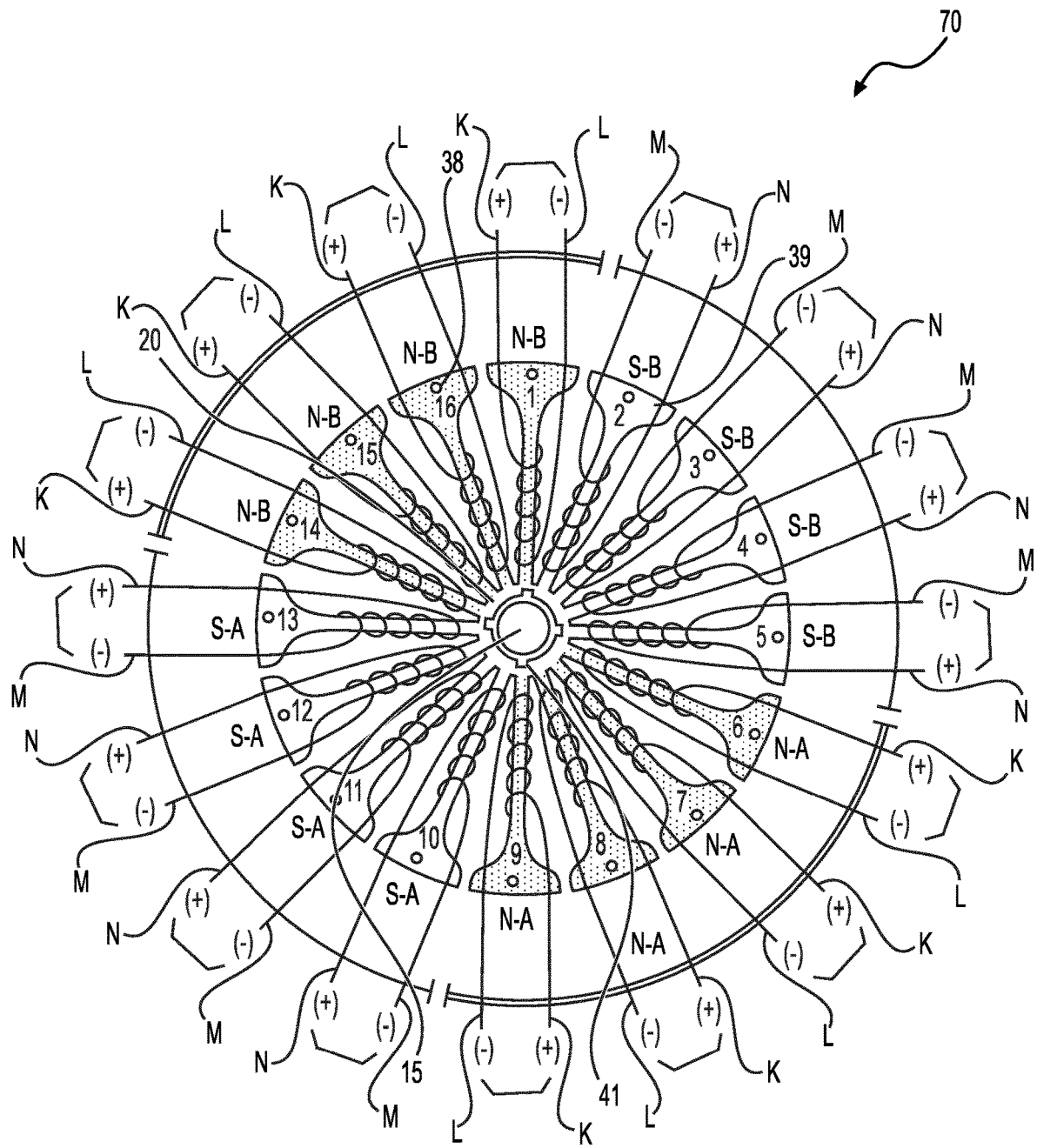
FIG. 10 is a diagram illustrating an end view of an exemplary solid state rotor with pole windings and excitation polarity sequencing circuits demonstrated for all 16 salient poles through a four-pole, 60 Hz cycle—pulse #6, consistent with embodiments of the present disclosure.

FIG. 10 is a diagram illustrating an end view of an exemplary solid state rotor 70 with pole windings and excitation polarity sequencing circuits demonstrated for all 16 salient poles through a four-pole, 60 Hz cycle—pulse #6, consistent with embodiments of the present disclosure. Rotor 70 reveals an end laminate 20 and retention bolt holes 38. FIG. 10 is a depiction of a four-pole rotor in a static view of an excitation cycle of the salient pole which generates the rotating poles. The salient poles 39 are numbered 1-16. This depicts pulse #6 of a 16 step generation and rotation of the four discrete magnetic poles involving 360° of rotation and two cycles of 60 Hz current. The mu metal ring 41 and shaft 15 are also revealed. The 4 magnetic poles are labeled: North pole #1 is labeled N-A (salient poles 6-9), south pole #1 is labeled S-A (salient poles 10-13), north pole #2 is labeled N-B (salient poles 14-16 and 1), and south pole #2 is labeled S-B (salient poles 2-5). Each magnetic rotor pole consists of four electrically excited salient pole pieces wound with magnet wire. The north pole wound magnet wire leads are expressed as K–L, and south pole wound magnet wire leads are expressed as M–N, with K (+), L (−), M (−) and N (+). These excitation leads are sequentially excited as in FIG. 5, except the polarity groups have shifted by five rotor poles.

Figure 11:
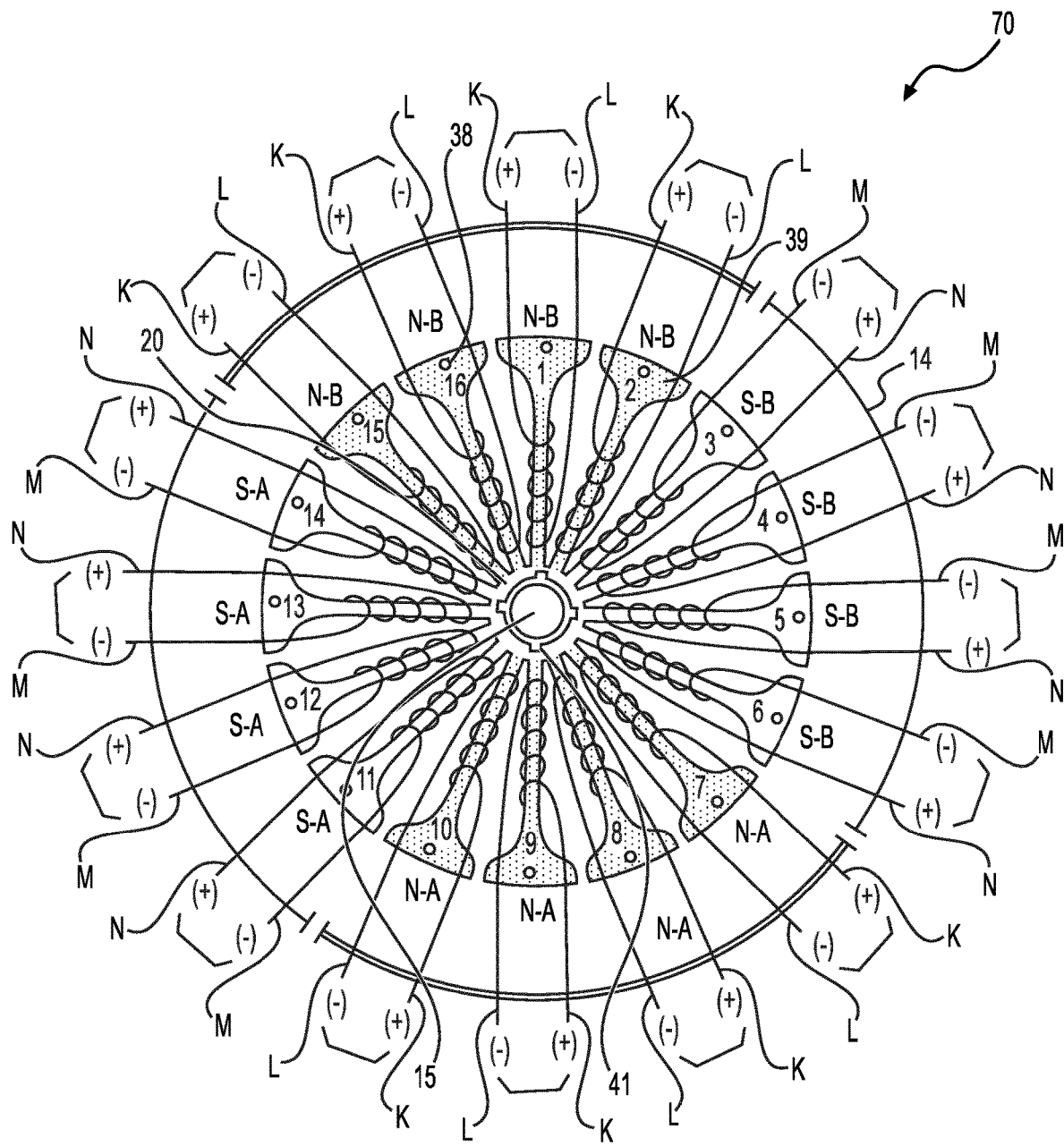
FIG. 11 is a diagram illustrating an end view of an exemplary solid state rotor with pole windings and excitation polarity sequencing circuits demonstrated for all 16 salient poles through a four-pole, 60 Hz cycle—pulse #7, consistent with embodiments of the present disclosure.

FIG. 11 is a diagram illustrating an end view of an exemplary solid state rotor 70 with pole windings and excitation polarity sequencing circuits demonstrated for all 16 salient poles through a four-pole, 60 Hz cycle—pulse #7, consistent with embodiments of the present disclosure. Rotor 70 of the invention reveals an end laminate 20 and retention bolt holes 38. FIG. 11 is a depiction of a four-pole rotor in a static state view of a sequential excitation cycle of the salient poles which generates the rotating magnetic poles. The salient poles 39 are numbered 1-16. FIG. 11 illustrates pulse #7 of a 16 step generation and rotation of the four discrete magnetic poles involving 360° of rotation and two cycles of 60 Hz current. The mu metal ring 41 and shaft 15 are also revealed. The 4 magnetic poles are labeled: North pole #1 is labeled N-A (salient poles 7-10), south pole #1 is labeled S-A (salient poles 11-14), north pole #2 is labeled N-B (salient poles 15-16 and 1-2), and south pole #2 is labeled S-B (salient poles 3-6). Each magnetic rotor pole consists of four electrically excited salient pole pieces wound with magnet wire. The north pole wound magnet wire leads are expressed as K–L and south pole wound magnet wire leads are expressed as M–N, with K (+), L (−), M (−) and N (+). These excitation leads are sequentially excited as in FIG. 5, except the polarity groups have shifted by six rotor poles.

Figure 12:
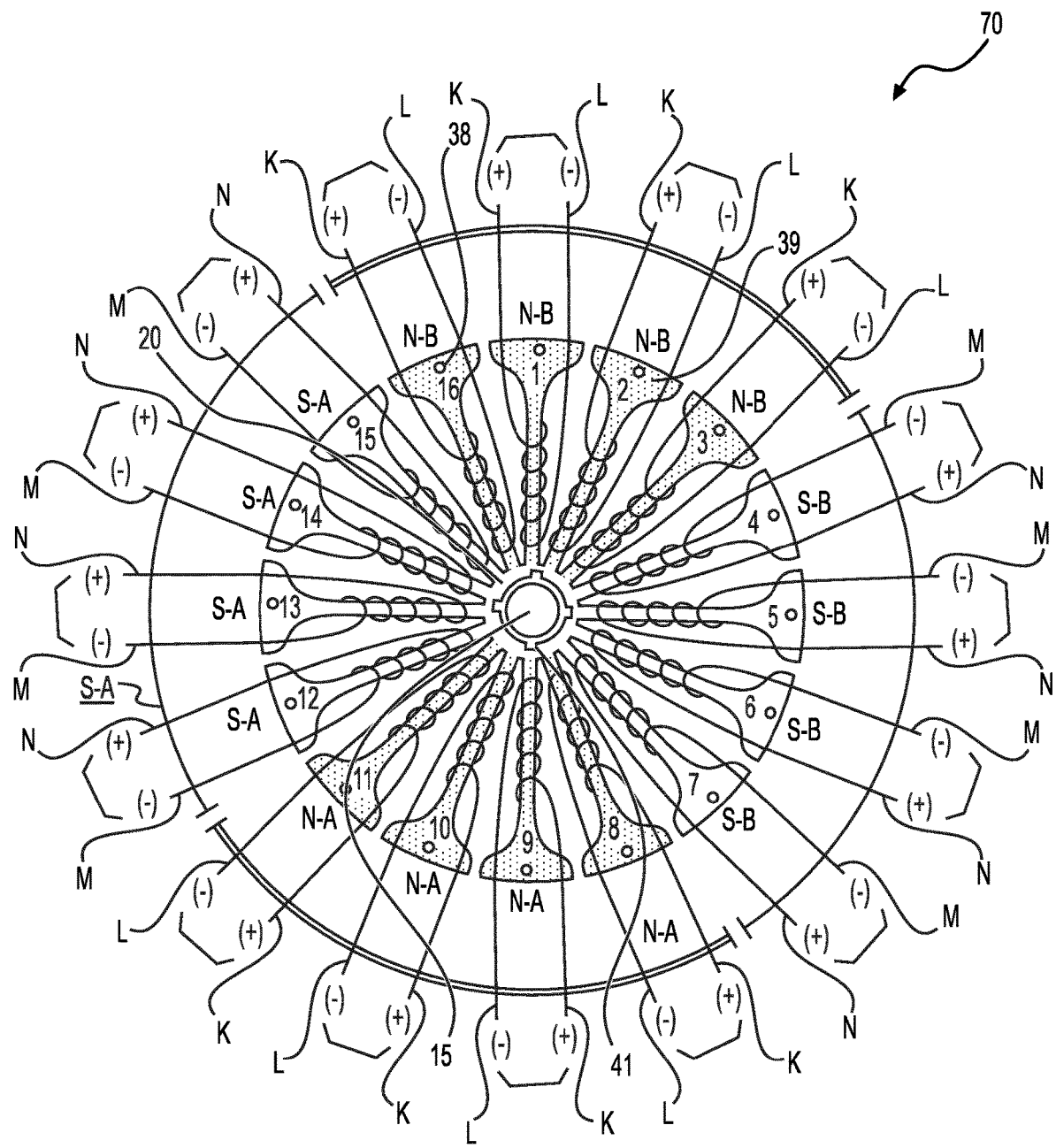
FIG. 12 is a diagram illustrating an end view of an exemplary solid state rotor with pole windings and excitation polarity sequencing circuits demonstrated for all 16 salient poles through a four-pole, 60 Hz cycle—pulse #8, consistent with embodiments of the present disclosure.

FIG. 12 is a diagram illustrating an end view of an exemplary solid state rotor 70 with pole windings and excitation polarity sequencing circuits demonstrated for all 16 salient poles through a four-pole, 60 Hz cycle—pulse #8, consistent with embodiments of the present disclosure. Rotor 70 of the invention reveals an end laminate 20 and retention bolt holes 38. FIG. 12 is a depiction of a four-pole rotor in a static state view of a sequential excitation cycle of the salient poles which generates the rotating magnetic poles. The salient poles 39 are numbered 1-16. FIG. 12 illustrates pulse #8 of a 16 step generation and rotation of the four discrete magnetic poles involving 360° of rotation and two cycles of 60 Hz current. The mu metal ring 41 and shaft 15 are revealed. The 4 magnetic poles are labeled: North pole #1 is labeled N-A (salient poles 8-11), south pole #1 is labeled S-A (salient poles 12-15), north pole #2 is labeled N-B (salient poles 16 and 1-3), and south pole #2 is labeled S-B (salient poles 4-7). Each magnetic rotor pole consists of four electrically excited salient pole pieces wound with magnet wire. The north pole wound magnet wire leads are expressed as K–L, and south pole wound magnet wire leads are expressed as M–N, with K(+), L (−), M (−) and N (+). These excitation leads are sequentially excited as in FIG. 8, except the polarity groups have shifted by seven rotor poles.

Figure 13:
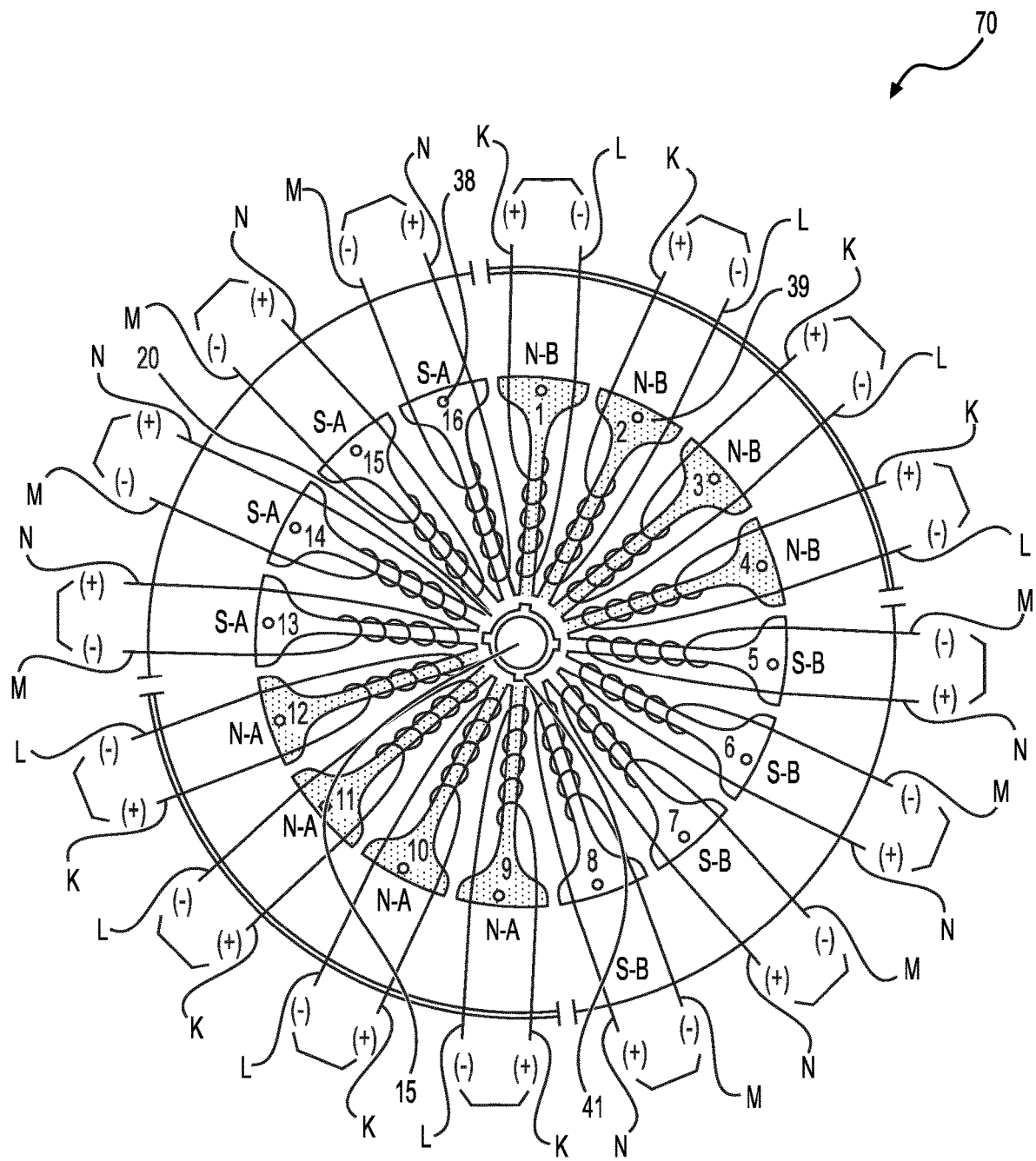
FIG. 13 is a diagram illustrating an end view of an exemplary solid state rotor with pole windings and excitation polarity sequencing circuits demonstrated for all 16 salient poles through a four-pole, 60 Hz cycle—pulse #9, consistent with embodiments of the present disclosure.

FIG. 13 is a diagram illustrating an end view of an exemplary solid state rotor 70 with pole windings and excitation polarity sequencing circuits demonstrated for all 16 salient poles through a four-pole, 60 Hz cycle—pulse #9, consistent with embodiments of the present disclosure. Rotor 70 reveals an end laminate 20 and retention bolt holes 38. FIG. 13 is a depiction of a four-pole rotor in a static state view of a sequential excitation cycle of the salient poles which generates rotating magnetic poles. The salient poles 39 are numbered 1-16. FIG. 13 illustrates pulse #9 of a 16 step generation and rotation of the four discrete magnetic poles involving 360° of rotation and two cycles of 60 Hz current. The mu metal ring 41 and shaft 15 are also revealed. The 4 magnetic poles are labeled: North pole #1 is labeled N-A (salient poles 9-12), south pole #1 is labeled S-A (salient poles 13-16), north pole #2 is labeled N-B (salient poles 1-4), and south pole #2 is labeled S-B (salient poles 5-8). Each magnetic rotor pole consists of four electrically excited salient pole pieces wound with magnet wire. The north pole wound magnet wire leads are expressed as K–L, and south pole wound magnet wire leads are expressed as M–N, with K (+), L (−), M (−) and N (+). These excitation leads are sequentially excited as in FIG. 5, except the polarity groups have shifted by eight rotor poles.

Figure 14:
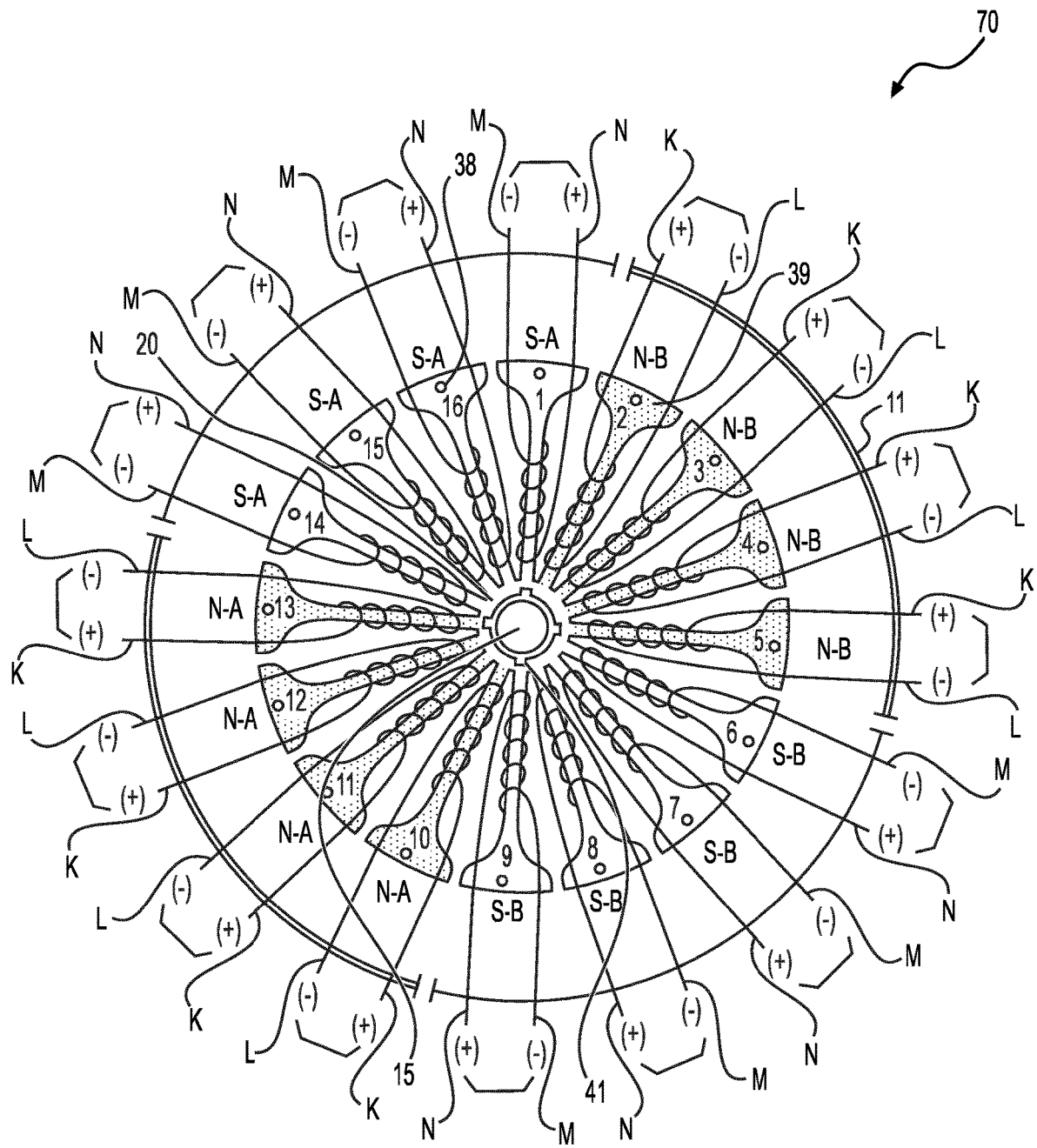
FIG. 14 is a diagram illustrating an end view of an exemplary solid state rotor with pole windings and excitation polarity sequencing circuits demonstrated for all 16 salient poles through a four-pole, 60 Hz cycle—pulse #10, consistent with embodiments of the present disclosure.

FIG. 14 is a diagram illustrating an end view of an exemplary solid state rotor 70 with pole windings and excitation polarity sequencing circuits demonstrated for all 16 salient poles through a four-pole, 60 Hz cycle—pulse #10, consistent with embodiments of the present disclosure. Rotor 70 reveals an end laminate 20 and retention bolt holes 38. FIG. 14 is a depiction of a four-pole rotor in a static state view of a sequential excitation cycle of the salient poles which generates the rotating magnetic poles. The salient poles 39 are numbered 1-16. FIG. 14 illustrates pulse #10 of a 16 step generation and rotation of the four discrete magnetic poles involving 360° of rotation and two cycles of 60 Hz current. The mu metal ring 41 and shaft 15 are also revealed. The 4 magnetic poles are labeled: North pole #1 is labeled N-A (salient poles 10-13), south pole #1 is labeled S-A (salient poles 14-16 and 1), north pole #2 is labeled N-B (salient poles 2-5), and south pole #2 is labeled S-B (salient poles 6-9). Each magnetic rotor pole consists of four electrically excited salient pole pieces wound with magnet wire. The north pole wound magnet wire leads are expressed as K–L, and south pole wound magnet wire leads are expressed as M–N, with K (+), L (−), M (−) and N (+). These excitation leads are sequentially excited as in FIG. 5, except the polarity groups have shifted by nine rotor poles.

Figure 15:
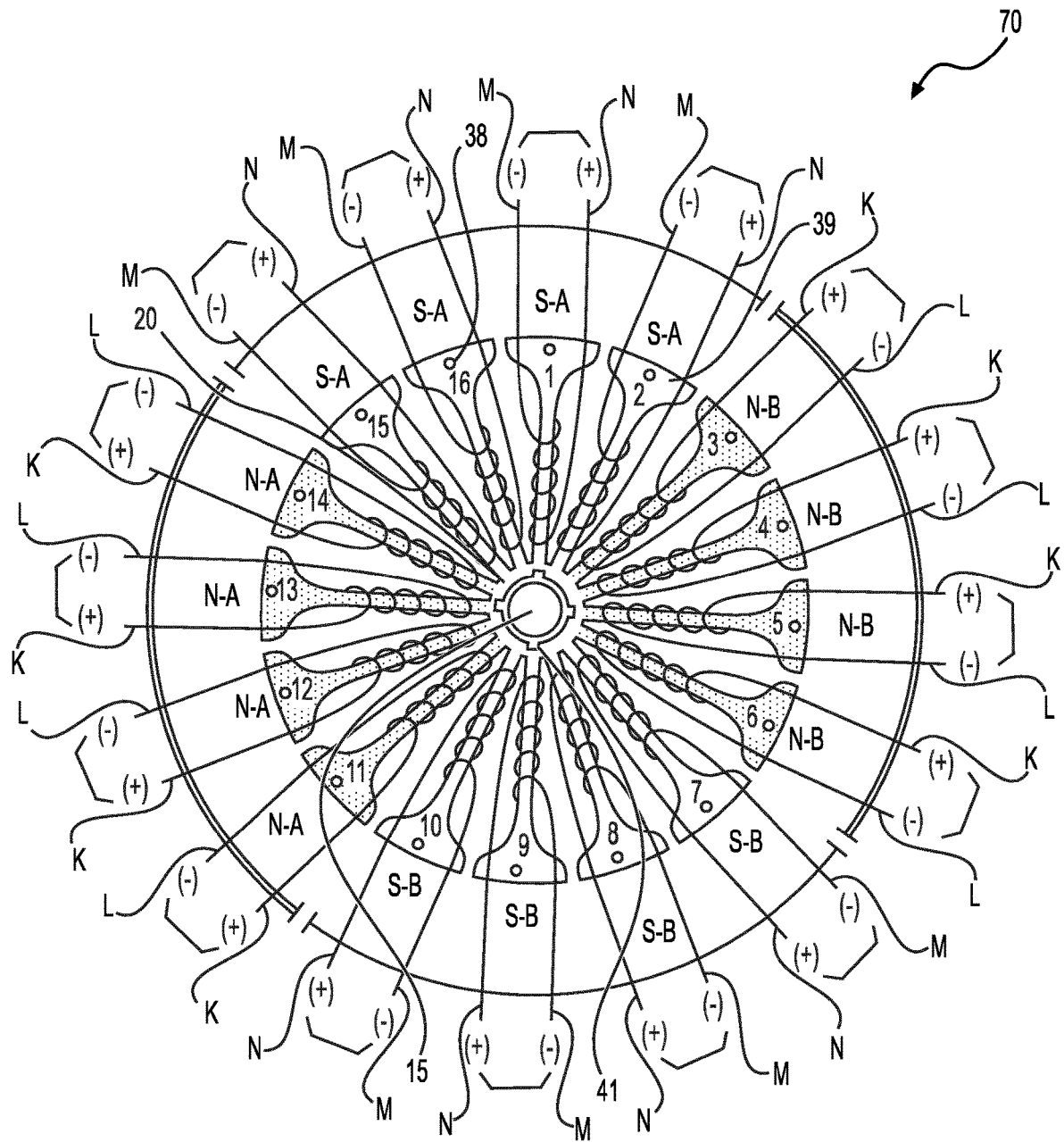
FIG. 15 is a diagram illustrating an end view of an exemplary solid state rotor with pole windings and excitation polarity sequencing circuits demonstrated for all 16 salient poles through a four-pole, 60 Hz cycle—pulse #11, consistent with embodiments of the present disclosure.

FIG. 15 is a diagram illustrating an end view of an exemplary solid state rotor 70 with pole windings and excitation polarity sequencing circuits demonstrated for all 16 salient poles through a four-pole, 60 Hz cycle—pulse #11, consistent with embodiments of the present disclosure. Rotor 70 reveals an end laminate 20 and retention bolt holes 38. FIG. 15 is a depiction of a four-pole rotor in a static state view of a sequential excitation cycle of the salient poles which generates the rotating magnetic poles. The salient poles 39 are numbered 1-16. FIG. 15 illustrates pulse #11 of a 16 step generation and rotation of the four discrete magnetic poles involving 360° of rotation and two cycles of 60 Hz current. The mu metal ring 41 and shaft 15 are also revealed. The 4 magnetic poles are labeled: North pole #1 is labeled N-A (salient poles 11-14), south pole #1 is labeled S-A (salient poles 15-16 and 1-2), north pole #2 is labeled N-B (salient poles 3-6), and south pole #2 is labeled S-B (salient poles 7-10). Each magnetic rotor pole consists of four electrically excited salient pole pieces wound with magnet wire. The north pole wound magnet wire leads are expressed as K–L, and south pole wound magnet wire leads are expressed as M–N, with K (+), L (−), M (−) and N (+). These excitation leads are sequentially excited as in FIG. 5, except the polarity groups have shifted by ten rotor poles.

Figure 16:
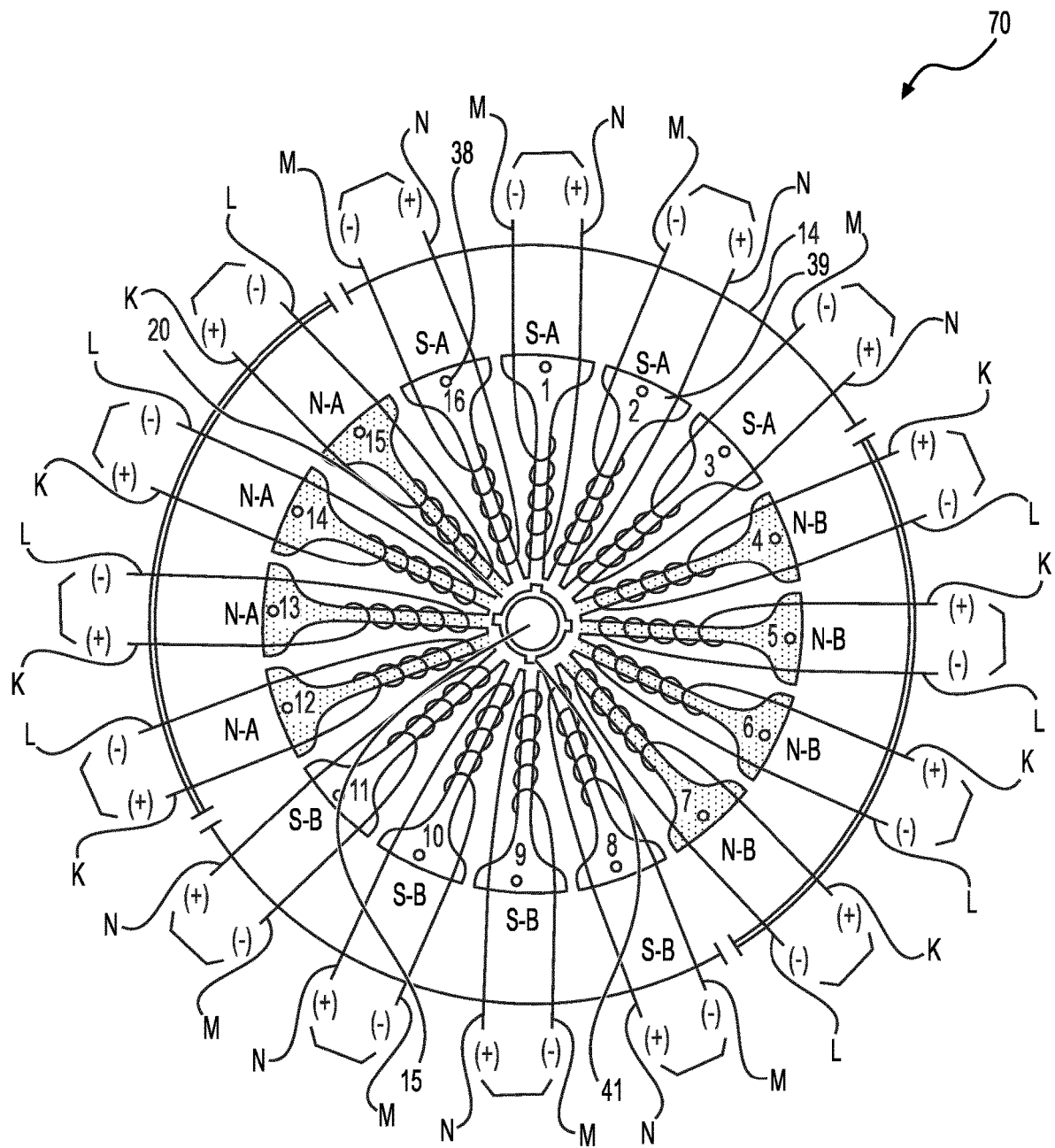
FIG. 16 is a diagram illustrating an end view of an exemplary solid state rotor with pole windings and excitation polarity sequencing circuits demonstrated for all 16 salient poles through a four-pole, 60 Hz cycle—pulse #12, consistent with embodiments of the present disclosure.

FIG. 16 is a diagram illustrating an end view of an exemplary solid state rotor 70 with pole windings and excitation polarity sequencing circuits demonstrated for all 16 salient poles through a four-pole, 60 Hz cycle—pulse #12, consistent with embodiments of the present disclosure. Rotor 70 reveals an end laminate 20 and retention bolt holes 38. FIG. 16 is a depiction of a four-pole rotor in a static state view of a sequential excitation cycle of the salient poles which generates the rotating magnetic poles. The salient poles 39 are numbered 1-16. FIG. 16 illustrates pulse #12 of a 16 step generation and rotation of the four discrete magnetic poles involving 360° of rotation and two cycles of 60 Hz current. The mu metal ring 41 and shaft 15 are also revealed. The 4 magnetic poles are labeled: North pole #1 is labeled N-A (salient poles 12-15), south pole #1 is labeled S-A (salient poles 16 and 1-3), north pole #2 is labeled N-B (salient poles 4-7), and south pole #2 is labeled S-B (salient poles 8-11). Each magnetic rotor pole consists of four electrically excited salient pole pieces wound with magnet wire. The north pole wound magnet wire leads are expressed as K–L, and south pole wound magnet wire leads are expressed as M–N, with K (+), (−), M (−) and N (+). These excitation leads are sequentially excited as in FIG. 5, except the polarity groups have shifted by eleven rotor poles.

Figure 17:
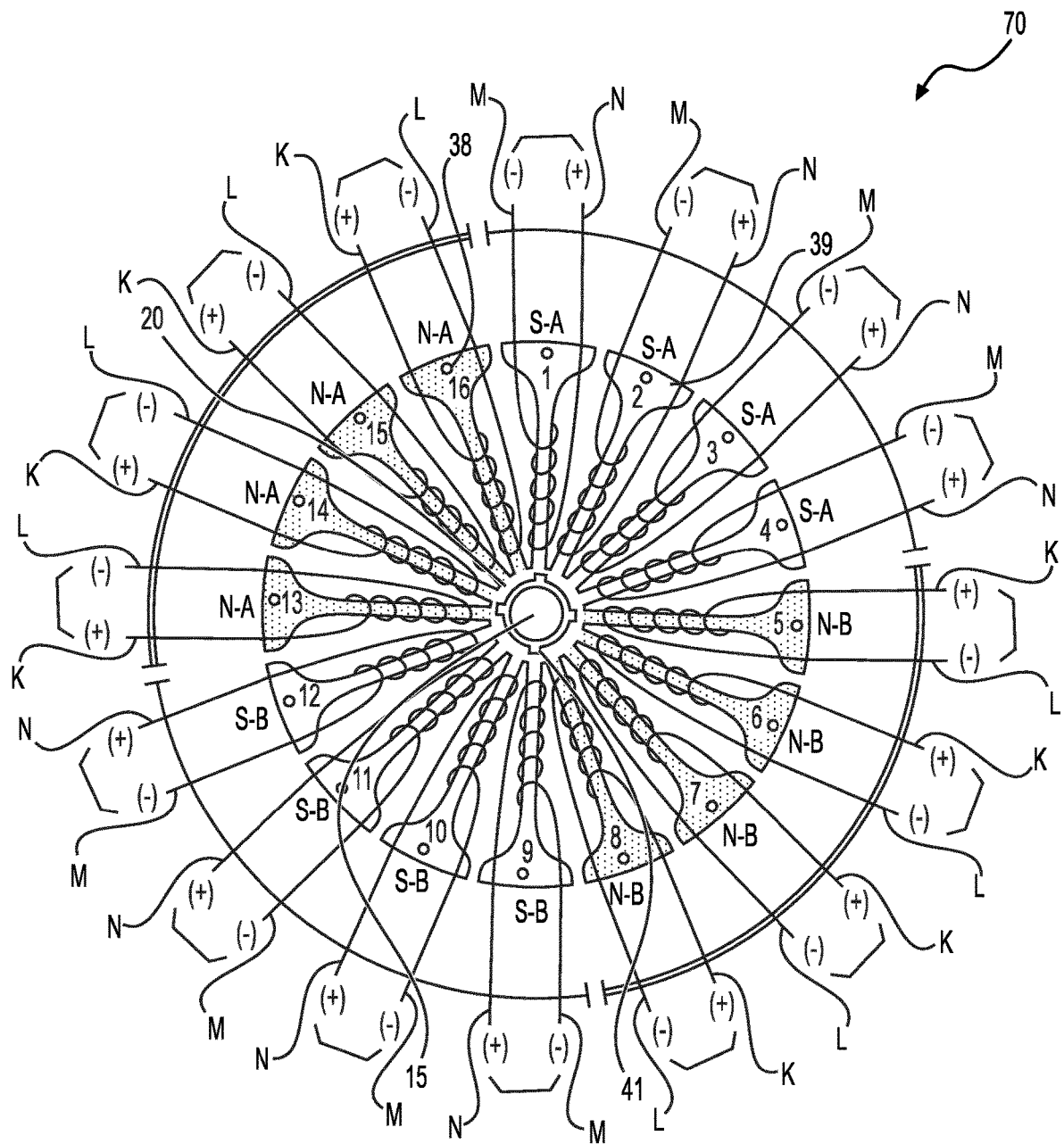
FIG. 17 is a diagram illustrating an end view of an exemplary solid state rotor with pole windings and excitation polarity sequencing circuits demonstrated for all 16 salient poles through a four-pole, 60 Hz cycle—pulse #13, consistent with embodiments of the present disclosure.
Figure 19:
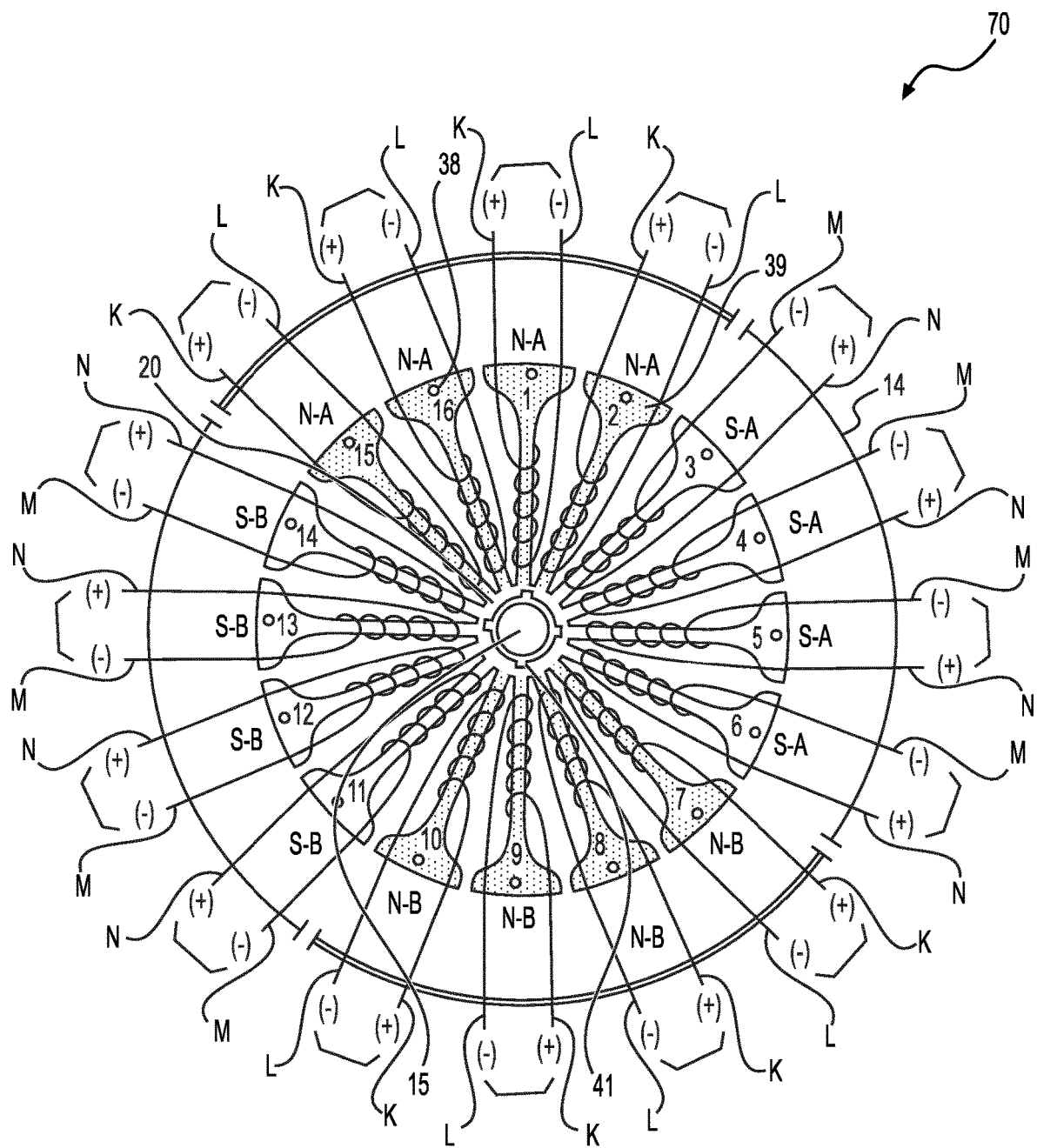
FIG. 19 is a diagram illustrating an end view of an exemplary solid state rotor with pole windings and excitation polarity sequencing circuits demonstrated for all 16 salient poles through a four-pole, 60 Hz cycle—pulse #15, consistent with embodiments of the present disclosure.

FIG. 17 is a diagram illustrating an end view of an exemplary solid state rotor 70 with pole windings and excitation polarity sequencing circuits demonstrated for all 16 salient poles through a four-pole, 60 Hz cycle—pulse #13, consistent with embodiments of the present disclosure. Rotor 70 reveals an end laminate 20 and retention bolt holes 38. FIG. 17 is a depiction of a four-pole rotor in a static state view of a sequential excitation cycle of the salient poles which generates the rotating magnetic poles. The salient poles 39 are numbered 1-16. FIG. 19 illustrates pulse #13 of a 16 step generation and rotation of the four discrete magnetic poles involving 360° of rotation and two cycles of 60 Hz current. The mu metal ring 41 and shaft 15 are also revealed. The 4 magnetic poles are labeled: North pole #1 is labeled N-A (salient poles 13-16), south pole #1 is labeled S-A (salient poles 1-4), north pole #2 is labeled N-B (salient poles 5-8), and south pole #2 is labeled S-B (salient poles 9-12). Each magnetic rotor pole consists of four electrically excited salient pole pieces wound with magnet wire. The north pole wound magnet wire leads are expressed as K–L, and south pole wound magnet wire leads are expressed as M–N, with K (+), L (−), M (−) and N (+). These excitation leads are sequentially excited as in FIG. 5, except the polarity groups have shifted by twelve rotor poles.

Figure 18:
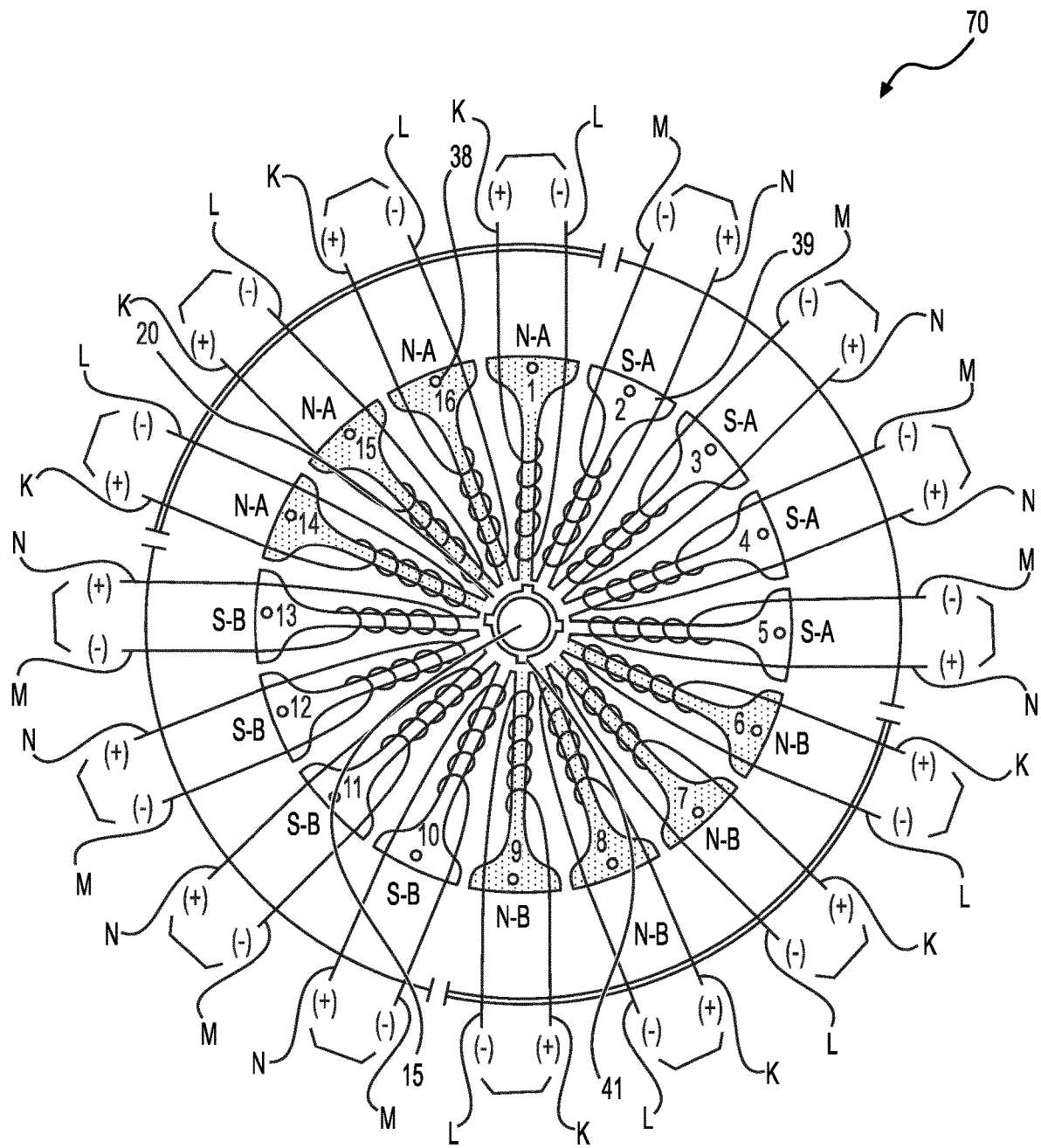
FIG. 18 is a diagram illustrating an end view of an exemplary solid state rotor with pole windings and excitation polarity sequencing circuits demonstrated for all 16 salient poles through a four-pole, 60 Hz•cycle—pulse #14, consistent with embodiments of the present disclosure.

FIG. 18 is a diagram illustrating an end view of an exemplary solid state rotor 70 with pole windings and excitation polarity sequencing circuits demonstrated for all 16 salient poles through a four-pole, 60 Hz cycle—pulse #14, consistent with embodiments of the present disclosure. Rotor 70 reveals an end laminate 20 and retention bolt holes 38. FIG. 18 is a depiction of a four-pole rotor in a static state view of a sequential excitation cycle of the salient poles which generates the rotating magnetic poles. The salient poles 39 are numbered 1-16. FIG. 18 illustrates pulse #14 of a 16 step generation and rotation of the four discrete magnetic poles involving 360° of rotation and two cycles of 60 Hz current. The mu metal ring 41 and shaft 15 are also revealed. The 4 magnetic poles are labeled: North pole #1 is labeled N-A (salient poles 14-16 and 1), south pole #1 is labeled S-A (salient poles 2-5), north pole #2 is labeled N-B (salient poles 6-9), and south pole #2 is labeled S-B (salient poles 10-13). Each magnetic rotor pole consists of four electrically excited salient pole pieces wound with magnet wire. The north pole wound magnet wire leads are expressed as K–L, and south pole wound magnet wire leads are expressed as M–N, with K (+), L(−), M (−) and N (+). These excitation leads are sequentially excited as in FIG. 5, except the polarity groups have shifted by thirteen rotor poles.

FIG. 19 is a diagram illustrating an end view of an exemplary solid state rotor 70 with pole windings and excitation polarity sequencing circuits demonstrated for all 16 salient poles through a four-pole, 60 Hz cycle—pulse #15, consistent with embodiments of the present disclosure. Rotor 70 reveals an end laminate 20 and retention bolt holes 38. FIG. 19 is a depiction of a four-pole rotor in a static state view of a sequential excitation cycle of the salient poles which generates the rotating magnetic poles. The salient poles 39 are numbered 1-16. FIG. 19 illustrates pulse #15 of a 16 step generation and rotation of the four discrete magnetic poles involving 360° of rotation and two cycles of 60 Hz current. The mu metal ring 41 and shaft 15 are also revealed. The 4 magnetic poles are labeled: North pole #1 is labeled N-A (salient poles 15-16 and 1-2), south pole #1 is labeled S-A (salient poles 3-6), north pole #2 is labeled N-B (salient poles 7-10), and south pole #2 is labeled S-B (salient poles 11-14). Each magnetic rotor pole consists of four electrically excited salient pole pieces wound with magnet wire. The north pole wound magnet wire leads are expressed as K–L, and south pole wound magnet wire leads are expressed as M–N, with K (+), L (−), M (−) and N (+). These excitation leads are sequentially excited as in FIG. 5, except the polarity groups have shifted by fourteen rotor poles.

Figure 20:
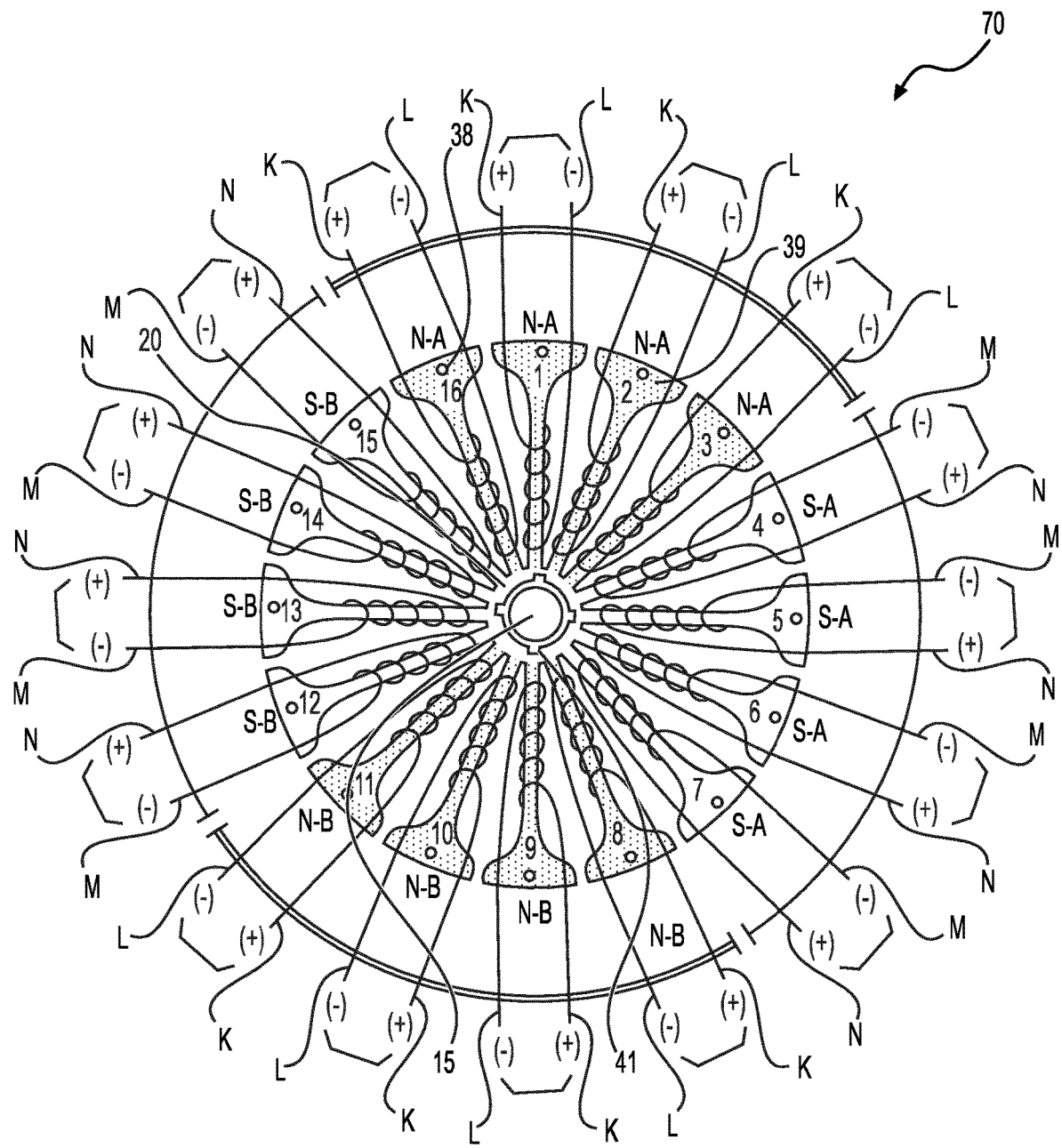
FIG. 20 is a diagram illustrating an end view of an exemplary solid state rotor with pole windings and excitation polarity sequencing circuits demonstrated for all 16 salient poles through a four-pole, 60 Hz cycle—pulse #16, consistent with embodiments of the present disclosure.

FIG. 20 is a diagram illustrating an end view of an exemplary solid state rotor 70 with pole windings and excitation polarity sequencing circuits demonstrated for all 16 salient poles through a four-pole, 60 Hz cycle—pulse #16, consistent with embodiments of the present disclosure. Rotor 70 reveals an end laminate 20 and retention bolts 38. FIG. 20 is a depiction of a four-pole rotor in a static state view of a sequential excitation cycle of the salient poles which generates the rotating magnetic poles. The salient poles 39 are numbered 1-16. FIG. 20 illustrates pulse #16 of a 16 step generation and rotation of the four discrete magnetic poles involving 360° of rotation and two cycles of 60 Hz current. The mu metal ring 41 and shaft 15 are also revealed. The 4 magnetic poles are labeled: North pole #1 is labeled N-A (salient poles 16 and 1-3), south pole #1 is labeled S-A (salient poles 4-87), north pole #2 is labeled N-B (salient poles (8-11), and south pole #2 is labeled S-B (salient poles 12-15). Each magnetic rotor pole consists of four electrically excited salient pole pieces wound with magnet wire. The north pole wound magnet wire leads are expressed as K–L, and south pole wound magnet wire leads are expressed as M–N, with K (+), L (−), M (−) and N (+). These excitation leads are sequentially excited as in FIG. 5, except the polarity groups have shifted by fifteen rotor poles.

Figure 21:
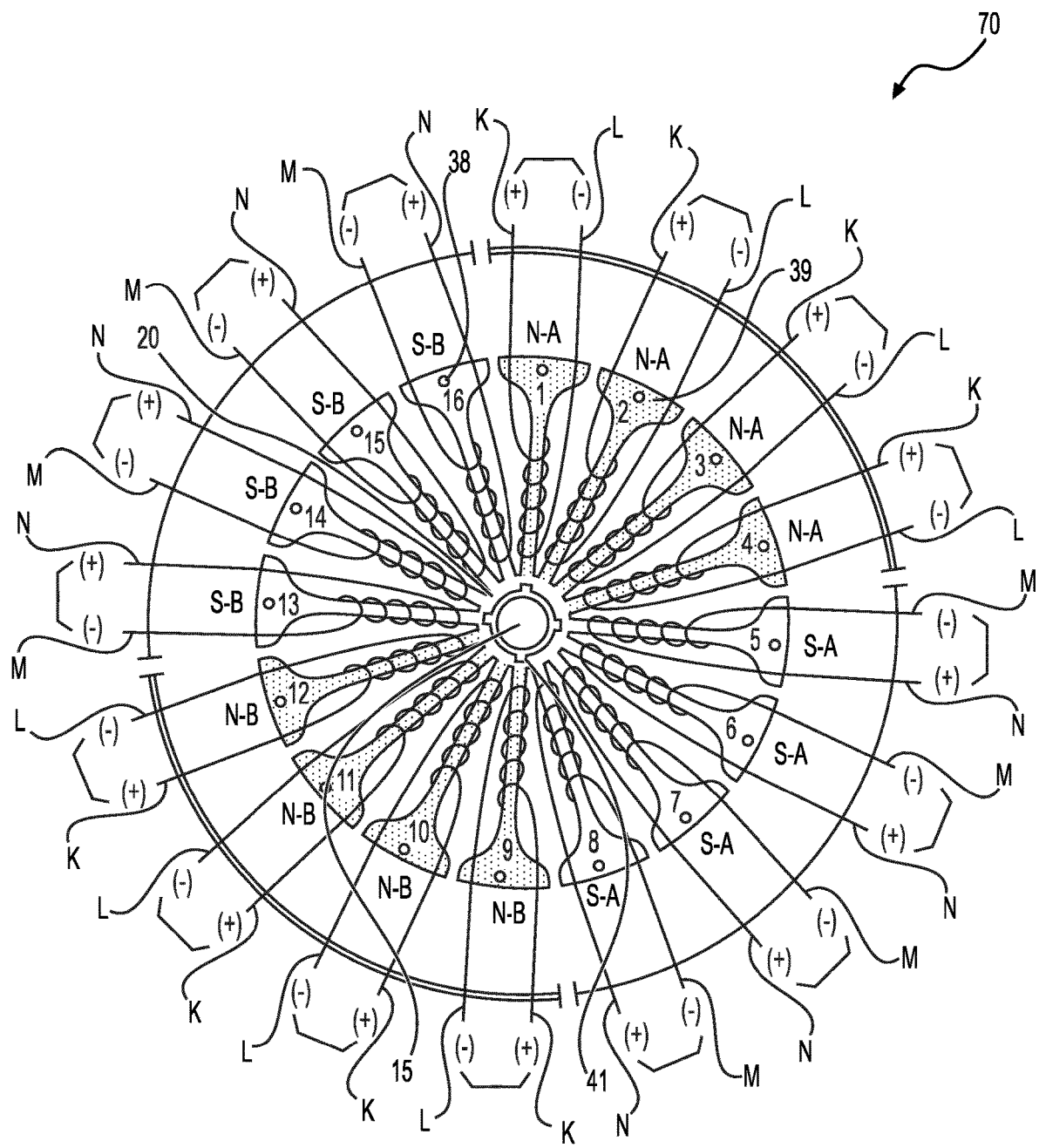
FIG. 21 is a diagram illustrating an end view of an exemplary solid state rotor with pole windings and excitation polarity sequencing circuits demonstrated for all 16 salient poles through a four-pole, 60 Hz cycle—pulse #1, consistent with embodiments of the present disclosure.

FIG. 21 is a diagram illustrating an end view of an exemplary solid state rotor 70 with pole windings and excitation polarity sequencing circuits demonstrated for all 16 salient poles through a four-pole, 60 Hz cycle—pulse #1, consistent with embodiments of the present disclosure and described in FIG. 5.

Figure 22:
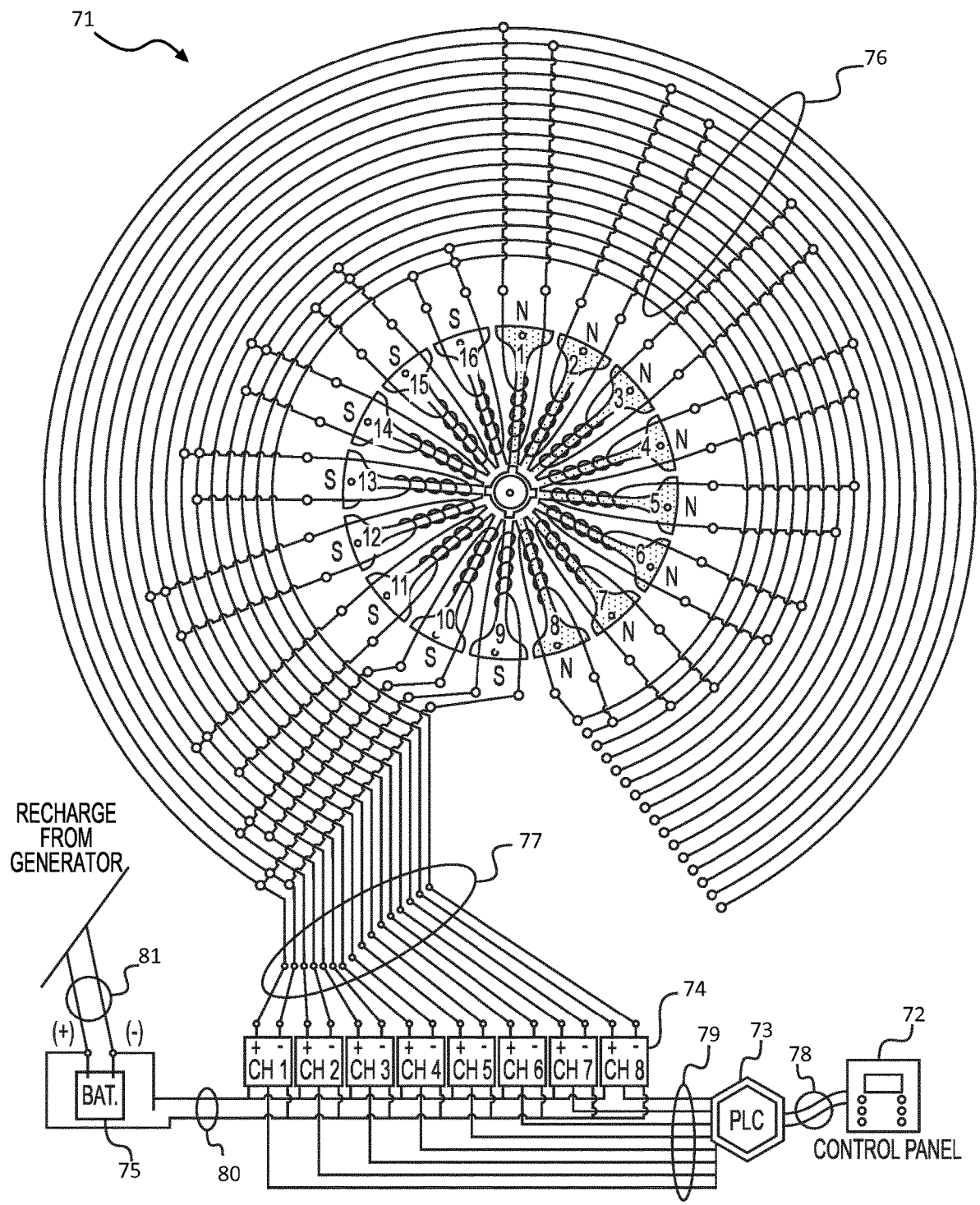
FIG. 22 is a diagram which depicts an exemplary two-pole rotor along with necessary excitation circuit, consistent with embodiments of the present disclosure.

FIG. 22 is a diagram which depicts an exemplary two-pole rotor 71 along with its excitation circuit, consistent with embodiments of the present disclosure. In the case of a two pole magnetic rotor, the salient poles are wired into two groups of 8 salient pole pieces per group. The wound coils of the pole pieces in each group are connected to a circuit from the exciter system. Pole piece #1 (e.g., salient pole 1 in FIG. 5) of the first magnetic pole group (e.g., the N-pole group) is a first polarity, pole piece #1 (e.g., salient pole 5 in FIG. 5) of the second magnetic pole group (e.g., the S-pole group) is a second polarity. The coils for pole piece #1 for each group is excited by a solid state exciter channel #1 contained in the excitation panel 74. The excitation panel 74 and, thus, the wound coils of the pole pieces are powered through conductors 80 by battery 75. The excitation control signal is transmitted through conduits 79 from PLC 73. The signal for activating the proper PLC parameter is transmitted through conductor 78 from control panel 72. Pole piece #1 of each of the two pole groups is excited through conduit 77 by a solid state exciter channel #1 in excitation panel 74. Pole piece #2 of each group is excited through conduit 77 by a solid state exciter board channel #2 in excitation panel 74. Pole piece #3 of each group is excited through conduit 77 by exciter board channel #3 in excitation panel 74. Pole piece #4 of each group is excited through conduit 77 by exciter board channel #4 in excitation panel 74. Pole piece #5 of each group is excited through conduit 77 by exciter board channel #5 in excitation panel 74. Pole piece #6 of each group is excited through conduit 77 by exciter board channel #6 in excitation panel 74. Pole piece #7 of each group is excited through conduit 77 by exciter hoard channel #7 in excitation panel 74. Pole piece #8 of each group is excited through conduit 77 by exciter board channel #8 in excitation panel 74. The pole pieces within each magnetic pole group are excited sequentially. For example, pole piece #11 of each group is excited first and, for example, 1.042 milliseconds later, pole piece #2 of each group is excited; and, for example, 1.042 milliseconds later, pole piece #3 of each group is excited; and, for example, 1.042 milliseconds later, pole piece #4 of each group is excited; and, for example, 1.042 milliseconds later, pole piece #5 of each group is excited; and, for example, 1.042 milliseconds later, pole piece #6 of each group is excited; and, for example, 1.042 milliseconds later, pole piece #7 of each group is excited; and, for example, 1.042 milliseconds later, pole piece #8 of each group is excited; and, for example, 1.042 milliseconds later pole piece #1 of each group is again excited but in the opposite polarity, and the cycle repeats by cycling two discrete rotor poles of a first polarity in one pole and a second polarity in the second pole. As a result, each pole is cycled for 8.336 milliseconds in a first polarity, and 8.336 milliseconds in a second polarity. Each salient pole is excited, for example, 4.168 milliseconds with a collapse time of, for example, 4.168 milliseconds.

As noted earlier, the pole pieces may be wound with a desired and appropriate electrical magnet wire. The magnet wire coils may be terminated in two leads which may be wired to a PLC controlled excitation system, which allows switching in an alternate fashion from a first polarity to a second polarity and from the second polarity to the first polarity by use of a MOSFET gating system in an excitation circuit. In a case of a four-pole rotor described next in FIG. 23, for example, the salient poles are wired into four groups of four poles per group, or two groups of eight poles per group, but not limited to two or four groups.

Figure 23:
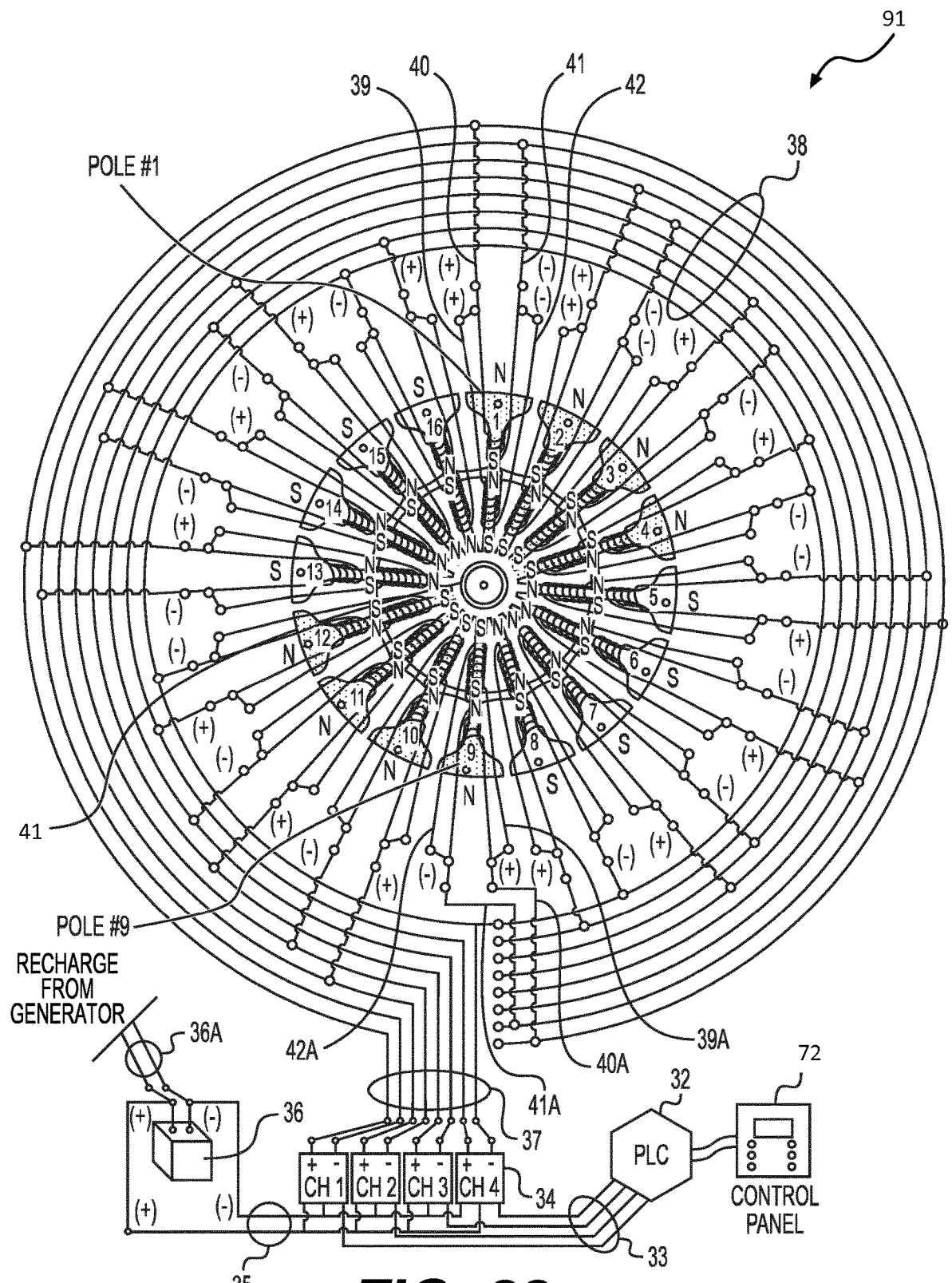
FIG. 23 is a diagram which depicts an exemplary four-pole rotor along with necessary excitation circuit, consistent with embodiments of the present disclosure.

FIG. 23 is a diagram which depicts an exemplary four-pole rotor 91 along with its excitation circuit, consistent with embodiments of the present disclosure. The four pole rotor wound salient pole #1 in each group is connected to a MOSFET circuit from an excitation system in control panel 72. The wound salient poles are grouped into four magnetic pole groups, including group #1 (poles 1-4), group #2 (poles 5-8), group #3 (poles 9-12) and group #4 (poles 13-16). The poles are excited as follows: Pole 1 of group #1 is a first polarity and pole 1 of group #2 is a second polarity. Pole 1 of group #3 is a first polarity and pole 1 of group #4 is a second polarity. Pole 1 of each group is excited by a common channel #1 (CH1) of a solid state excitation system housed in control panel 72. Pole 2 of each group is excited by an exciter board channel #2 (CH2). Pole 3 of each group is excited by an exciter board channel #3 (CH3), and pole 4 of each group is excited by an exciter board channel #4 (CH4). The power to excite the salient poles is taken from battery 36 through conductors 35 into exciter system 34. The control signals for the exciter system are sent from PLC 32 through conductors 33. Commands to PLC 32 are generated in control panel 72. The poles are excited through conductors 37 and 38. The pole ads 39, 40, 41, and 42 are connected to conductors 38 in appropriate locations. This numbering scheme is representative for all poles 1-16. Pole 1 of each group is excited and, for example, 2.084 milliseconds later, pole 2 of each group is excited; and for example, 2.804 milliseconds later, pole 3 is excited; and for example, 2.084 milliseconds later, pole 4 is excited; and, for example, 2.084 milliseconds later, pole 1 is excited again but in a second polarity, and the cycle repeats continuously. The pole circuits are excited with a first polarity DC power in the first half cycle and a second polarity DC power in the second half cycle. The first and second half cycle makes up one AC power cycle every 16.667 milliseconds in the case of 60 Hz electric power. Appropriate adjustments are made in the control system for other frequencies such as 50 Hz electric power. For 60 Hz power each pole is excited, for example 4.167 milliseconds with, for example, a 4.167 millisecond collapse time for the magnetic salient pole iron. The excitation wave progresses clockwise with the magnetic flux of each pole being distorted in a clockwise fashion by the previous like magnetic pole. Therefore the discrete rotor pole made up of four salient pole pieces at any one point in time progresses clockwise due to the repelling flux of the preceding salient pole. This in effect constantly pushes discrete separated magnetic poles in a clockwise circular fashion at the desired frequency. The poles are separated and alternate first polarity and second polarity. The four discrete magnetic poles continue to rotate without physical rotation of the rotor member itself.

Figure 24:
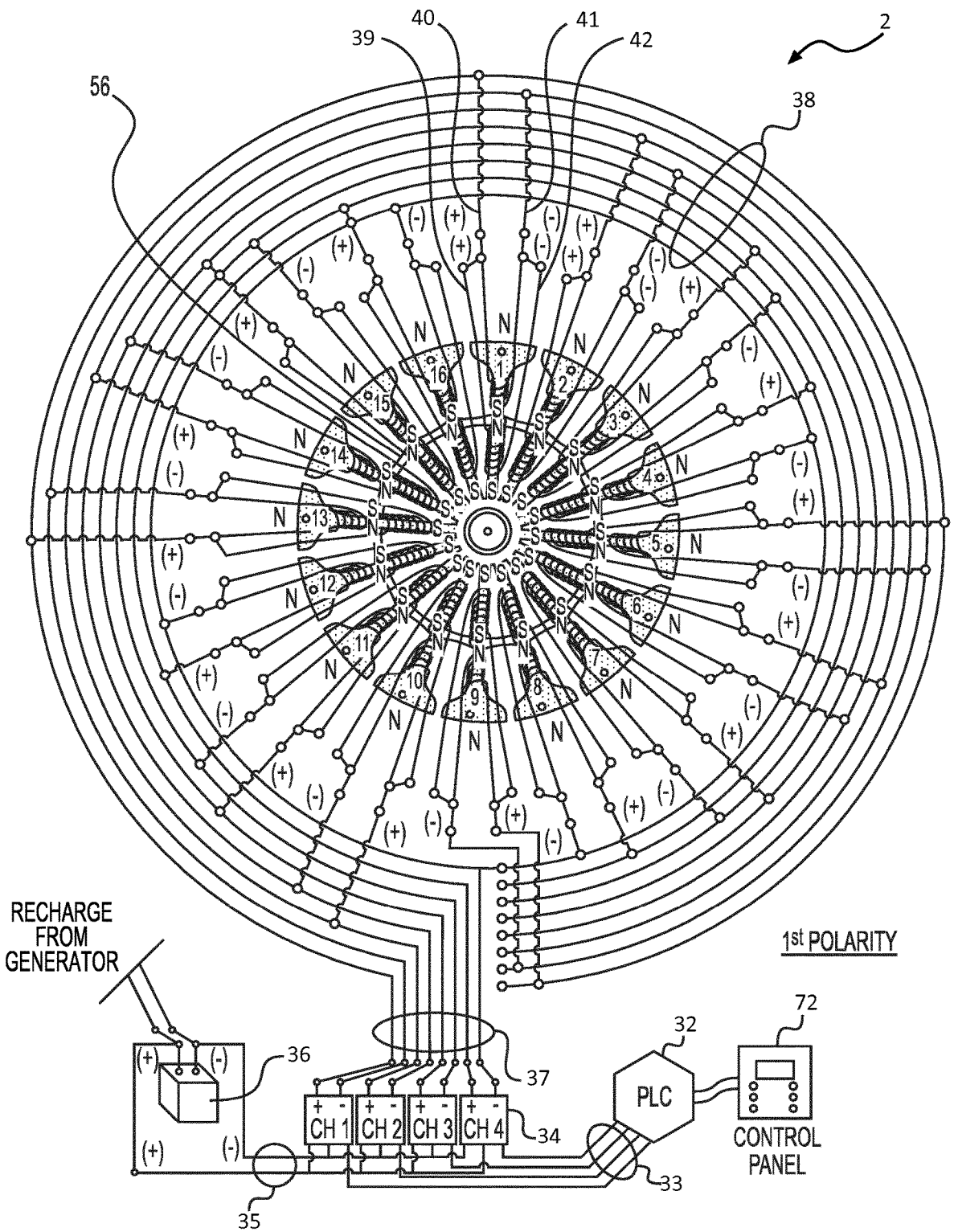
FIG. 24 is a diagram which depicts an exemplary north pole of an alternating single-pole rotor along with the necessary excitation circuit, consistent with embodiments of the present disclosure.
Figure 35:
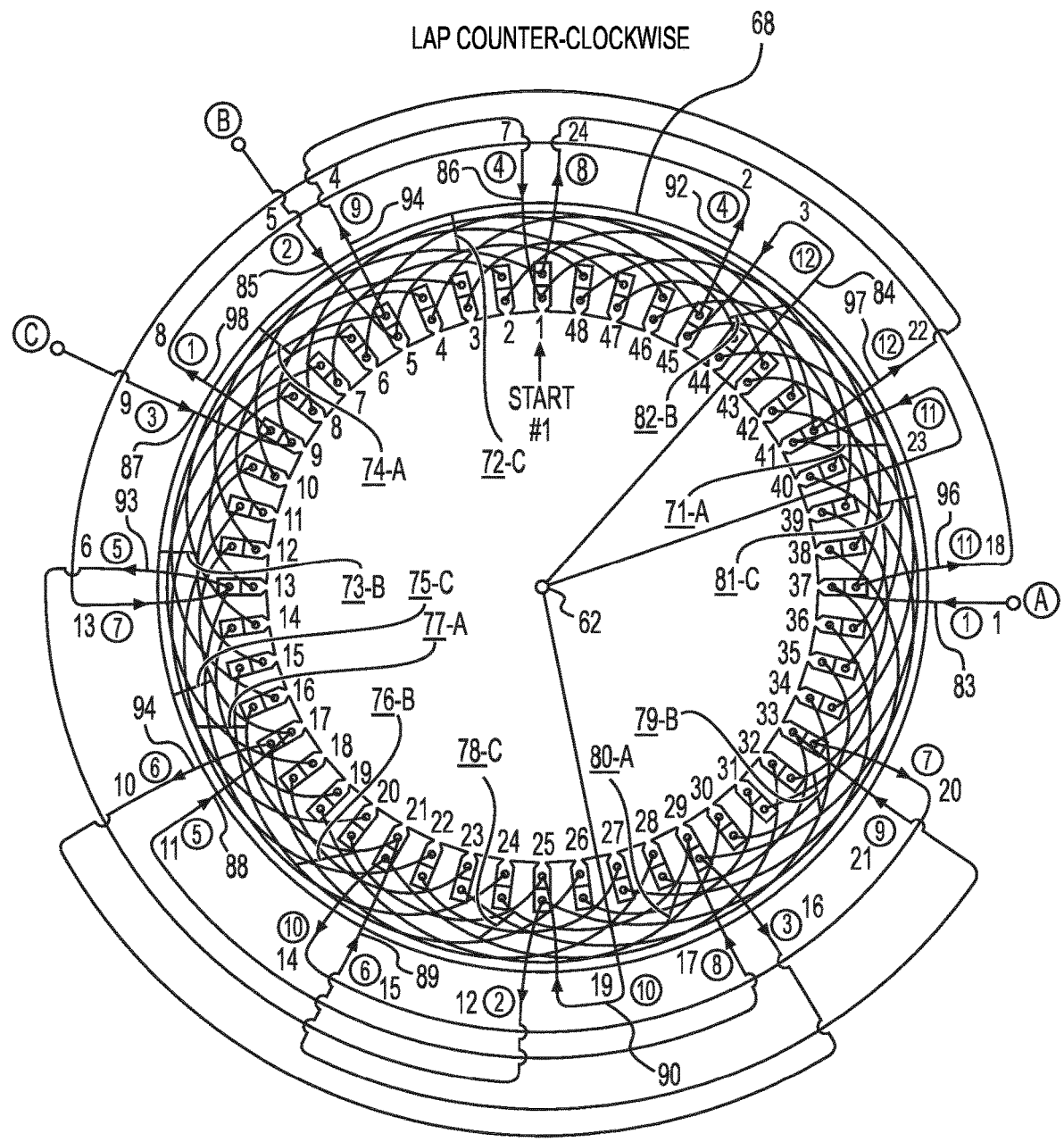
FIG. 35 is a diagram illustrating an exemplary stator with 3-phase winding with a "high-wye" hookup, consistent with embodiments of the present disclosure.
Figure 36:
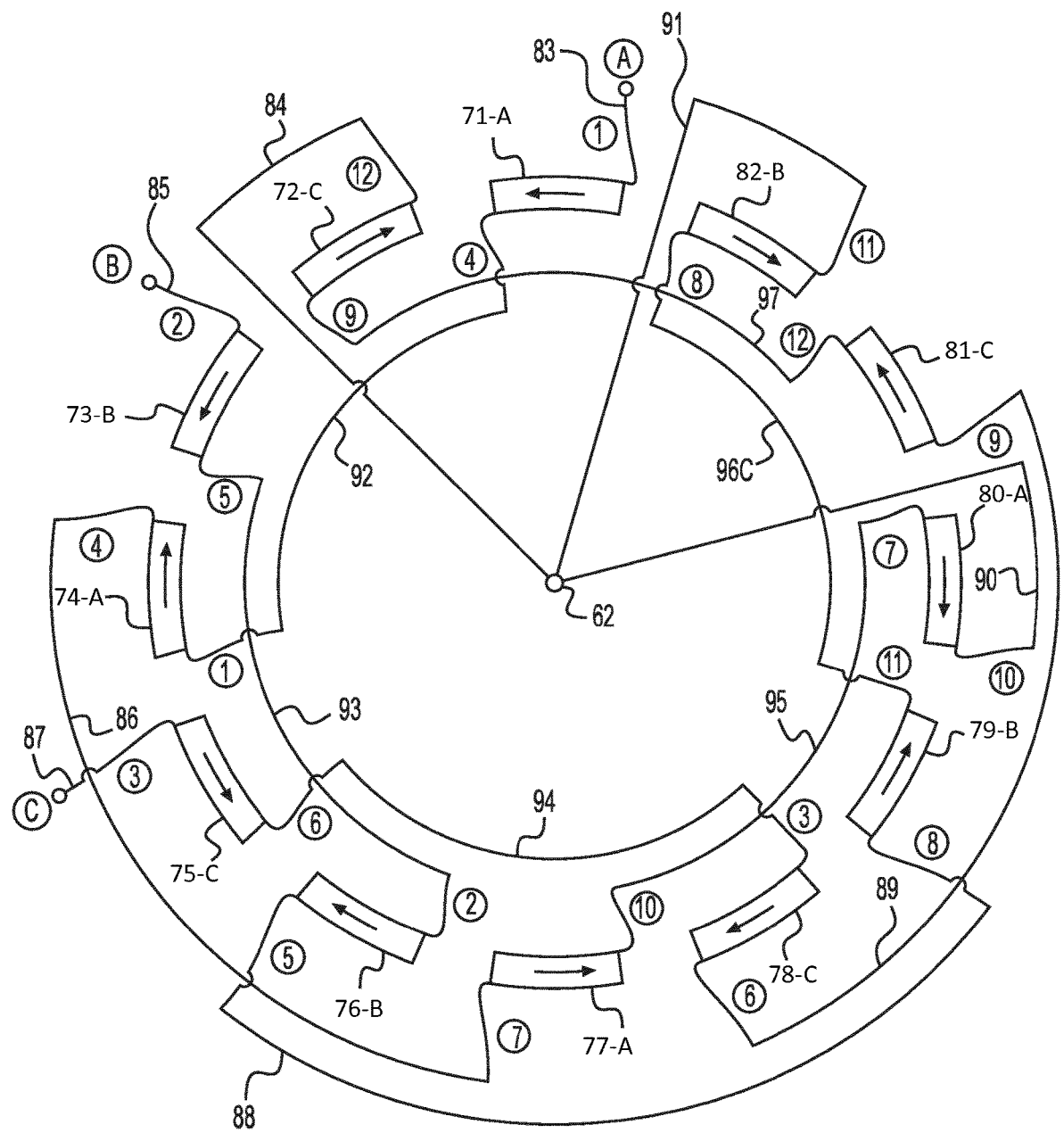
FIG. 36 is a diagram illustrating an exemplary graphic hookup of a 3-phase winding in a "high-wye" configuration, consistent with embodiments of the present disclosure.

FIG. 24 is a diagram which depicts an exemplary north pole uni-pole rotor 2 along with its excitation circuit, consistent with embodiments of the present disclosure. All 16 salient poles are wired into four groups of four salient pole pieces in each group. All 16 pole pieces may be excited in a first polarity (north pole), for example, for 8.333 milliseconds; and then all 16 may be excited in a second polarity (south pole), for example, for 8.333 milliseconds, each completing a cycle of 16.667 milliseconds. Pole pieces in each group are connected to a circuit from PLC 32 which sends signals through conduit 33 to exciter panel 34. This excitation system excites the salient pole coils with DC power current from CH1, CH2, CH3 and CH4 through conduits 37 and 38. Pole pieces of group #1 (1-4 coils) are excited in a first polarity. Salient pole 1 of each of groups 2, 3 and 4 is also excited in a first polarity (north pole) for one cycle. Then salient pole 1 of each of groups 2, 3 and 4 is switched to a second polarity (south pole) for the next cycle. That is, the entire rotor alternates between first polarity for 360° and then second polarity for 360°. Alternating polarity is controlled by a MOSFET gating system 51 (not shown) including channels CH1, CH2, CH3 and 0114. The frequency is controlled by the computer-controlled gating system and may be 50 Hz, 60 Hz, or any other desired frequency. The speed of the rotation of the magnetic field is controlled by the rate of progression of salient pole excitation within each magnetic pole group. The frequency of the power output is controlled by the system alternating the polarity of the DC power feed current polarity every, for example, 8.3335 milliseconds in the case of 60 Hz electric power. To obtain a rotation rate of the magnetic poles at, for example, 7,500 rpm the following sequence applies. Pole 1 in each group is excited and, for example, 0.50 milliseconds later, pole 2 is excited; and, for example, 0.50 milliseconds later, pole 3 is excited; and, for example, 0.50 milliseconds later, pole 4 is excited; and, for example, 0.50 milliseconds later, pole 1 is again excited, and the cycle repeats until the excitation polarity is switched. To generate 60 Hz power, the pole coil circuits are excited with a first polarity DC power current, for example, 8.3335 milliseconds, and then a second polarity DC power current, for example, 8.3335 milliseconds. The excitation polarity is controlled by the DC power feed current from the PLC and MOSFET circuits. The DC power feed is controlled by a master PLC 32 which alternates the DC power polarity by use of a MOSFET gating system which alternates the DC power current feed polarity every 8.3335 milliseconds, for example, in the case of 60 Hz current output from the generator and, for example, 10 milliseconds in the case of 50 Hz current output from the generator. In the case of the uni-pole rotor illustrated in FIG. 24, a stator structures, as in FIGS. 35 and 36, are used, which will be discussed later.

Figure 25:
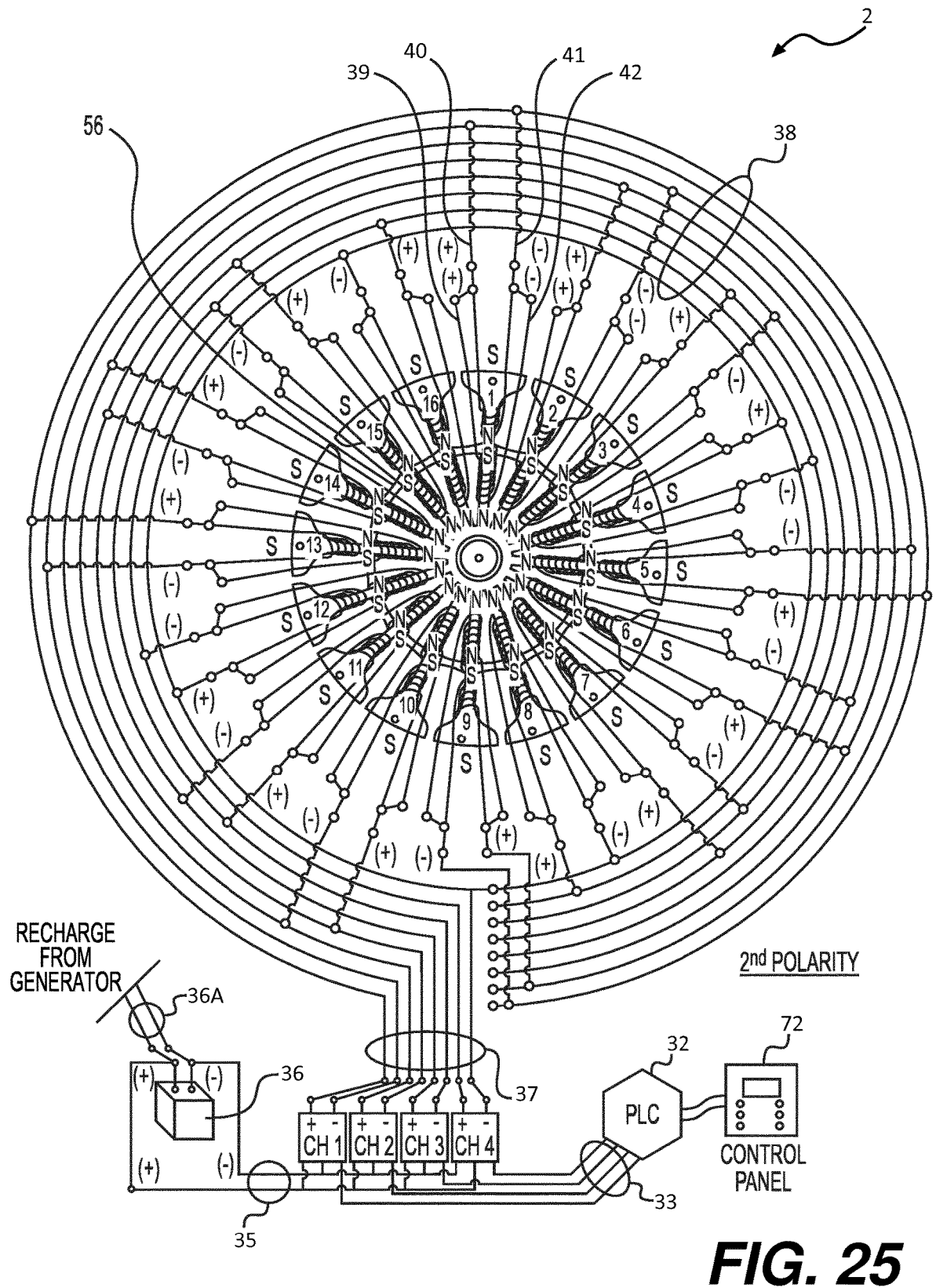
FIG. 25 is a diagram which depicts an exemplary south pole of an alternating single pole rotor along with the necessary excitation circuit, consistent with embodiments of the present disclosure.

FIG. 25 is a diagram which depicts an exemplary south pole uni-pole rotor 2 along with its excitation circuit, consistent with embodiments of the present disclosure. The uni-pole rotor of FIG. 25 is structured and excited similarly to the one of FIG. 24, except for a different polarity. Detailed descriptions are therefore not repeated.

Figure 26:
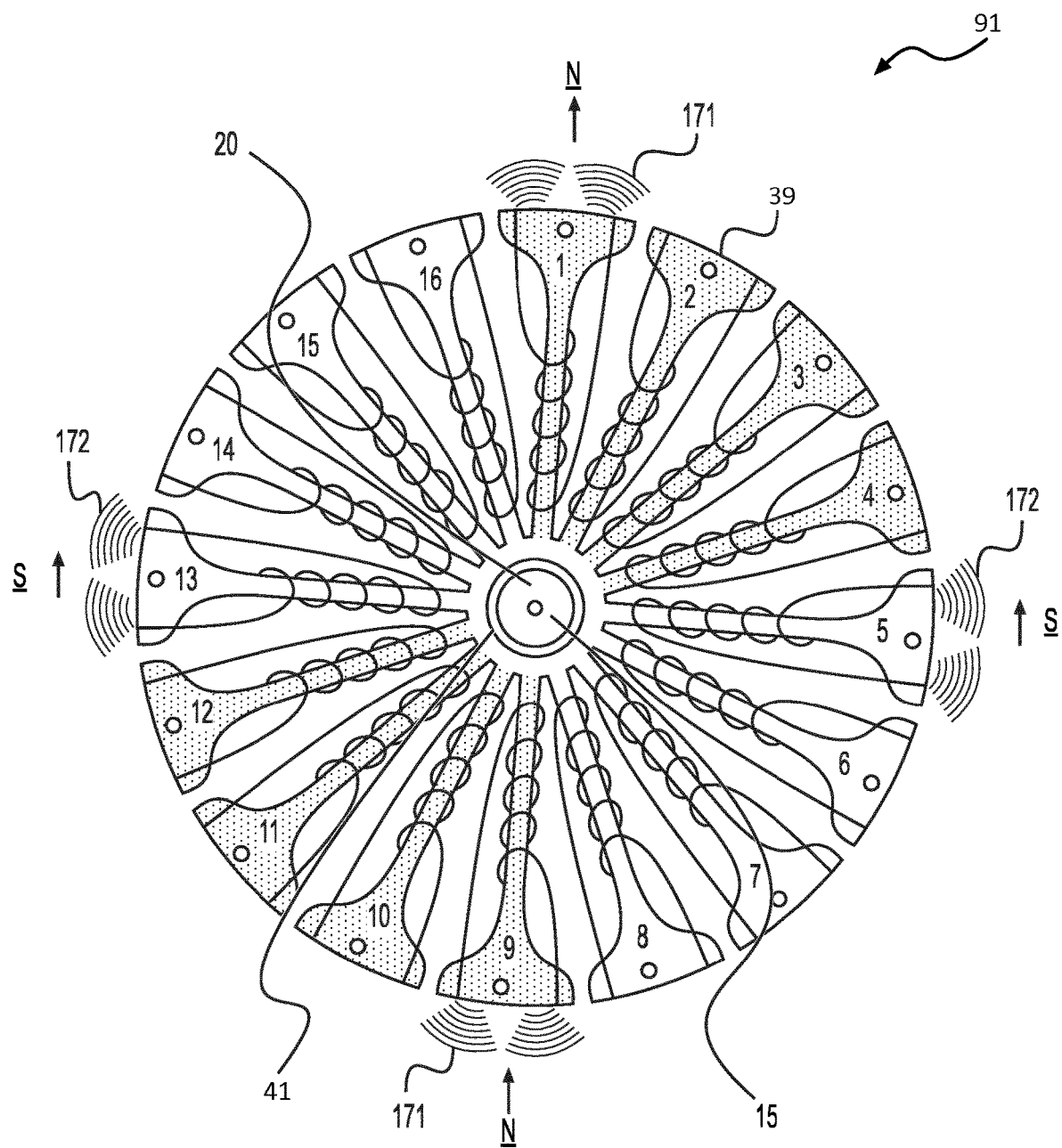
FIG. 26 is a diagram illustrating an end view of an exemplary solid state four-pole rotor with pole windings and excitation polarity sequencing circuits demonstrated for all 16 salient poles through a four-pole 60 Hz cycle demonstrating pulse #1 with depiction of a magnetic flux field, consistent with embodiments of the present disclosure.

FIG. 26 is a diagram illustrating an end view of an exemplary solid state four-pole rotor 91 with pole windings and excitation polarity sequencing circuits demonstrated for all 16 salient poles through a four-pole 60 Hz cycle demonstrating pulse #1 with depiction of a magnetic flux field, consistent with embodiments of the present disclosure. The first salient poles (1, 5, 9 and 13) to be excited in the four pole sequence are depicted by magnetic flux fields 171 north and 172 south. The upward pointing arrows (↑) indicate the flux fields are increasing and the shading on a pole indicates a first polarity, for example, north, and a non-shade pole is a second polarity, for example, south.

Figure 27:
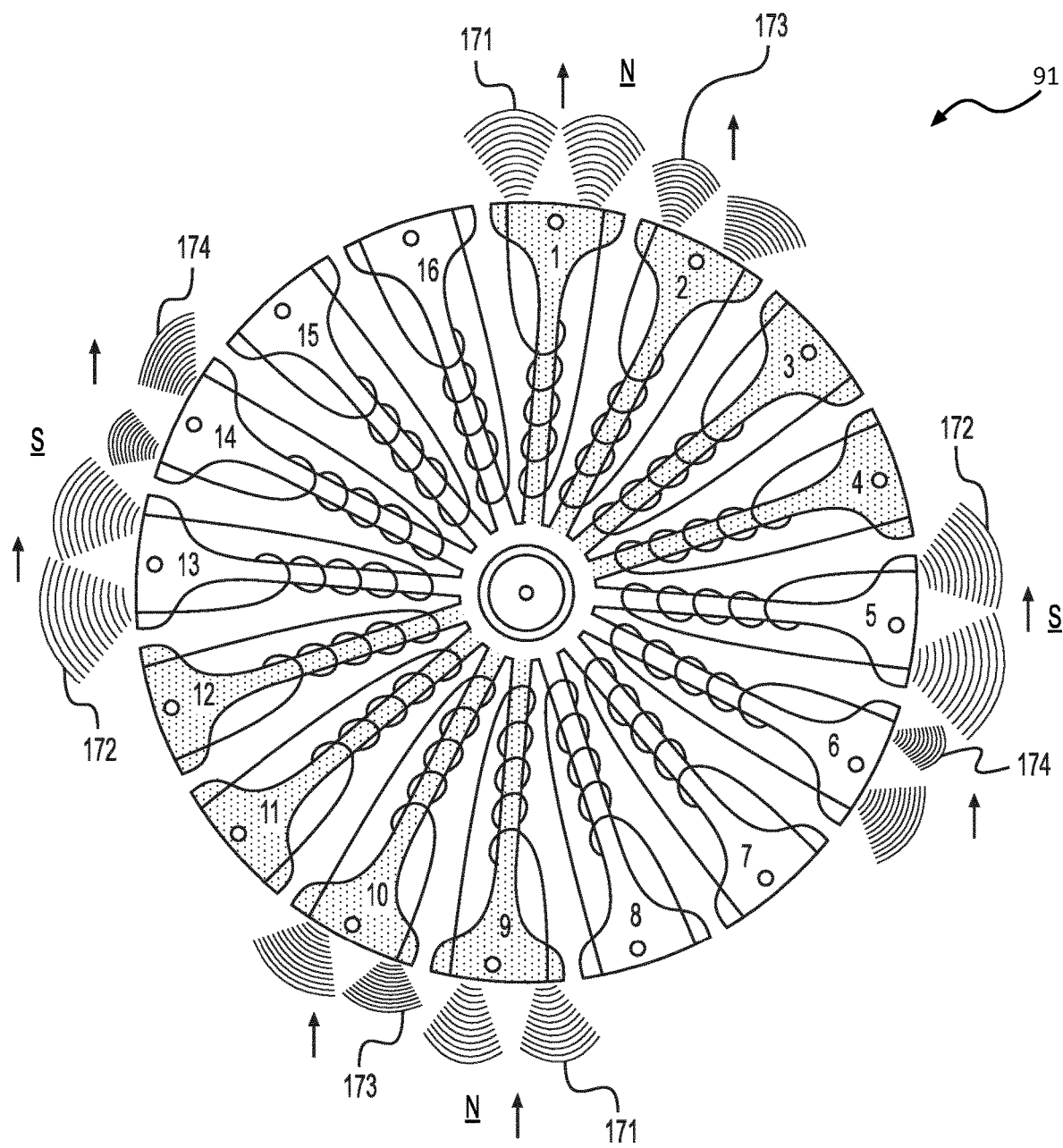
FIG. 27 is a diagram illustrating a magnetic flux field from the end view of an exemplary solid state four-pole rotor with pole windings and excitation polarity sequencing in which a first two poles in each group fired in sequence with depiction of the magnetic flux field, consistent with embodiments of the present disclosure.

FIG. 27 is a diagram illustrating a magnetic flux field from the end view of an exemplary solid state four-pole rotor 91 with pole windings and excitation polarity sequencing in which the first two poles in each group are fired in sequence and depicting the magnetic flux fields, consistent with embodiments of the present disclosure. Salient poles 2, 6, 10 and 14 are excited, for example, 2.084 milliseconds after poles 1, 5, 9, and 13. Flux fields 171, 172, 173 and 174 are shown at those poles and are increasing. The magnetic flux from salient poles 2, 6, 10, and 14 are "pushed" by the repelling poles in 1, 5, 9, and 13 and are made to rotate for an angle in a clockwise direction. When all poles are excited in sequence this phenomenon results in continuous rotation of four discrete alternating magnetic poles.

Figure 28:
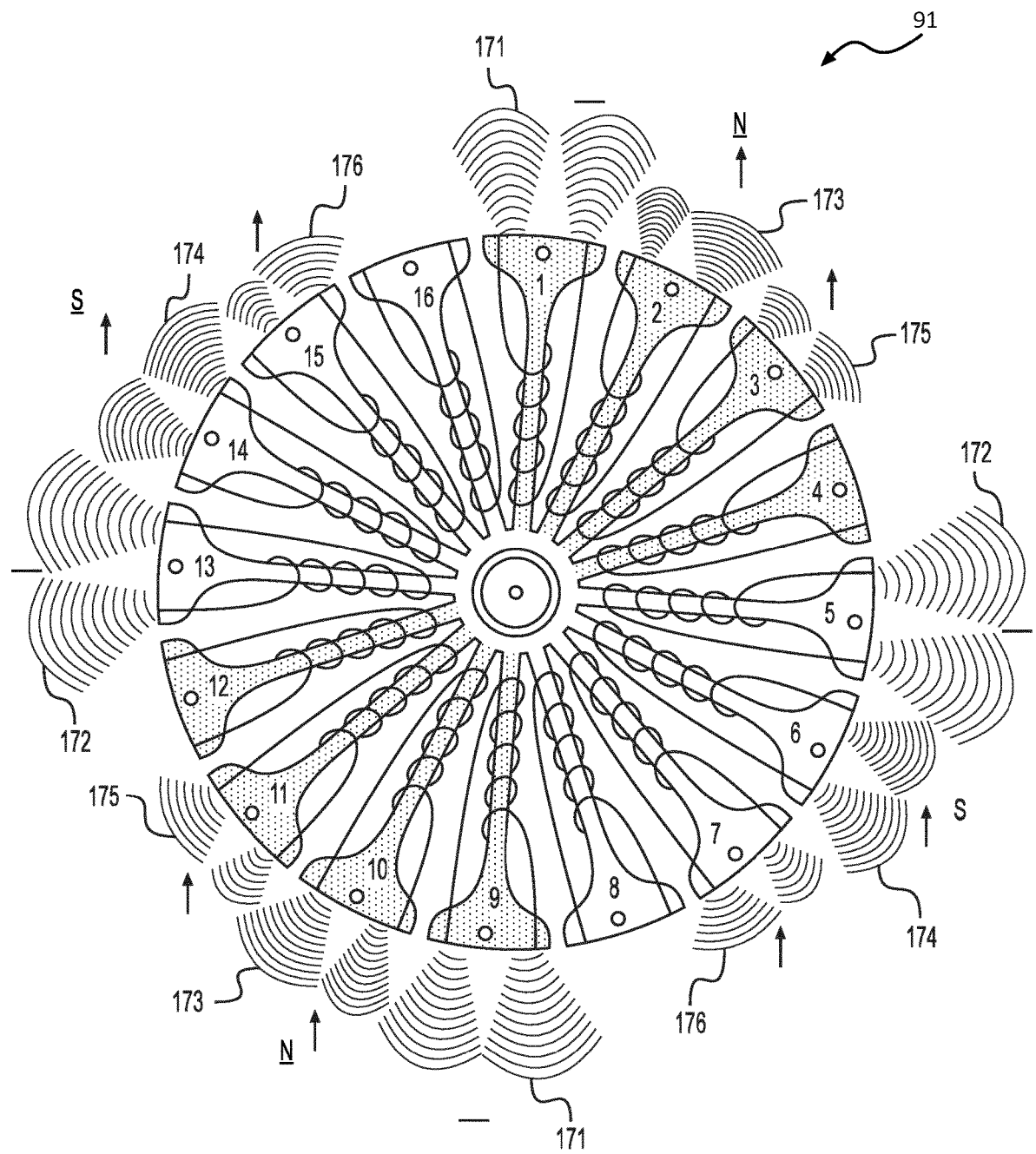
FIG. 28 is a diagram illustrating a magnetic flux field from the end view of an exemplary solid state four-pole rotor with pole windings and excitation polarity sequencing in which the flux field is demonstrated in a first three poles which are being fired in sequence, consistent with embodiments of the present disclosure.

FIG. 28 is a diagram illustrating a magnetic flux field from the end view of an exemplary solid state four-pole rotor 91 with pole windings and excitation polarity sequencing in which the flux field is demonstrated in the first three poles which are being fired in sequence, consistent with embodiments of the present disclosure. Salient poles 2, 6, 10, and 14 are excited, for example, 2.084 milliseconds after the excitation of poles 1, 5, 9, and 13. The horizontal bars (_) illustrated at flux fields 171, 172 indicate those fields have reached peak flux potential. Flux fields 171 and 172, excited by poles 1, 5, 9, and 13, deflect the growing fields 173 and 174 excited by poles 2, 6, 10, and 14. Consequently, the flux fields rotate in a clockwise direction. Similarly, the salient poles 3, 7, 11 and 15 are excited, for example, 2.084 milliseconds after poles 2, 6, 10 and 14. The salient pole flux fields 175 and 176 from salient poles 3, 7, 11 and 15 are repelled in a clockwise direction as they are generated.

Figure 29:
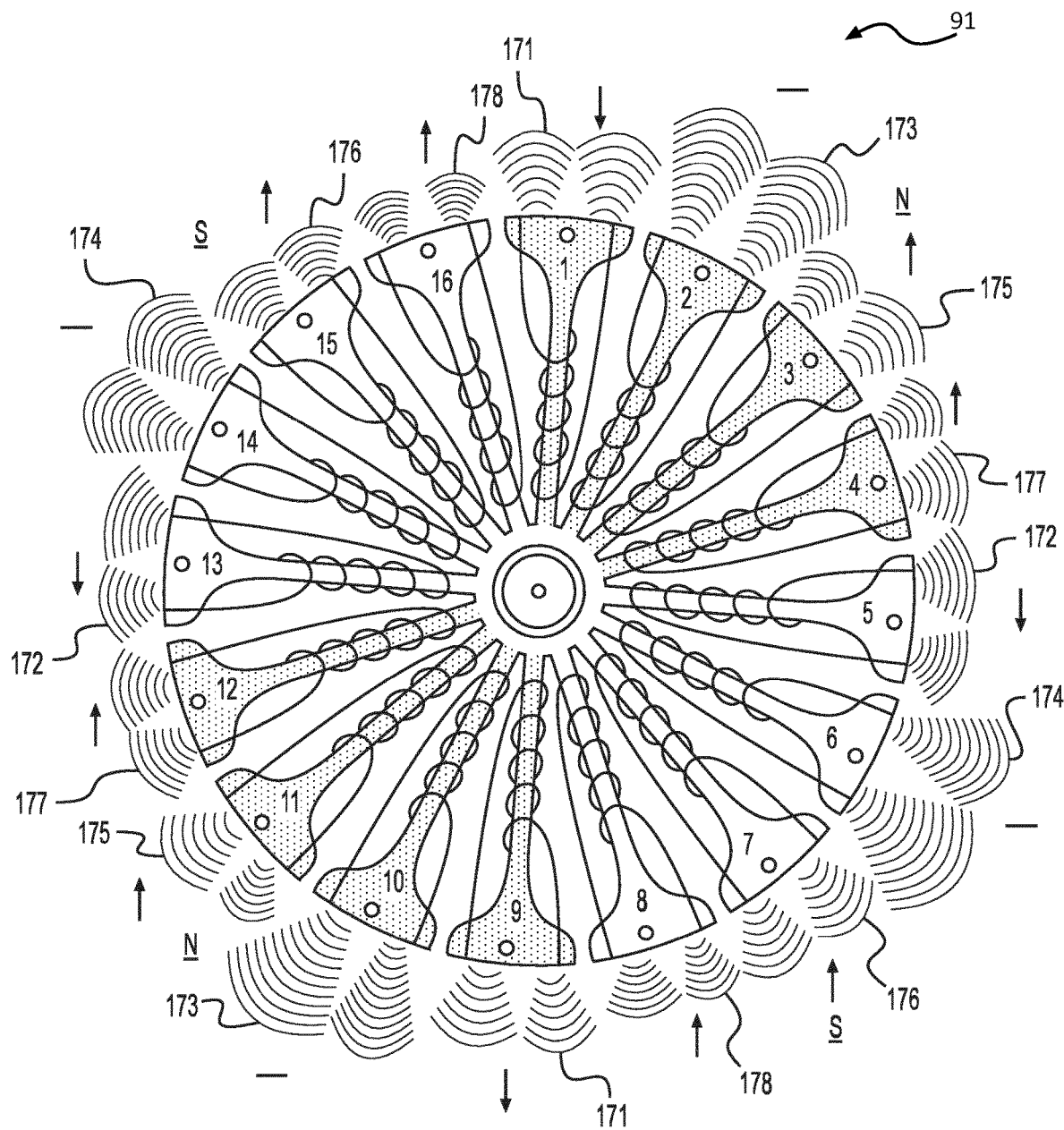
FIG. 29 is a diagram illustrating a magnetic flux field from the end view of an exemplary solid state four-pole rotor with pole windings and excitation polarity sequencing, consistent with embodiments of the present disclosure.

FIG. 29 is a diagram illustrating a magnetic flux field from the end view of an exemplary solid state four-pole rotor 91 with pole windings and excitation polarity sequencing, consistent with embodiments of the present disclosure. As above, salient poles 2, 6, 10, and 14 are excited, for example, 2.084 milliseconds after poles 1, 5, 9 and 13; flux fields 171 and 172 repel the evolving fields 173 and 174; and the flux from salient poles 2, 6, 0, and 14 are repelled and deflected by the repelling poles in 1, 5, 9, and 13. Consequently, the field rotates in a clockwise direction. The salient poles 3, 7, 11, and 15 are excited, for example, 2.084 milliseconds after excitation of poles 2, 6, 10, and 14; therefore, the salient pole flux fields 175 and 176 from 3, 7, 11, and 15 are repelled in a clockwise direction as they are generated. The salient poles 4, 8, 12, and 16 are excited, for example, 2.084 milliseconds after poles 3, 7, 11, and 15; and, therefore, the salient pole flux 177 and 178 from poles 4, 8, 12, and 16 are repelled in a clockwise direction. This progressive sequencing continues thereby creates four alternating magnetic poles which spin at, for example, 1800 rpm and, therefore, generate 60 Hz electric power. The downward pointing arrows (↓) at flux fields 171, 172 indicate the flux fields are collapsing.

Figure 30:
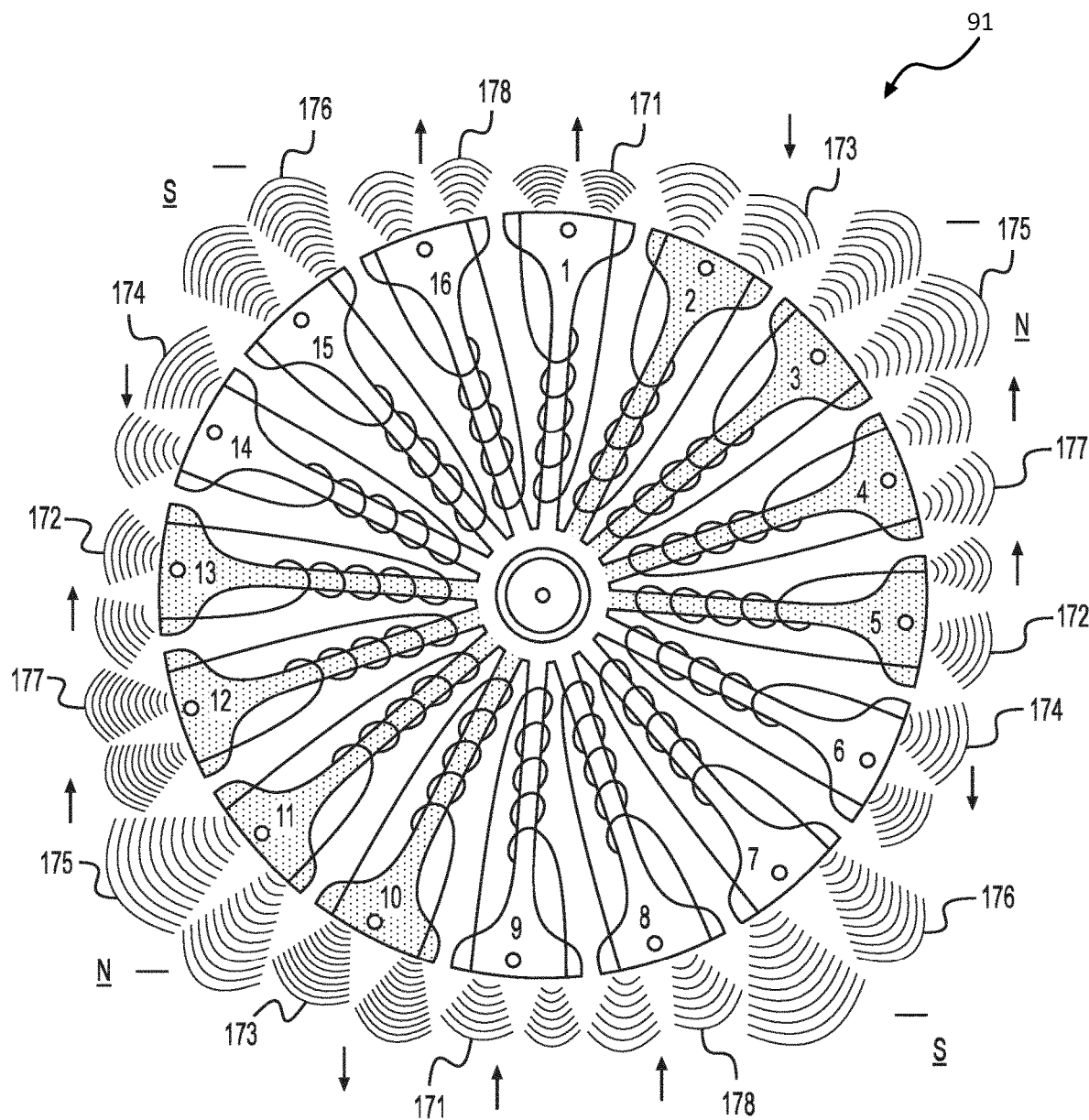
FIG. 30 is a diagram illustrating a magnetic flux field from the end view of an exemplary solid state four-pole rotor with pole windings and excitation polarity sequencing in which excitation sequencing progresses clockwise, consistent with embodiments of the present disclosure.

FIG. 30 is a diagram illustrating a magnetic flux field from the end view of an exemplary solid state four-pole rotor 91 with pole windings and excitation polarity sequencing in which excitation sequencing progresses clockwise, consistent with embodiments of the present disclosure. Salient poles 1, 5 and 9 and 13 have changed polarity in the progression of salient pole excitation. Consequently, flux field 171 is now south pole or second polarity, and flux field 172 is north pole or first polarity. This process continues as four alternating poles rotate at, for example, 1800 rpm and generate 60 Hz electric power.

Figure 31:
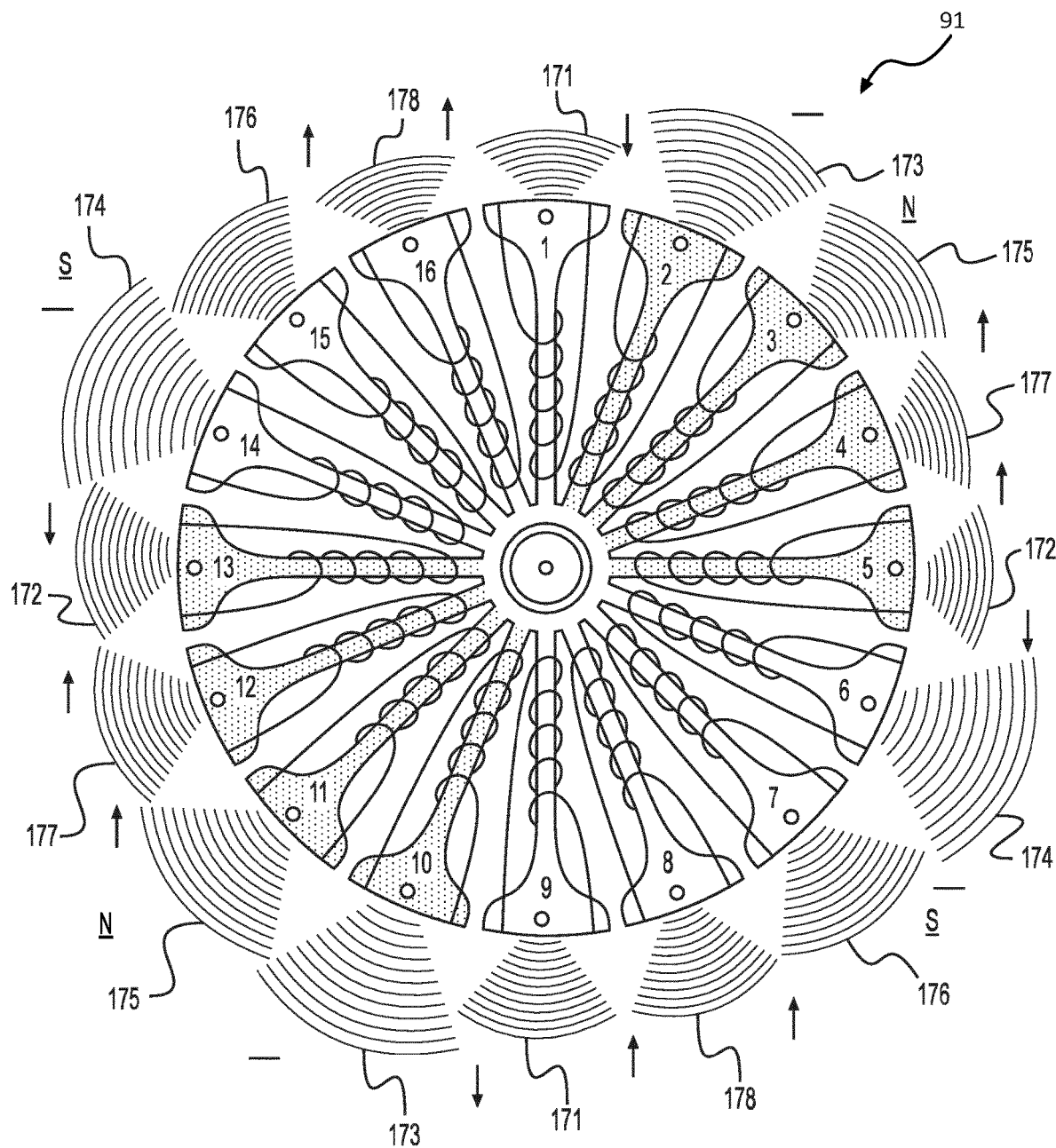
FIG. 31 is a diagram illustrating a magnetic flux field from the end view of an exemplary solid state four-pole rotor with pole windings and excitation polarity sequencing along with a flux field rotating clockwise, consistent with embodiments of the present disclosure.

FIG. 31 is a diagram illustrating a magnetic flux field from the end view of an exemplary solid state four-pole rotor 91 with pole windings and excitation polarity sequencing along with a flux field rotating clockwise, consistent with embodiments of the present disclosure. Flux field 171 is first polarity and is collapsing, and flux field 172 is second polarity and is collapsing. Both 171 and 172 may be excited, for example, 4.167 milliseconds. Flux field 173 is a first polarity and is at peak excitation after, for example, 4.167 milliseconds of excitation. Flux field 174 is a second polarity and is at peak excitation after, for example, 4.167 milliseconds of excitation. Flux field 175 is a first polarity and is, for example, 2.084 milliseconds into the excitation cycle. Flux field 176 is a second polarity and is, for example, 2.084 milliseconds into the excitation cycle. Consequently, flux field 177 and 178 are a second polarity and are only microseconds into the excitation phase. FIG. 31 depicts the sweeping clockwise rotation of the magnetic poles. This rotational effect is generated by the adjacent like pole deflecting the flux in a clockwise direction as the salient poles are sequenced in a clockwise fashion.

Figure 32:
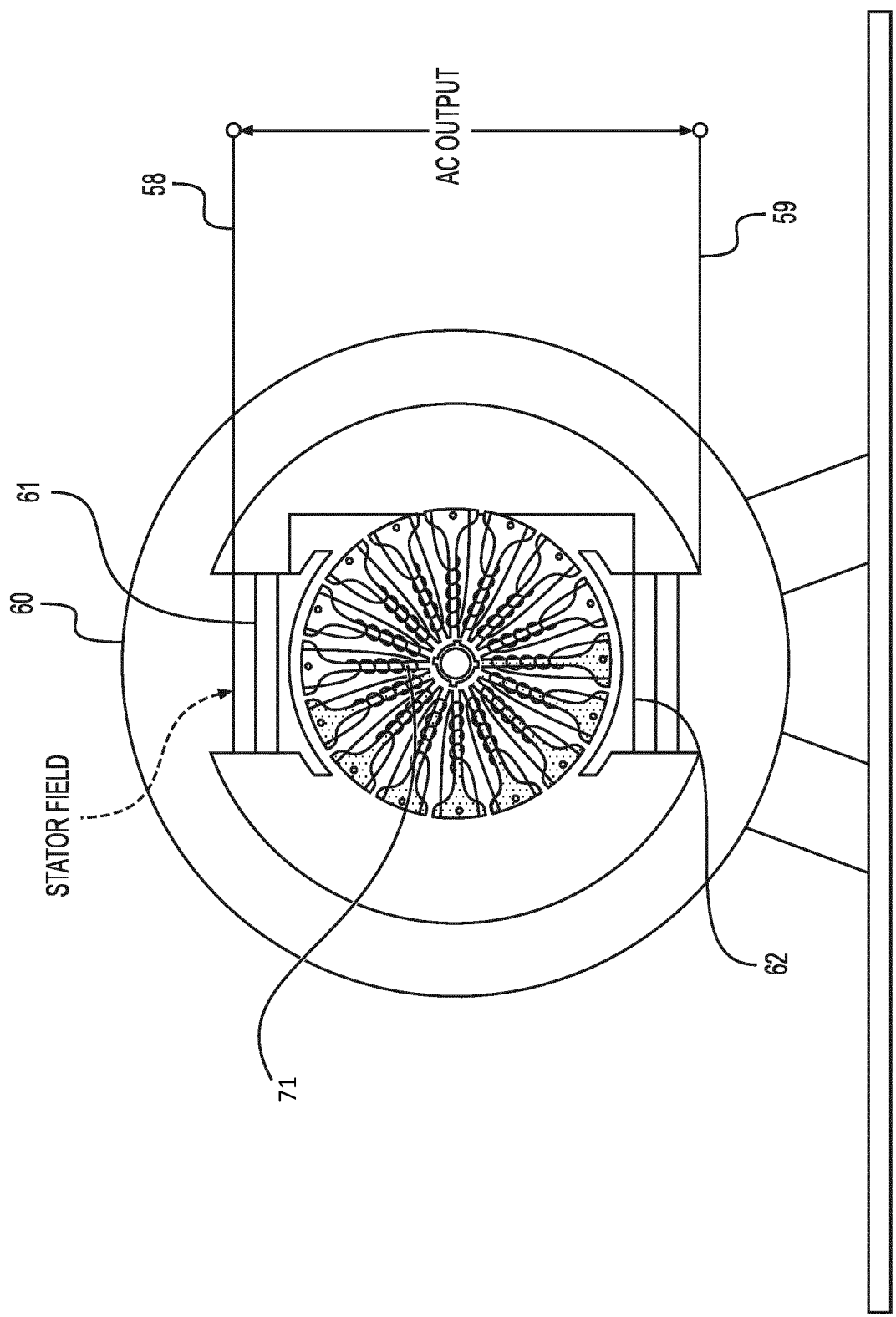
FIG. 32 is a diagram illustrating an exemplary two-pole stator and rotor, consistent with embodiments of the present disclosure.

FIG. 32 is a diagram which depicts an exemplary two-pole generator 60, consistent with embodiments of the present disclosure. Two pole electric generator 60 includes a stator having stator field coils 61 and 62 and a solid state two-pole rotor 71. Solid state two-pole rotor 71 is in place and the stator field coils are connected to an electrical load through conductors 58 and 59.

Figure 33:
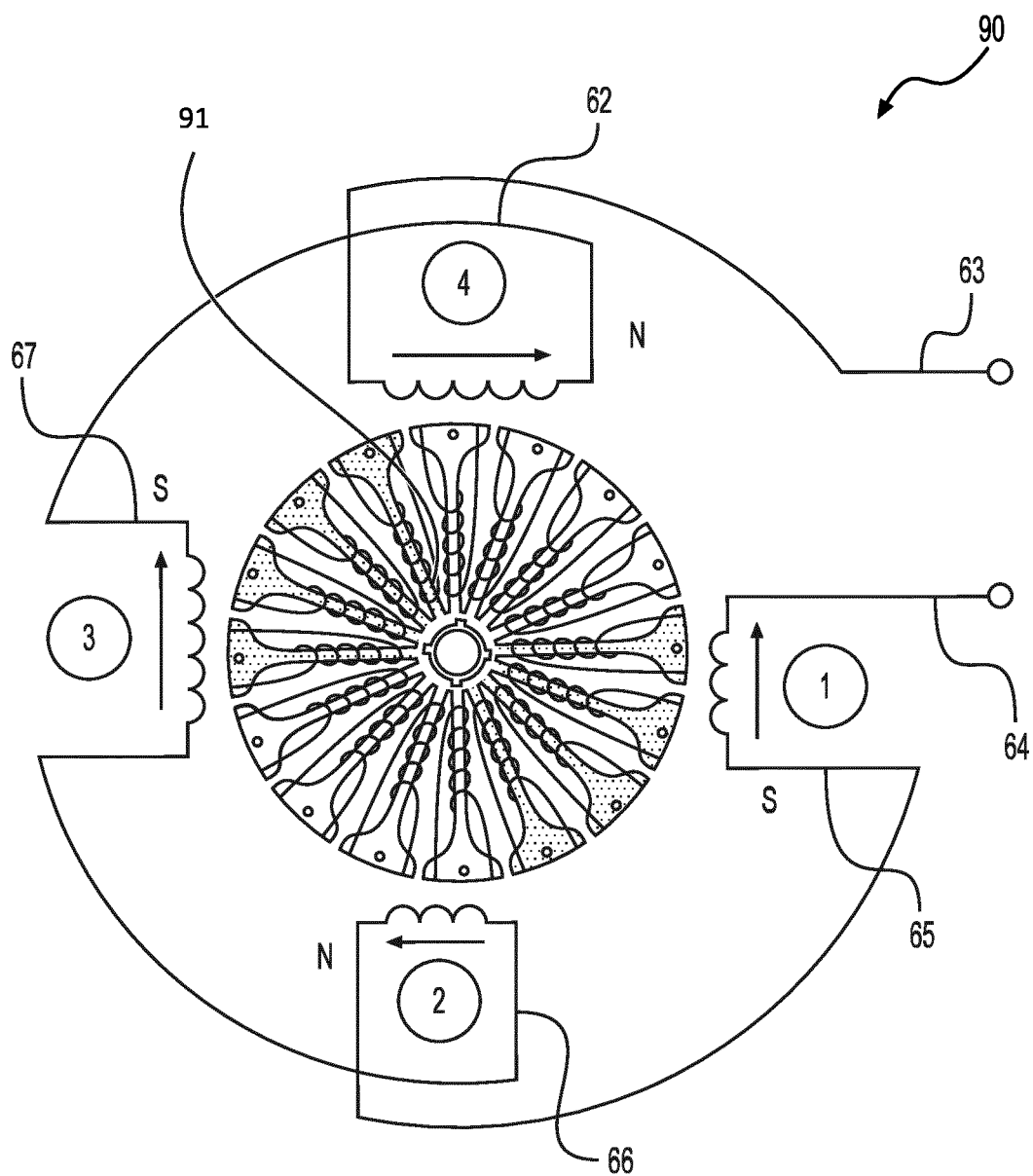
FIG. 33 is a diagram illustrating an exemplary four-pole stator and rotor, consistent with embodiments of the present disclosure.

FIG. 33 is a diagram which depicts an exemplary four-pole generator 90, consistent with embodiments of the present disclosure. The generator includes a stator having stator field coils 65, 66, 67, and 62, and a solid state four-pole rotor 91. Stator field coils 65, 66, 67, and 62 are connected to lead wires 63 and 64 carrying power to an electrical load.

Figure 34:
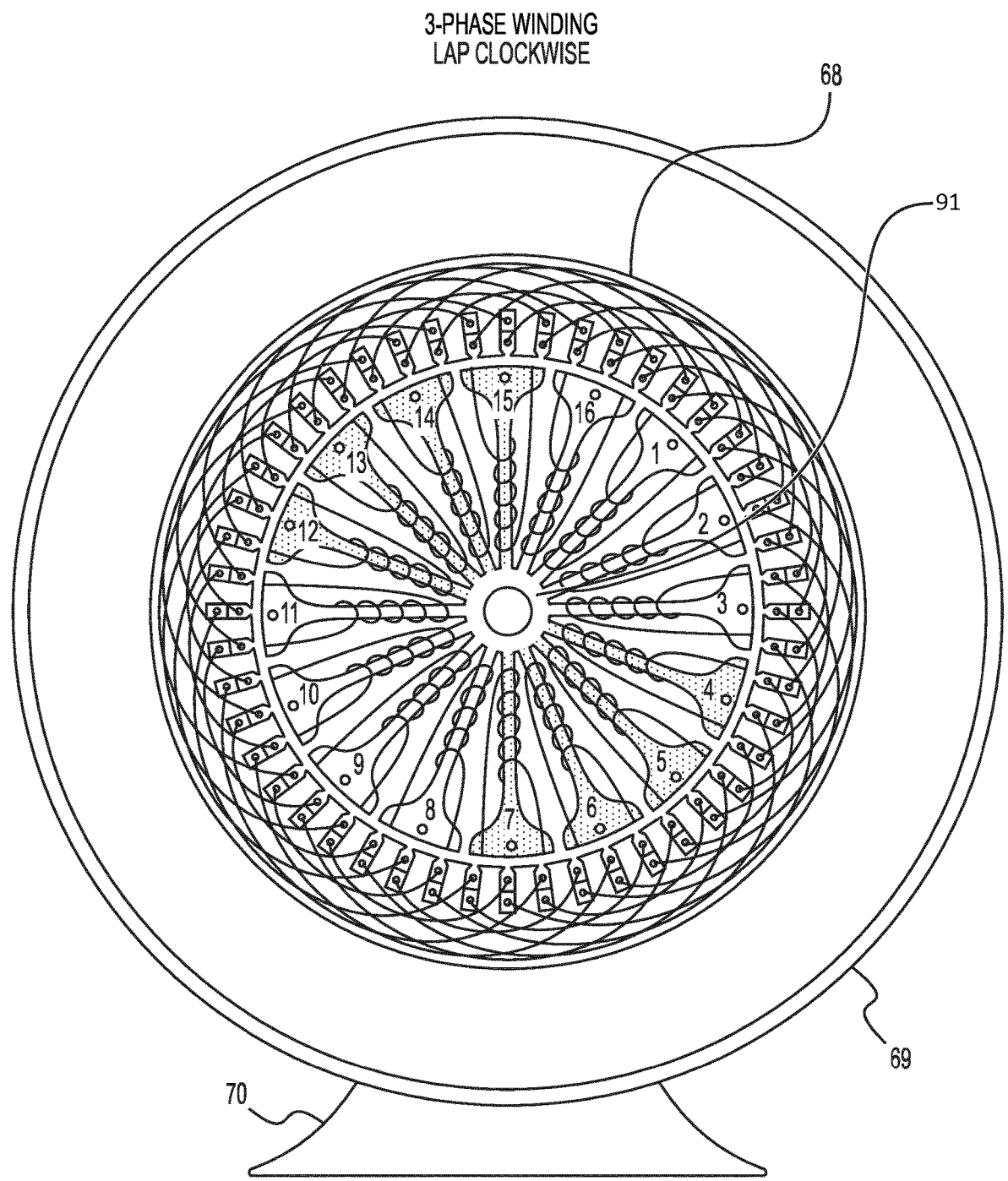
FIG. 34 is a diagram illustrating an exemplary four-pole rotor situated in a 3-phase stator which depicts a 3-phase winding, consistent with embodiments of the present disclosure.

FIG. 34 is a diagram which depicts an exemplary four-pole generator 69 situated in a 3-phase stator which depicts a 3-phase winding, consistent with embodiments of the present disclosure. A 3-phase generator 69 containing solid state rotor 91 and field coils 68 sitting on base 70 are illustrated.

FIG. 35 is a diagram which depicts an exemplary stator with 3-phase winding with a "high-wye" hookup, consistent with embodiments of the present disclosure. Each phase can be configured to include two winding circuits which may be connected in series to produce, for example, 480 volts (high-wye or alternatively the two winding circuits may be connected in parallel and referred to as "low-wye" and produce, for example, 240 volts. The voltage is different, but the power output is the same because the amperage also changes between the two hookups. Following the phase circuits from the power output leads through the circuits to the neutral "wye" connection, phase Ⓐ leg 83 includes coil group 71-A wound in a counterclockwise or north pole (N) direction. Input is ① and output is at ④. The output lead 92 connects with coil group 74-A, wound in a clockwise or south pole (S) direction with an input at ① and output at ④. The output lead 86 connects with coil group 77-A wound in a counterclockwise direction (N) with an input at ⑦ and output at ⑩. The output lead 95 connects with coil group 80-A wound in a clockwise direction (S) with input at ⑦ and output at ⑩. The output lead 90 connects at the central "wye" connection 62 with the other two phases. Phase Ⓑ leg 85 includes coil group 73-B wound in a counterclockwise direction (N) with an input at ② and output at ⑤. The output lead 93 connects with coil group 76-B which is wound in a clockwise direction (S) with an input at ② and output at ⑤. The output lead 88 connects to coil group 79-B wound in a counterclockwise direction (N) with an input at ⑧ and output at ⑪. The output lead 96 connects to coil group 82-B which is wound in a clockwise direction (S) with an input at ⑧ and output at ⑪. The output lead 91 connects with the "wye" connection at 62. Phase Ⓒ, leg 87 connects to coil group 75-C wound in a counterclockwise direction (N) with an input at ③ and an output at ⑥. The output lead 97 connects to coil group 78-C wound in a clockwise direction (S) with an input at ③ and an output at ⑥. The output lead 89 connects to coil group 81-C wound in a counterclockwise direction (N) with an input at ⑨ and output at ⑫. The output lead 97 connects to coil group 72-C wound in a clockwise direction (S) with an input at ⑨ and output at ⑫. The output lead 84 forms the third leg of the "wye" connection 62.

As noted earlier, the structure of rotor laminates and rotor windings must be altered in order to operate as a functional rotating magnetic field. When a conventional bipolar rotor is wired and excited such that both poles of the rotor are either north pole or south pole, i.e., north-north or south-south, the internal poles cancel a large portion of the external magnetic flux.

FIG. 36 is a diagram which depicts an exemplary graphic hookup of a 3-phase winding in a "high-wye" configuration, consistent with embodiments of the present disclosure. With reference to FIG. 36, phase Ⓐ, leg 83 is connected to coil group 71-A wound in a counterclockwise direction (N) with an input at ① and an output at ④. The output lead 92 connects to coil group 74-A which is wound in a clockwise direction (S) with an input at ① and an output at ④. The output lead 86 connects to coil group 77-A wound in a counterclockwise direction (N) with an input at ⑦ and output at ⑩. The output lead 95 connects to coil group 80-A wound in a clockwise direction (S) with an input at ⑦ and output at ⑩. The output lead 90 makes up the "wye" connection 62 with the other two phases.

Phase Ⓑ, leg 85 connects with coil group 73-B wound in a counterclockwise direction (N) with an input at ② and an output at ⑤. The output lead 93 connects to coil group 76-B wound in a clockwise direction (S) with an input at ② and an output at ⑤. The output lead 88 connects to coil group 79-B wound in a counterclockwise direction N (N) with an input at ⑧ and output at ⑪. The output lead 96C connects to coil group 82-B wound in a clockwise direction (S) with an input at ⑧ and output at ⑪. The output lead 91 connects to a portion of the "wye" connection 62. Phase Ⓒ, leg 87 connects to coil group 75-C wound in a counterclockwise direction (N) with an input at ③ and output at ⑥. The output lead 94 connects to coil group 78-C wound in a clockwise direction (S) with an input at ③ and output at ⑥. The output lead 89 connects to coil group 81-C wound in a counterclockwise direction (N) with an input at ⑨ and output at ⑫. The output lead 97 connects to coil group 72-C wound in a clockwise direction (S) with an input at ⑨ and output at ⑫. The output lead 84 connects to "wye" connection 62.

Figure 37:
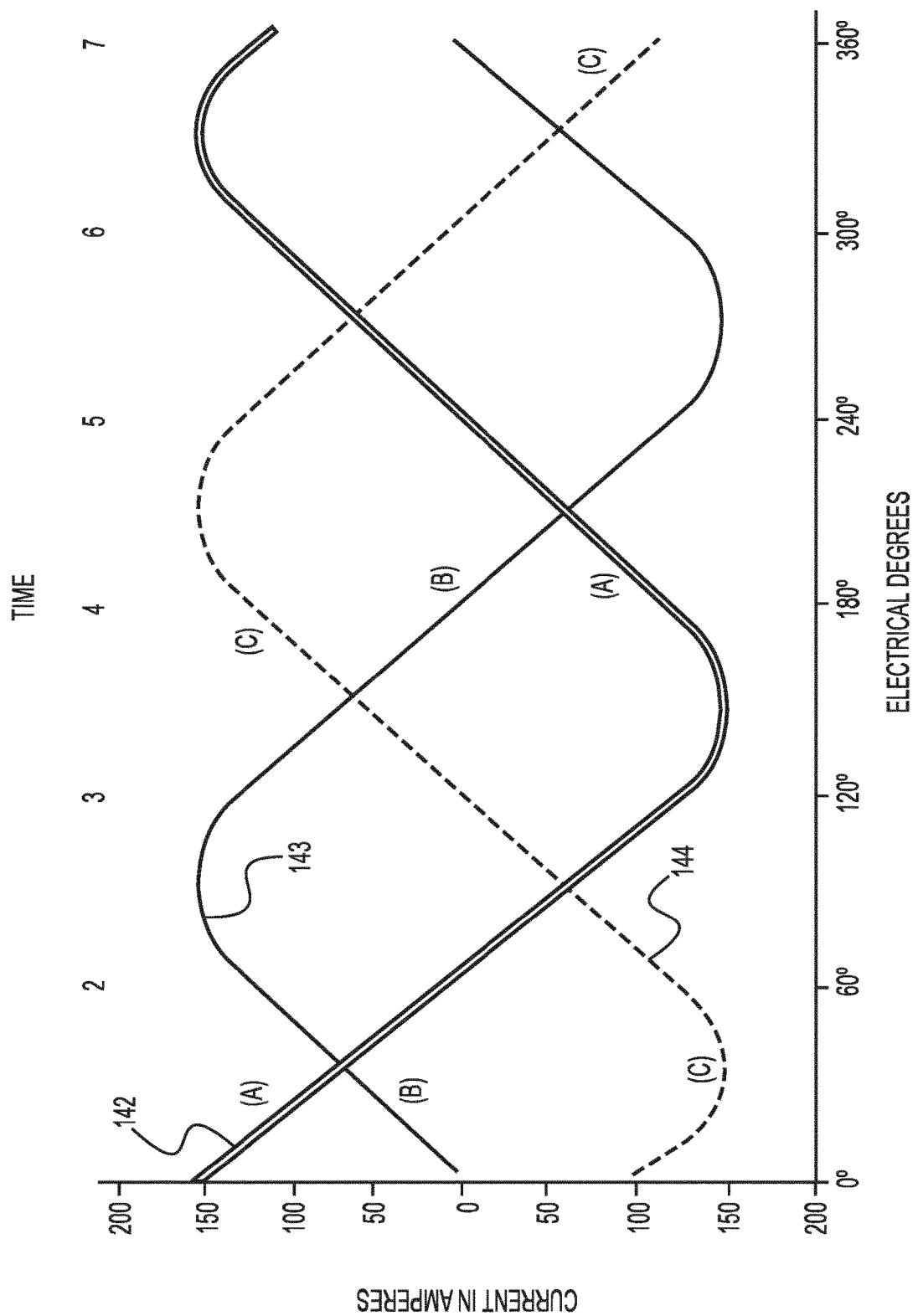
FIG. 37 is a diagram illustrating an exemplary oscilloscope tracing of a current flow in 3-phase legs of a generator with a "high-wye" hookup that covers the entire 360° of rotation, consistent with embodiments of the present disclosure.

FIG. 37 is a diagram which depicts an exemplary oscilloscope tracing of a current flow in 3-phase legs of a generator with a "high-wye" hookup that covers the entire 360° of rotation, consistent with embodiments of the present disclosure. FIG. 37 depicts an oscilloscope tracing from the 3-phase generator illustrated in FIG. 36. Phase Ⓐ leg (142) feeds into phase Ⓑ leg (143) and phase Ⓒ leg (144). Beginning at 0° as the rotor rotates through 360° of rotation the relationship changes as is depicted but with the phase legs feeding into each other and not to ground neutral.

Figure 38:
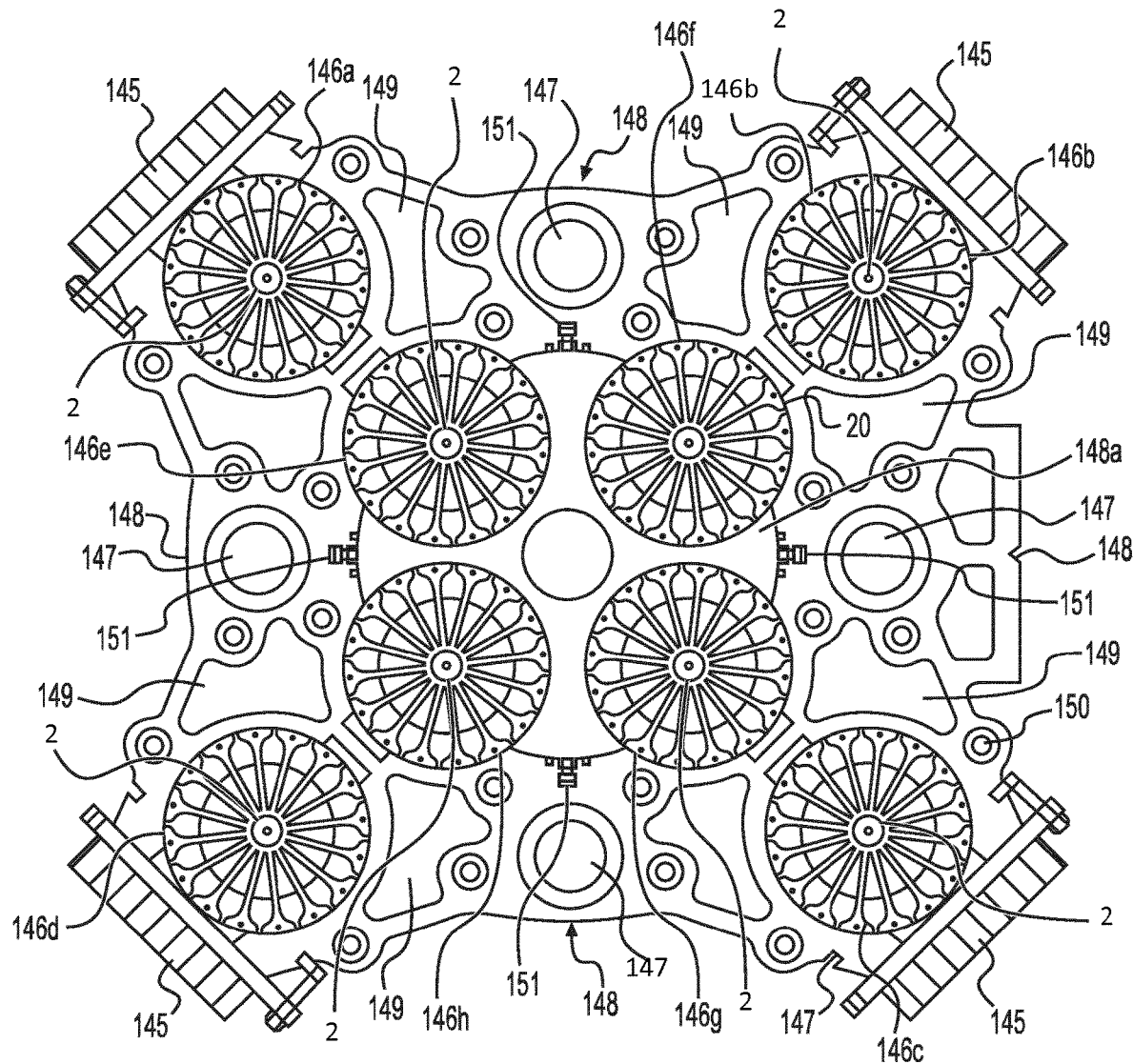
FIG. 38 is a diagram illustrating a cross-section of an exemplary stator containing uni-pole rotors without stator coils, consistent with embodiments of the present disclosure.

FIG. 38 is a diagram which depicts a cross-section of an exemplary stator 148 containing uni-pole rotors 2, consistent with embodiments of the present disclosure. The stator coils #1-#8 (not shown in FIG. 38) may be wound as follows: Coil #1 between rotor cavity 146*a* and 146*b*, coil #2 between rotor cavity 146*b* and 146*c*, coil #3 between rotor cavities 146*c* and 146*d*, coil #4 between rotor cavity 146*d* and 146*a*, coil #5 between rotor cavities 146*e* and 146*f*, coil 36 between rotor cavities 146*f* and 146*g*, coil #7 between rotor cavities 146*g* and 146*h*, coil #8 between rotor cavities 146*h* and 146*e*. With the rotors outside of the stator coil loops, there is no magnetic interaction between the rotor magnetic poles, and the stator magnetic poles, therefore, may greatly reduce or eliminate reverse torque or electromagnetic drag. As described above, the solid state rotor 2 rotates the magnetic poles but keeps the physical rotor body stationary. By use of geometric isolation of the rotor magnetic poles from the stator magnetic poles and the solid state rotor, reverse torque may be reduced. Therefore, the only energy required to power the generator may be the DC power required to excite the rotors. Stator 148 is supported by support posts attached to an end plate which are slip fit into the port holes 147. The center portion of the stator 148 is held in place by retention bolts 151. The stator is cooled through vent holes 149.

Figure 39:
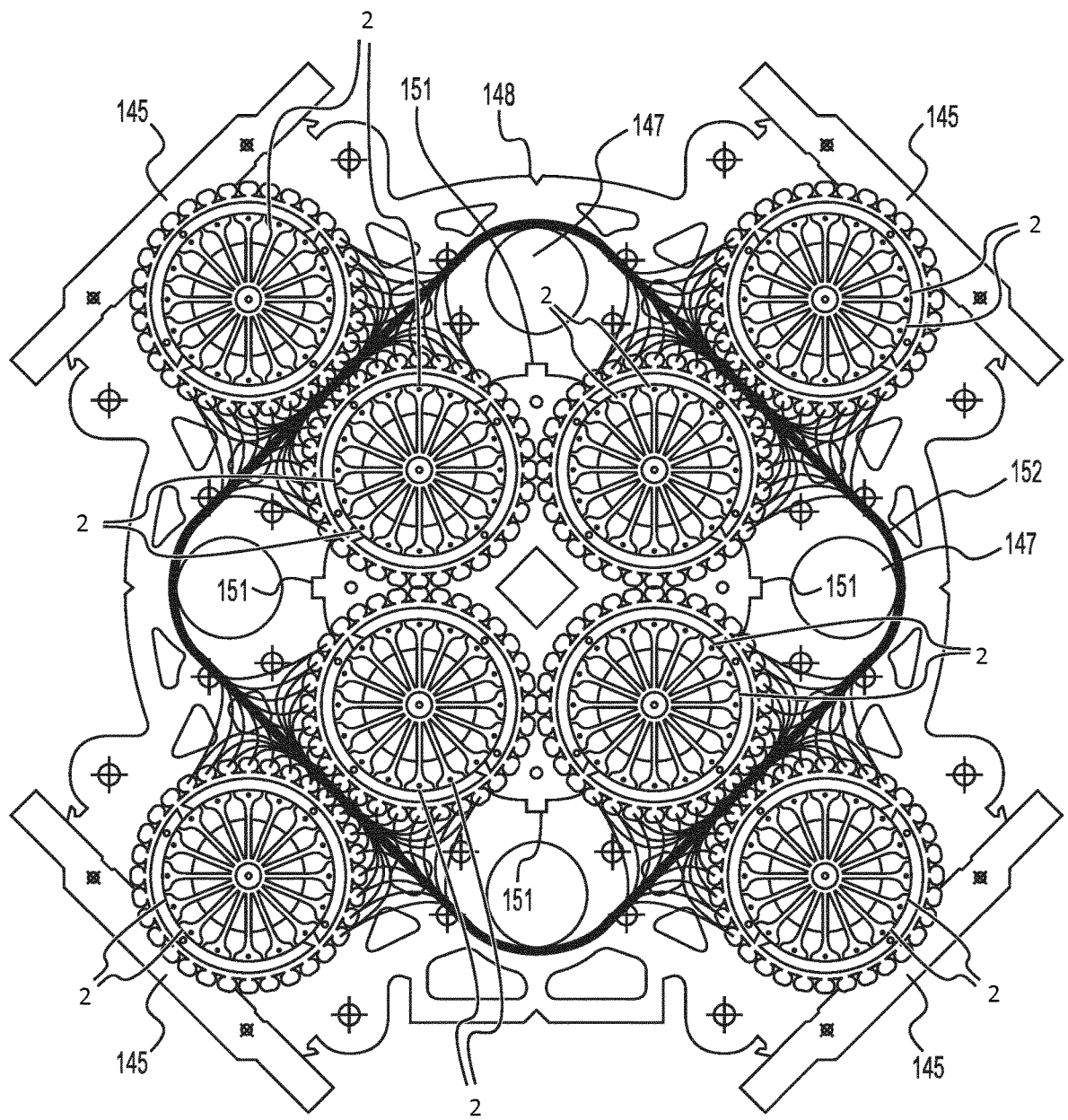
FIG. 39 is a diagram illustrating a cross-section of an exemplary stator containing uni-pole rotors with ⅓rd of stator coils in place, consistent with embodiments of the present disclosure.

FIG. 39 is a diagram which depicts a cross-section of an exemplary stator containing uni-pole rotors with ⅓rd of the stator coils shown, consistent with embodiments of the present disclosure. FIG. 39 is similar to FIG. 38, except that FIG. 39 reveals multiple wire slots rather than a single slot which accepts a flat conductor. FIG. 39 also illustrates winding 152 and ⅓rd of the slots with solid state rotor 2 in all of the cavities.

Figure 40:
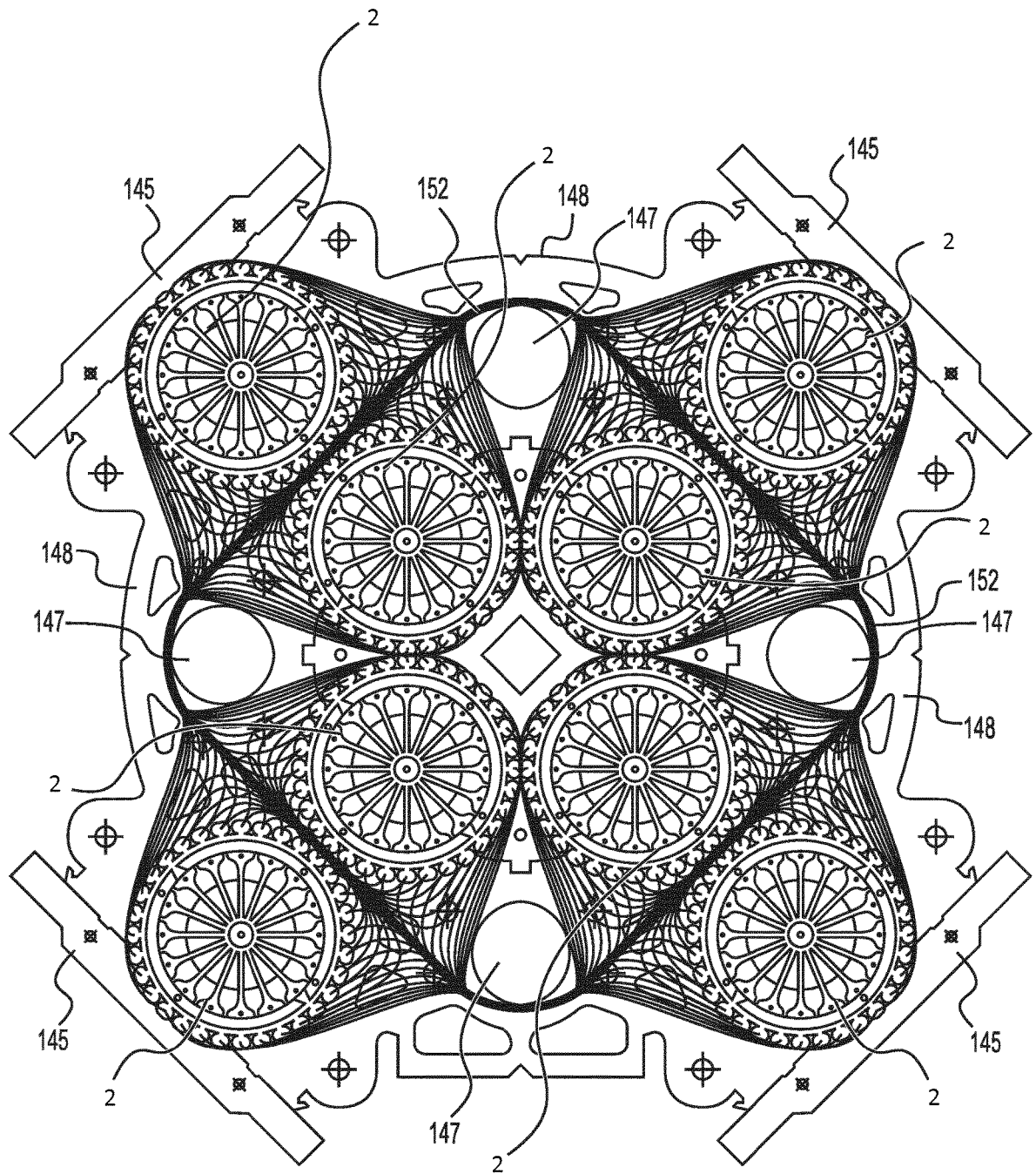
FIG. 40 is a diagram illustrating a cross-section of an exemplary stator containing uni-pole rotors with all of stator coils in place, consistent with embodiments of the present disclosure.

FIG. 40 is a diagram which depicts a cross-section of an exemplary stator containing uni-pole rotors with all of stator coils shown, consistent with embodiments of the present disclosure. FIG. 40 is similar to FIG. 39 except that all of the wire slots contain windings. Again, the rotor is stationed outside of the stator coil loops and utilizes the solid state rotors 2.

Figure 41:
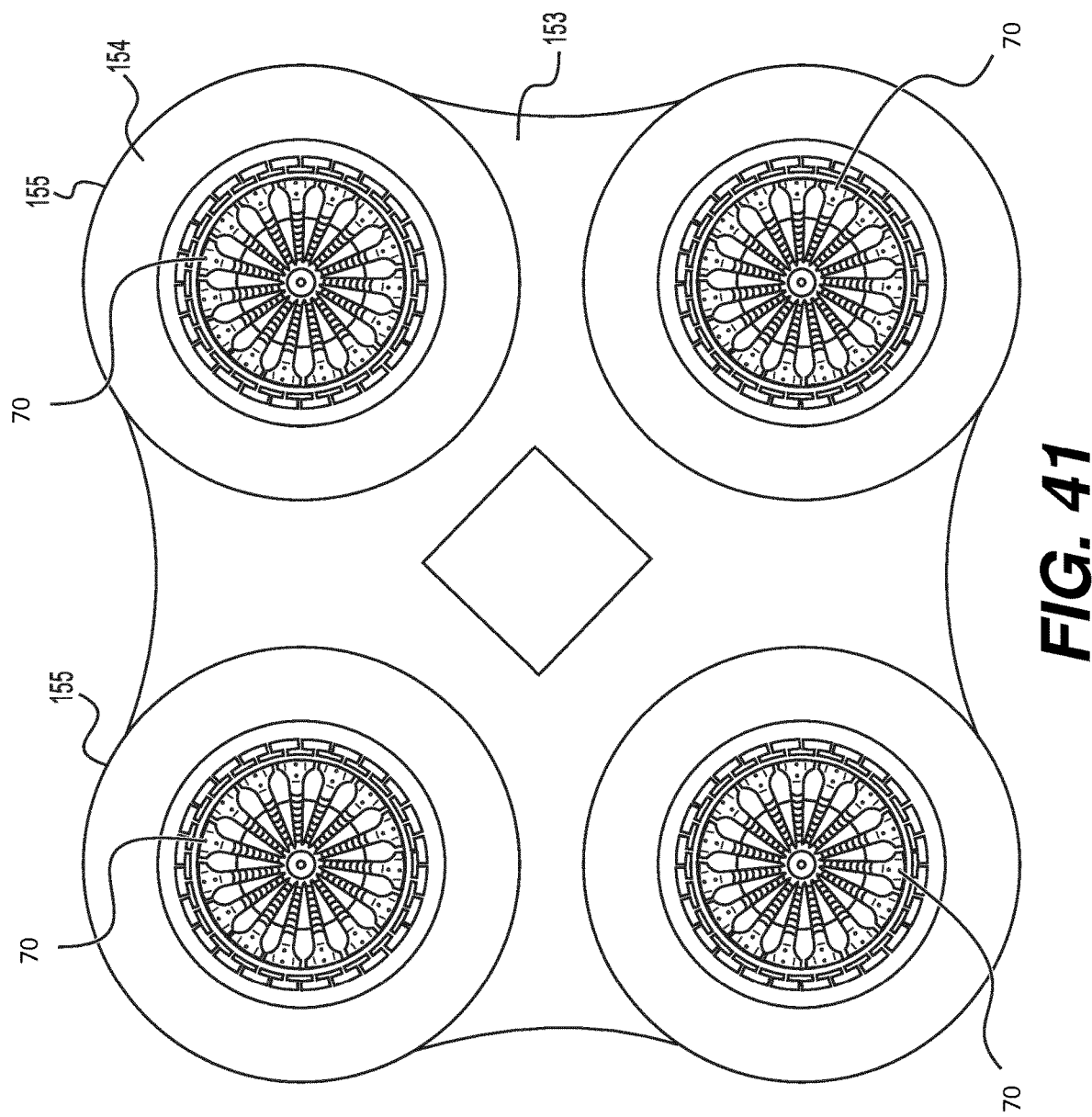
FIG. 41 is a diagram illustrating a cross-section of an exemplary stator containing rotors without stator coils being depicted, consistent with embodiments of the present disclosure.

FIG. 41 is a diagram which depicts a cross-section of an exemplary stator containing rotors without stator coils being depicted, consistent with embodiments of the present disclosure. FIG. 41 illustrates four stators 155 clustered in a housing 154 and wound in the same fashion as FIGS. 38-40. Solid state rotors 70 are inside the stator rotor cavities. Although only one rotor 70 is shown within each stator 155, it is contemplated that multiple rotors 70 may be used as in FIGS. 38-40. The stators 155 are supported by a support means 153.

Figure 42:
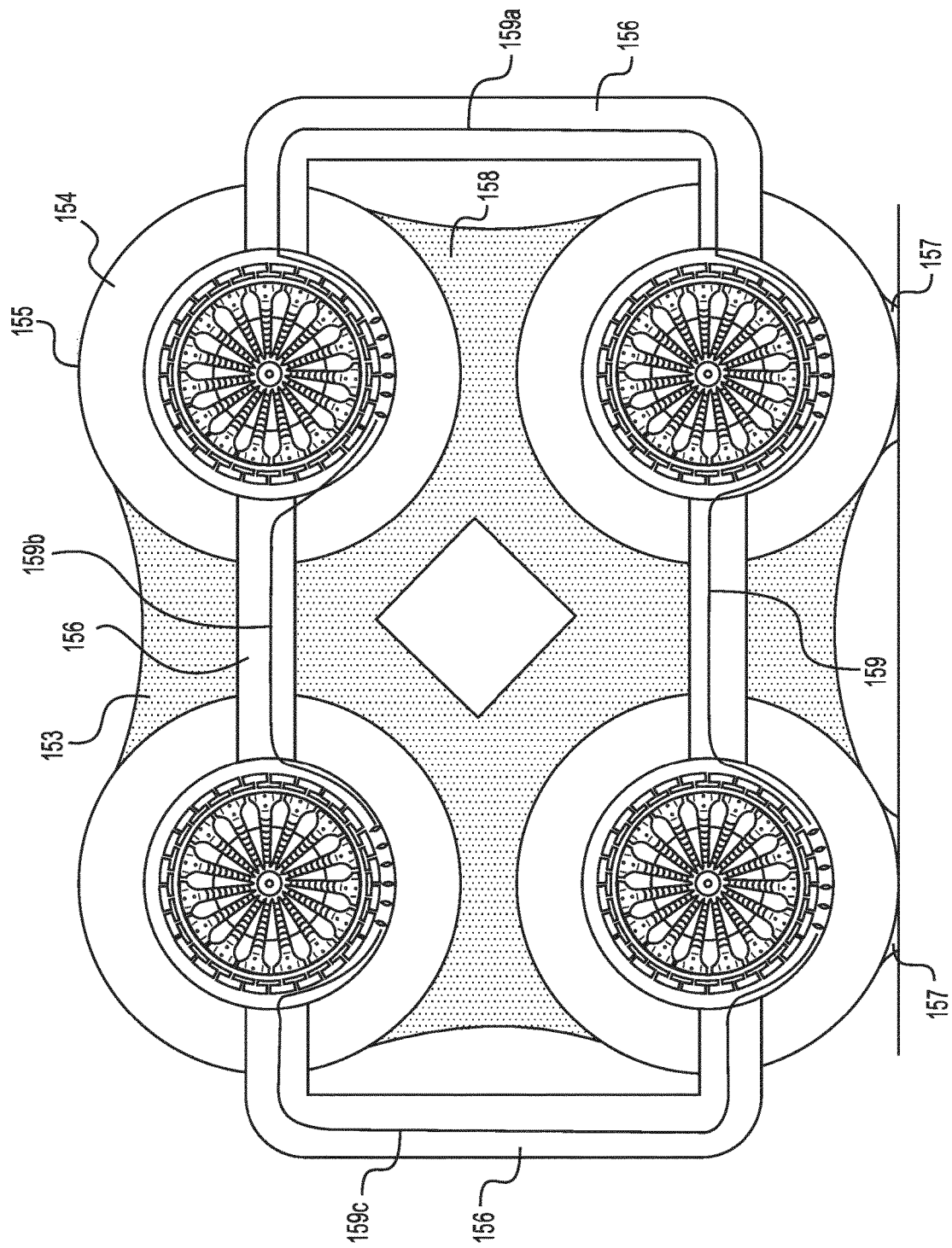
FIG. 42 is a diagram illustrating a cross-section of an exemplary stator containing rotors with a depiction of the routing of one of a three coils in the stator, consistent with embodiments of the present disclosure.

FIG. 42 is a diagram of a cross section of an exemplary stator containing rotors with a depiction of the routing of one of a three coils in the stator, consistent with embodiments of the present disclosure. FIG. 42 shows four stators 155 clustered in a housing 154, and each stator is connected with winding conduit 156. The conduit is installed on each end of the stator housing so that windings 159, 159a, 159b, and 159c can be installed.

Figure 43:
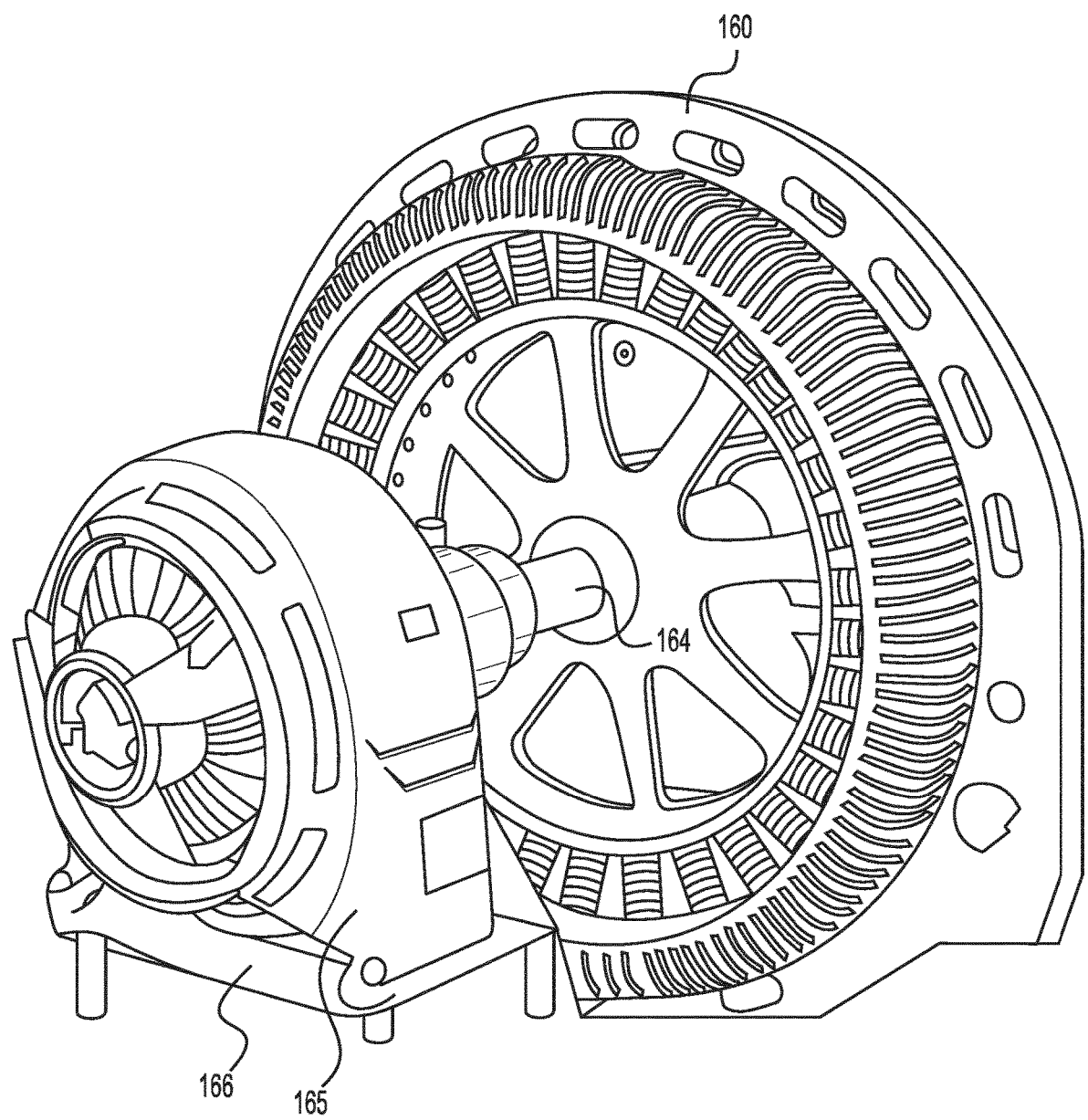
FIG. 43 is a diagram illustrating a conventional commercial generator which can be retrofitted with a rotor, consistent with embodiments of the present disclosure.

FIG. 43 is a diagram depicting a conventional generator which can be retrofitted with a rotor, consistent with embodiments of the present disclosure. The generator is shown with an exciter generator 165 which sits on base 166. Conventionally, rotor 163 is driven by shaft 164. The exciter generator 165, shaft 164, and rotor 163 can be replaced with a solid state rotor consistent with the present disclosure along with its rotor excitation system as disclosed herein.

Figure 44:
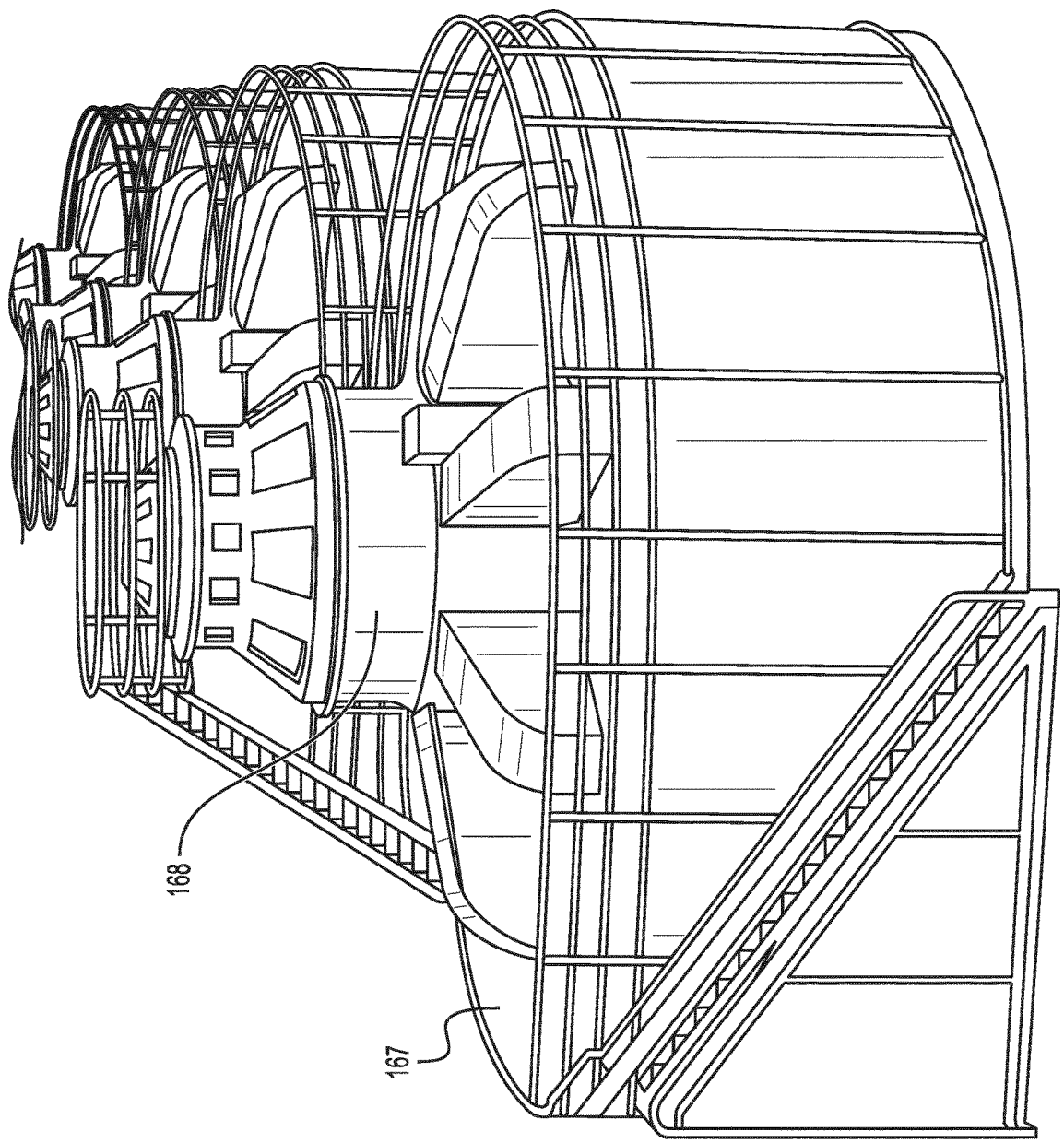
FIG. 44 is a diagram illustrating a conventional generator in use today which can be retro fitted with a rotor, consistent with embodiments of the present disclosure.

FIG. 44 is a diagram depicting another conventional generator which can be retrofitted with a rotor, consistent with embodiments of the present disclosure. Generator 167 is shown with exciter 168. The rotor and exciter may be removed and retrofitted with a solid state rotor and exciter system consistent with the present disclosure.

Figure 45:
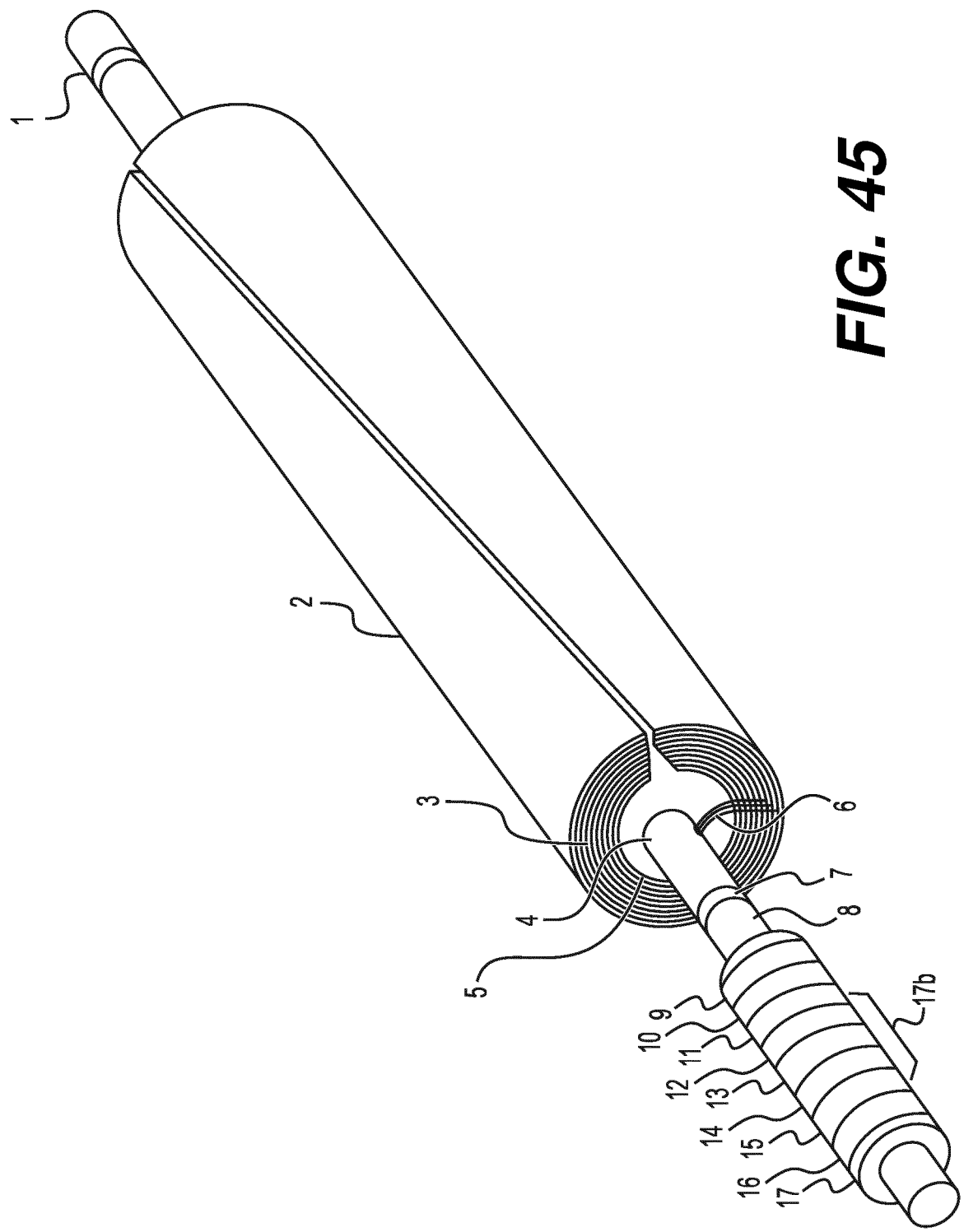
FIG. 45 is a diagram illustrating a lateral view of an exemplary rotor unit revealing skewed rotor slots, slip rings, bearing rest and windings, consistent with embodiments of the present disclosure.

FIG. 45 is a diagram illustrating a lateral view of an exemplary rotor unit showing skewed rotor slots, slip rings, bearing rest, and windings, consistent with embodiments of the present disclosure. The diagram illustrates a uni-pole rotor and slip ring assembly with rings capable of providing excitation of a positive and negative lead to four separate electromagnets and one eddy current ground (rings 9-17). The rotor body 2 may be made by laser cut discs of, for example, 0.34 mm annealed electrical steel. The discs are stacked on a jig in such a fashion that the wire slot on either side may be skewed from the slip ring end to the non-slip ring end of the rotor. The laminates are dipped in motor insulation varnish and baked, for example, 300° F. until cured. The rotor body 2 is depicted containing magnetic coils 3, which are made up internally and are electrically excited by slip rings through appropriate leads. Also illustrated are bearing rests 1 and 7 for shaft 8 and an eddy current discharge lead 6.

The rotor unit illustrated in FIG. 45 is pulsed north pole (first polarity) for 360° of rotor surface through two leads (+) and (−). The north pole excitation alternates, for example, 50 or 60 times per second with south pole (second polarity) for 360° of rotor surface. Alternating polarity excitation may be accomplished through the same two leads by utilization of a MOSFET excitation gating system.

Figure 48:
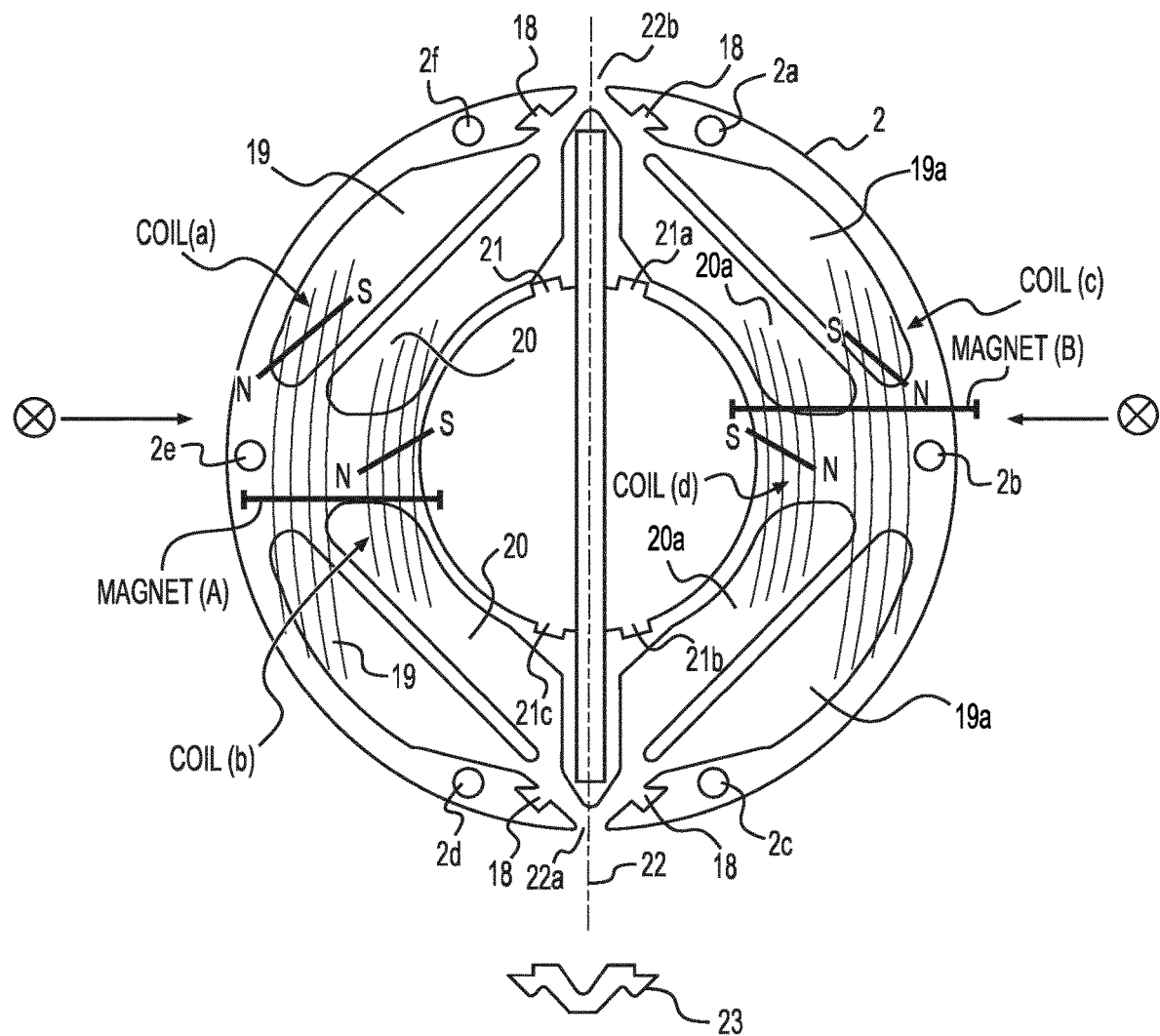
FIG. 48 is a diagram illustrating an internal polarity in an exemplary rotor laminate for an exemplary functional uni-pole rotor, either mechanical or solid state, north-pole uni-pole rotor, consistent with embodiments of the present disclosure.
Figure 49:
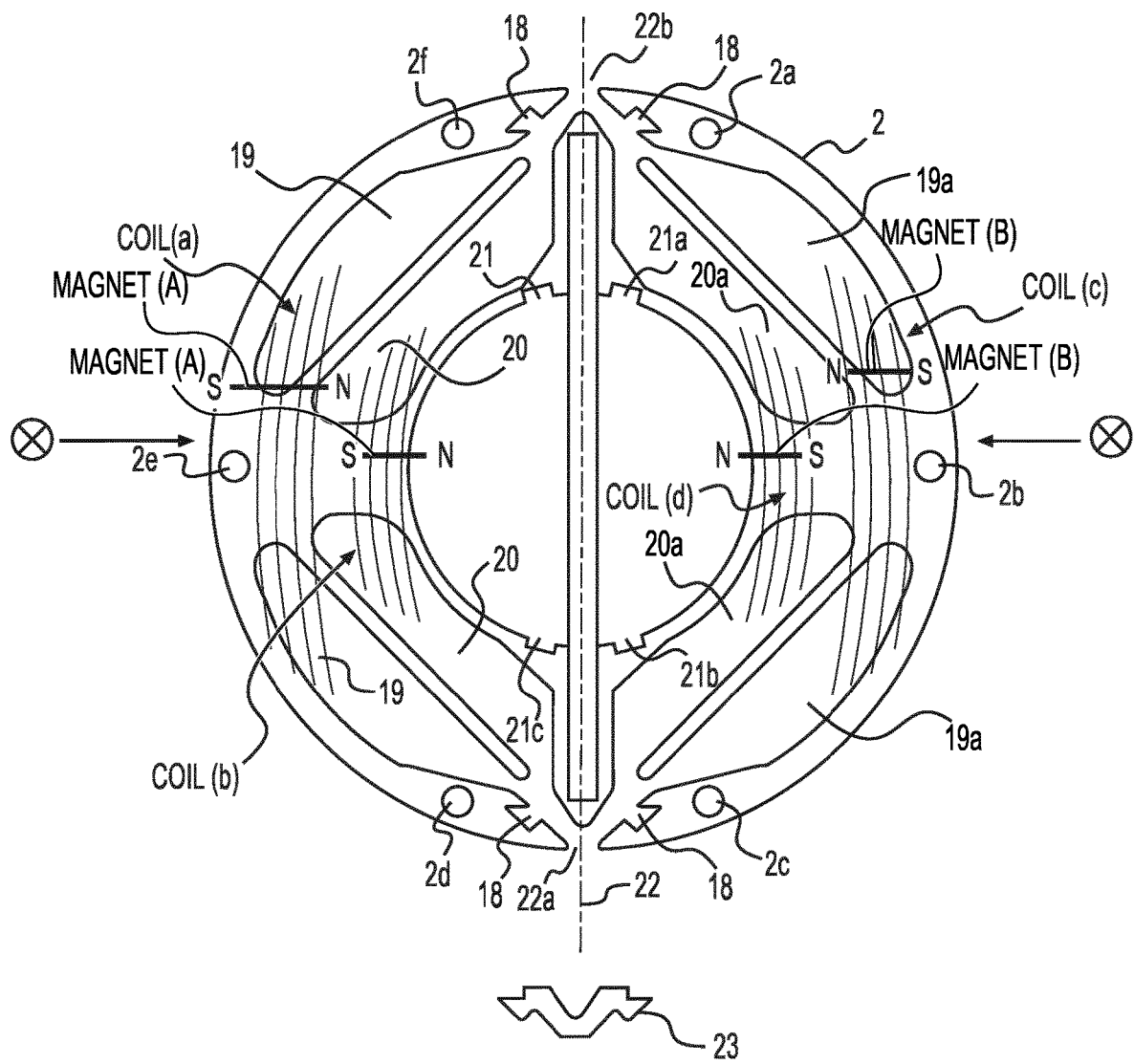
FIG. 49 is a diagram illustrating an internal polarity in an exemplary rotor laminate for an exemplary functional uni-pole rotor, either mechanical or solid state, south-pole uni-pole rotor, consistent with embodiments of the present disclosure.

The excitation for the second polarity (south pole) is as follows: Magnet (A), e.g., as illustrated in FIG. 48), has winding slots 19 and 20 (e.g., FIGS. 48-51) which are wound with appropriate magnet wire and connected such that an outer coil (a) may be activated in a clockwise fashion in a second polarity (south pole) when viewed from the outer surface of the rotor perpendicular to the coil. An inner coil (b) of magnet (A) may be wound and connected such that the inner coil may be activated in a clockwise fashion in a same second polarity (south pole) as outer coil (a) when viewed from the outer surface perpendicular to the coil of the rotor portion which makes up magnet (A). Magnet (B) (e.g., in FIG. 48) has winding slots 19a and 20a (e.g., FIGS. 48-51) which are wound with appropriate wire in a clockwise fashion and connected such that an outer coil (c) may be activated in a second polarity (south pole) viewed from the outer surface of the rotor perpendicular to the coil. An inner coil (d) of magnet (B) in FIG. 48 may be wound in a clockwise fashion and connected such that the inner coil (d) may be activated in the same second polarity (south pole) as the outer coil (a), inner coil (b) and outer coil (c) when viewed from the outer surface of the rotor and perpendicular to the coil of the rotor portion which makes up magnet (B).

Figure 46:
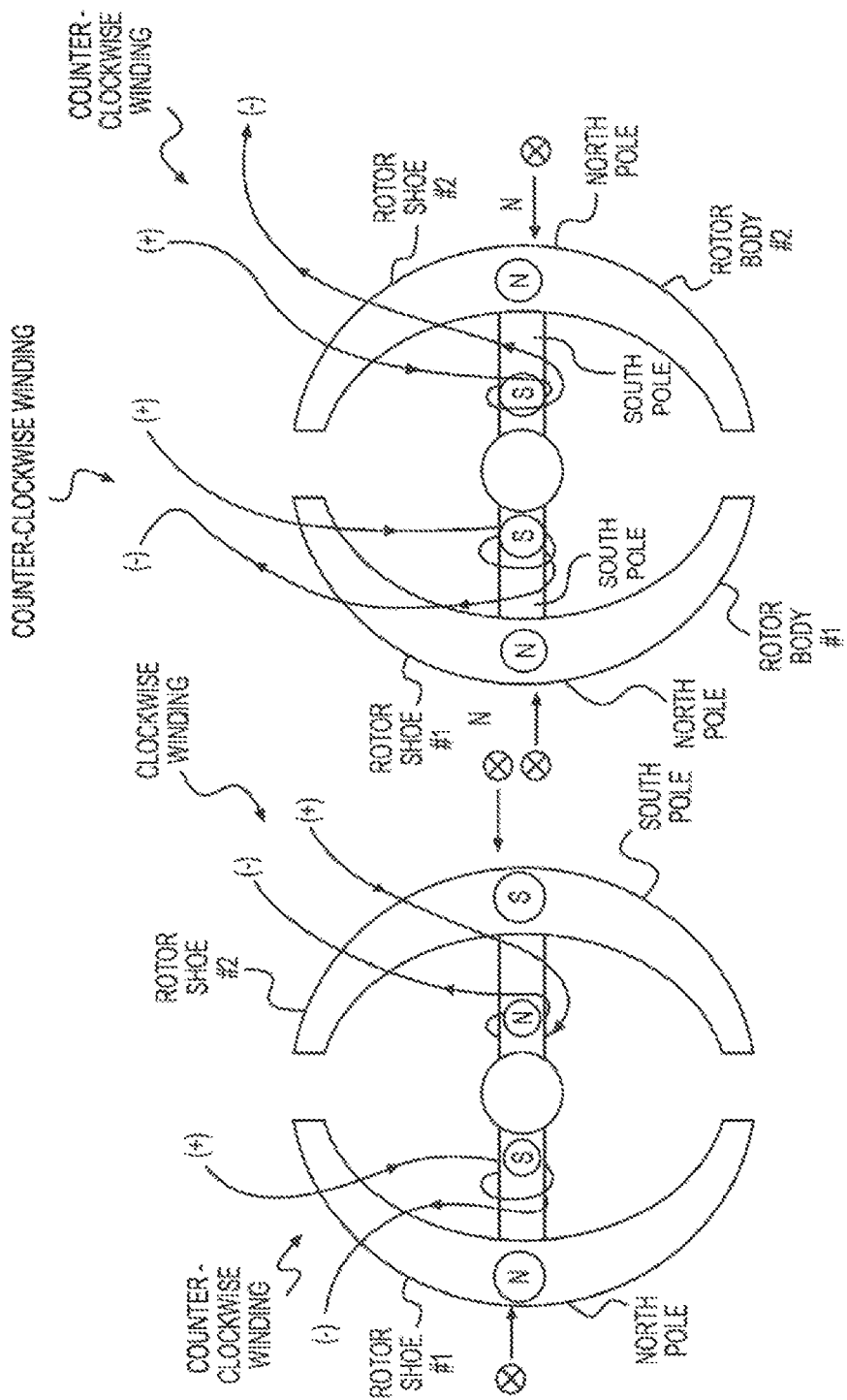
FIG. 46 is a diagram illustrating an effect of excitation polarity of 180° separation between exemplary magnetic poles on an exemplary external magnetic flux field which is emanated, consistent with embodiments of the present disclosure.

FIG. 46 shows an exemplary conventional dipole rotor when operated as a dipole and as a monopole rotor, where the structure of the rotor laminates and rotor windings are altered to operate as a functional uni-pole electromagnetic rotor. When a conventional bipolar rotor, illustrated on the left side in FIG. 46, is wired and excited such that both poles of the rotor are either north pole or south pole, i.e., north-north or south-south, the internal poles interact to cancel a large portion of the external flux. FIG. 46 shows an effect of excitation polarity of 180° separation between exemplary magnetic poles on an exemplary external magnetic flux field which may be emanated. In the example of FIG. 46, the external flux may drop from 4000 gauss for the dipole generated flux at the north and south poles on the left side of the drawing to 100 gauss for the uni-pole generated flux at the north poles on the right side of the drawing or a 40 fold deterioration of external flux density. The external flux from the mono-pole operation may be only, for example 2% of that of an operation as a dipole. In order to correct this issue, the uni-pole of the present disclosure is actually two complete dipole electromagnets, combined and separated by a mu metal steel flux return plate and contained in a single rotor as discussed immediately below.

Figure 47:
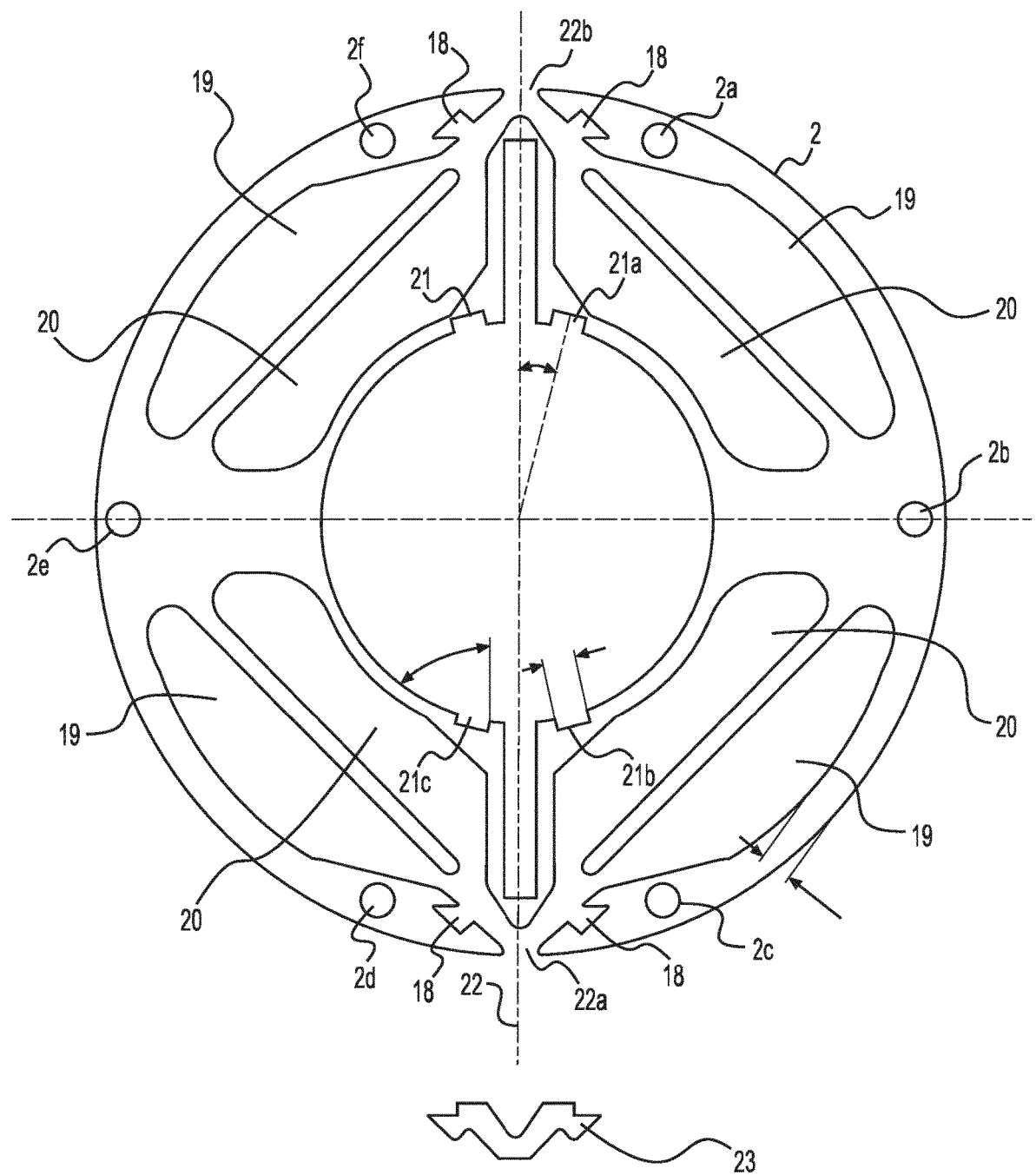
FIG. 47 is a diagram illustrating a cross-sectional view of an exemplary rotor laminate and an exemplary slot wedge of a uni-pole (or uni-polar) skewed slot rotor, consistent with embodiments of the present disclosure.

FIG. 47 is a diagram illustrating a cross-sectional view of an exemplary rotor laminate and an exemplary slot wedge of a uni-pole skewed slot rotor, consistent with embodiments of the present disclosure. FIG. 47 depicts a cross-section laminate of the rotor shown in FIG. 45. The rotor body 2 may be cut from, for example, 0.34 mm electrical steel. Winding slots 19 and 20 are wound with appropriate magnet wire and connected such that the outer coil is activated in a first polarity and the inner coil is activated in a second polarity so that a full north pole face can be generated for 360° of rotor surface, alternated with a full 360° of south pole rotor surface. The keyways 21, 21a, 21b, 21c are spiraled from the center laminate toward the slip ring end and toward the non-slip ring end as is the mu metal shield slot 22 in order to accommodate and form the spiral skew of the wire slots 22a and 22b. The slot wedgelocks 23 into slot 18 in order to help stabilize the rotor at operating speed. Keyways 21, 21a, 21b and 21c also align and stabilize the rotor at operating speed. Compression rod holes 2a, 2b, 2c, 2d, 2e and 2f contain compression rods, which also hold a retention ring to further stabilize the rotor during operation.

In order to operate an electromagnetic uni-pole rotor of the present disclosure, or to operate a first polarity electromagnet 180° separated from another first polarity electromagnet and/or operate a second polarity electromagnet 180° separated from a another second polarity electromagnet, structural winding and excitation changes may be different from that of a conventional electromagnetic rotor.

FIG. 48 is a diagram illustrating an internal polarity for building an exemplary functional uni-pole rotor, either mechanical or solid state, north-pole uni-pole rotor, consistent with embodiments of the present disclosure. FIG. 48 illustrates a dipole magnet (A) side with outer coil (a) and inner coil (b) excited. Outer coil (a) may be excited with north pole facing out toward an observer, and inner coil (b) may be excited with north pole facing out toward the observer as well, with (a) wound in an outer rotor slot and (b) wound in an inner rotor slot. Simultaneously, magnet (B) side of the uni-pole may be excited with outer coil (c) and inner coil (d). Outer coil (c) may be excited with north pole facing outward toward the observer and (d) may be excited north pole facing outward toward the observer as well. Isolation of magnet (A) side from magnet (B) side by a mu metal steel laminate flux return plate and/or ring allows full north pole flux or, for example 6000 gauss for the full 360° of rotor surface and allows alternation with south pole flux for 360° of rotor surface by alternation of (+) and (−) excitation of the leads via a MOSFET gating system, for example.

Figure 50:
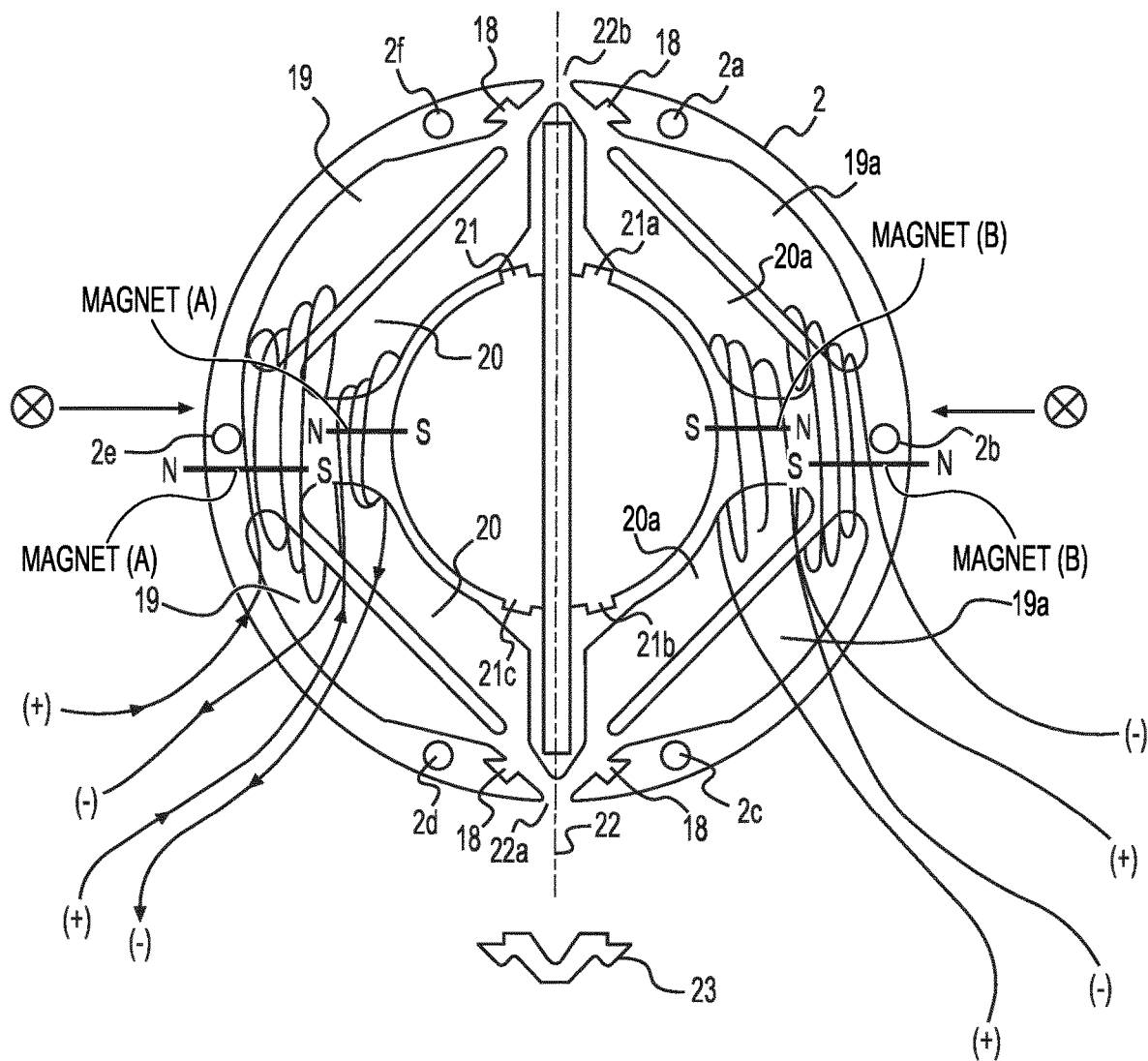
FIG. 50 is a diagram illustrating exemplary internal windings and an magnetic polarity for an exemplary functioning uni-pole rotor, either a functioning mechanical or solid state uni-pole north-pole, consistent with embodiments of the present disclosure.
Figure 51:
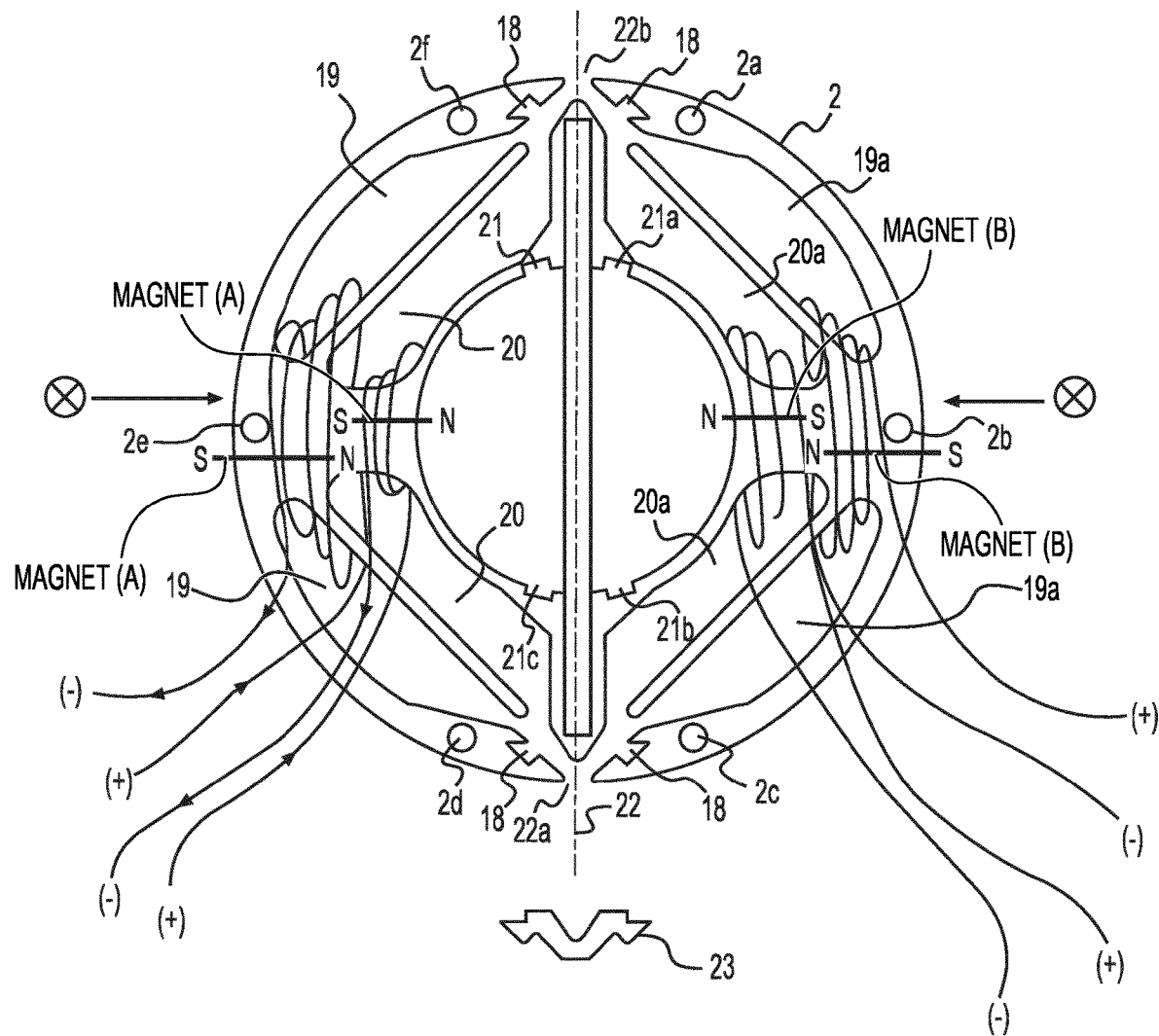
FIG. 51 is a diagram illustrating an exemplary internal winding and an magnetic polarity for an exemplary functioning uni-pole rotor, either a functioning mechanical or solid state uni-pole south-pole, consistent with embodiments of the present disclosure.

The winding slots 19 and 20 of magnet (A) in FIG. 48 may be wound as illustrated in FIGS. 50-51) with appropriate magnet wire and connected such that the outer coil (a) is activated in a counterclockwise fashion in a first polarity viewed from the outer surface of the rotor and perpendicular to the coil. The inner coil (b) of magnet (A) may be wound and connected such that the inner coil may be activated in a counterclockwise fashion in a same first polarity as outer coil (a) when viewed from the outer surface of the rotor perpendicular to the coil which makes up magnet (A). Magnet (B)'s winding slots 19a and 20a illustrated in FIGS. 50-51 may be wound with appropriate magnet wire in a counterclockwise fashion and connected such that the outer coil (c) may be activated in a first polarity when viewed from the outer surface of the rotor and perpendicular to the coil. The inner coil (d) of magnet (B) (e.g., in FIG. 48) may be wound (e.g., as shown in FIGS. 50-51) in a counterclockwise fashion and connected such that the inner coil (d) may be activated in a same first polarity as outer coil (a), inner coil (b), and outer coil (c) when viewed from the outer surface of the rotor and perpendicular to the coil of the rotor portion which makes up magnet (B).

Figure 52:
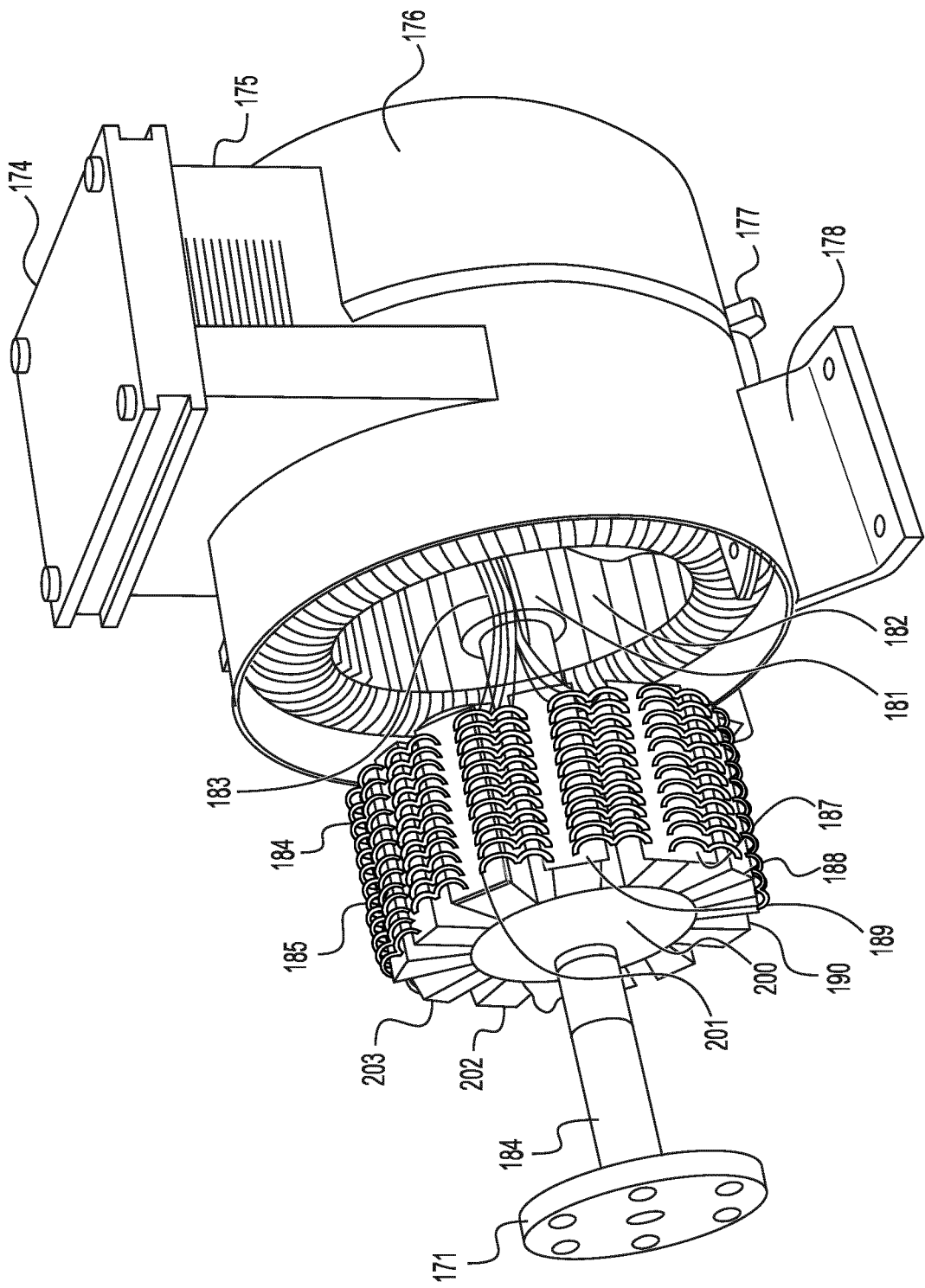
FIG. 52 is a diagram illustrating an exemplary conventional 3-phase stator with a solid state rotor poised to be slip fit inside, consistent with embodiments of the present disclosure.

FIG. 52 is a diagram illustrating an exemplary conventional 3-phase stator with a solid state rotor 181 poised to be slip fit inside, consistent with embodiments of the present disclosure. The support rotor end piece 171 attaches to shaft 184. Magnetic fields are illustrated sequentially evolving from the salient poles. Flux fields 187, 189, and 201 are shown to be moving clockwise. Pole excitation leads 183 are also illustrated.

Figure 53:
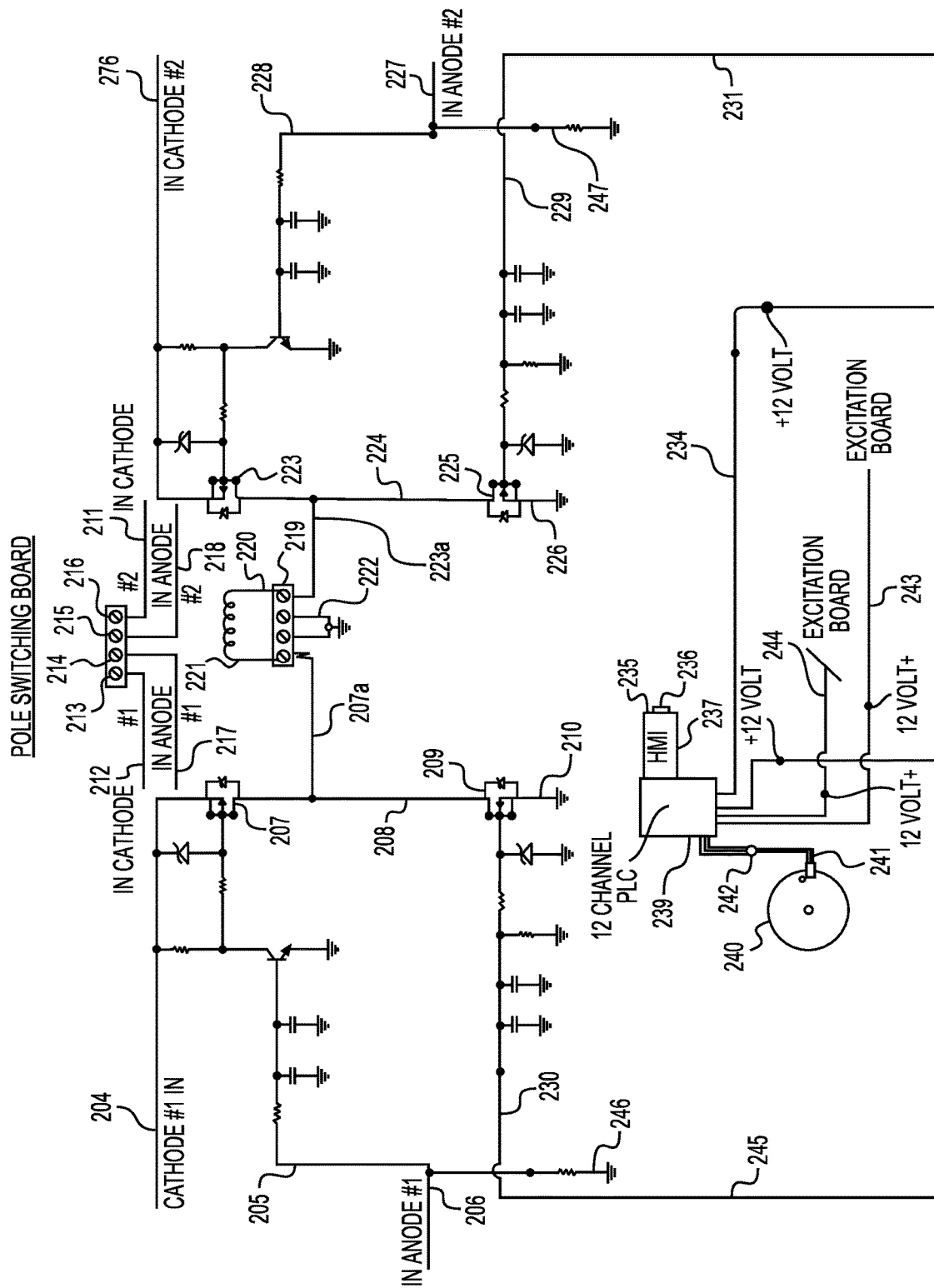
FIG. 53 is an exemplary circuit diagram showing a programmable logic center (PLC) circuit and pole switching circuits, consistent with embodiments of the present disclosure.
Figure 54:
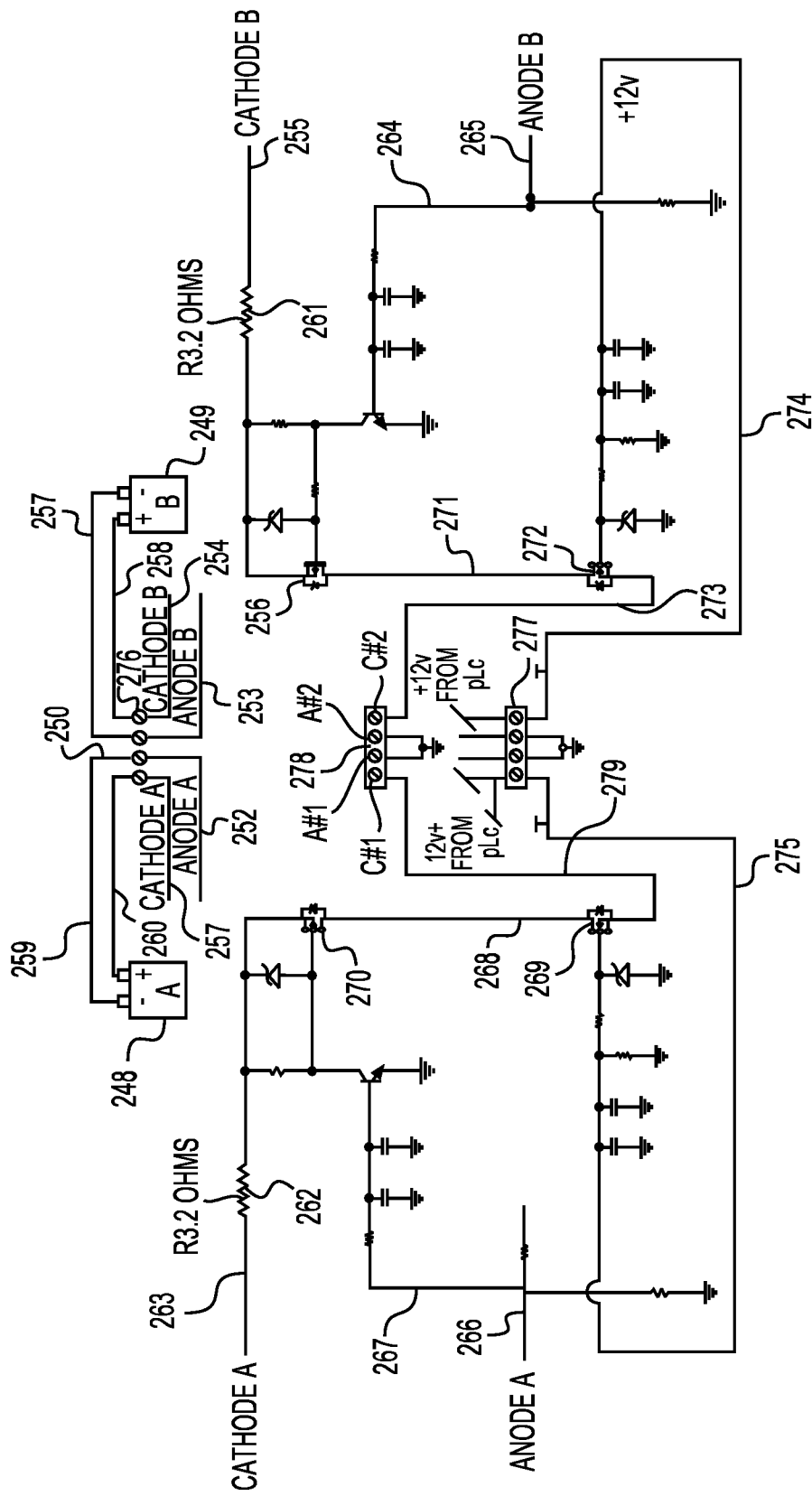
FIG. 54 is an exemplary circuit diagram showing circuits used in a rotor excitation system and an interaction with a PLC and pole switching circuits, consistent with embodiments of the present disclosure.

FIG. 53 is a depiction of an exemplary circuit diagram of PLC circuit and pole switching circuits, consistent with embodiments of the present disclosure. FIG. 54 is a depiction of an exemplary circuit diagram revealing circuits of a rotor excitation system and an interaction with PLC and pole switching circuits, consistent with embodiments of the present disclosure. These two figures will be explained together.

The programmable electronic logic gating system of the present disclosure allows sequencing of the alternating salient magnetic poles of the system. The system is diagrammatically presented in FIGS. 53 and 54. Upon receiving a signal from a frequency generator, such as a sensor wheel 240 or a solid-state frequency generator, the circuit in FIG. 53 generates a DC rotor excitation pulse. The circuit in FIG. 54 receives the pulse generated in the circuit in FIG. 53 for gating the north-south salient poles of the rotor. In the case of a 4-pole, 60 Hz generator, the cycle is 16.667 milliseconds or one 180° rotation with a half cycle 8.333 milliseconds north and 8.333 milliseconds south. In the case of the rotating sensor wheel, 90° equates to 8.333 milliseconds, 180° equates to 16.667 milliseconds and 67.5° equates to 6.250 milliseconds.

The exemplary MOSFET PLC system allows sequencing of the alternating salient magnetic poles of the embodiments of the present disclosure. The sequencing for each pole is described herein. The excitation cycle for each salient pole through a complete north/south cycle is controlled by two channels of the PLC. The sensor wheel 240 in FIG. 53 rotates at 1800 rpm in the case of a 3-phase four pole 60 Hz generator. The sensor wheel may be replaced by a frequency generator set at 1800 signals per minute or other appropriate speeds. The sensor wheel opening passes through the sensor 241 and a signal is generated when the system is turned on by the on/off switch 236 of a HMI (Human Machine Interface). The DC pulsed signal is sent to the first and second channels of PLC 239 through conduit 242. PLC CH1 controls the signal to the excitation board through conduits 244 and 243. PLC CH2 controls the signal to the pole switching board through conduits 231 and 245.

The excitation is transmitted to the excitation board and enters the circuit through contact block 277 (FIG. 54). The signals control MOSFET gates 272 and 269. The MOSFET gates 272 and 269 have 12+ volts, for example, of DC power current on them constantly to maintain the gates closed. The default position for these gates is open. The PLC CH1 and CH2 turn the DC current off of the MOSFET for 135° and 180°, for example, of rotation respectively at 1800 rpm of signal speed and allows the gate to open for 135° of rotation in the case of CH1 and 180° of rotation in CH2 which allows current to be routed in the case of CH1 through conduits 279 and 273 to contact block 278. Contact block 278 has four contact points referred to here as contacts C #1, C #2, A #1 and A #2. Jumper connections connect contact C #1 block 278 to contact 213 on the pole switching board. Jumper connections connect contact A #1 block 278 to contact 214 on pole switching board. Jumper connections connect contact A #2 block 278 to contact 215 on pole switching board. Jumper connections connect contact C #2 block 278 to contact 216 on pole switching board. These circuits provide a timed alternating pulse of DC, current (for example, 20 volts and 6 amps) to the two sides of pole switching board. PLC channel #2 sends signal to MOSFET gates 209 and 225 on pole switching board to open for 180° through conduit 245 to the first side and 231 to the second side.

The DC power to operate the excitation circuit is provided by, for example, two 24 volt 525 amp DC lead acid batteries (but not limited to lead acid batteries). Battery 248 (battery A) is connected to contact block 250 through conductor 259 to side A anode and through 260 to side A cathode. Battery 249 (battery B) is connected to the contact block 250 through conductor 257 to side B anode and through conduit 258 to side B cathode. The pulsed current to the rotors consists of 20 volts and 6.25 amps DC. The current flow is controlled by 3.2 ohm resisters (261, 262) in conduit 255 and 263. First polarity current (north pole) is generated as follows: MOSFET gates 209, 225, 272 and 269 are closed by 12 volt current (default position is open) when sensor wheel 240 sends a signal to PLC channel 1 (CH1), channel 1 in turn sends a signal to discontinue the 12 volt current to MOSFET 269 on the excitation board for 135° of rotation. Channel 2 (CH2) simultaneously receives the signal and opens MOSFET 225 for 180° of rotation. When these two gates are open, 20 volts and 6.2 amps of DC current flows from battery A into cathode A (IN) through resistor 262 (3.2 ohms). When the power is on to cathode A and anode A, MOSFET 270 opens and allows current to flow through the MOSFET 270, conduit 268, MOSFET 269, conduit 279 into cathode #1 post on contact block 278. A juniper carries current from cathode post #1 on contact block 278 (FIG. 54) to contact block post 213 (FIG. 53). The current then flows into "cathode #1 (in)" through conduit 204 with "anode #1 (in)" connected through conduit 206 on pole switching board (FIG. 53). The current flows through open MOSFET 207 on through conduit 207a to rotor contact block 219 through lead 221 to north pole wound coil and out through lead 220 and through conduit 224 then through open MOSFET 225 through conduit 226 to earth ground.

This circuit for 135° of rotation delivers a first polarity current to the rotor pole (north pole). At the end of the first 180° MOSFET 269 and MOSFET 225 closes. The second circuits of PLC channel 1. (CM) and channel 2 (CH2) are operative at the end of the first 180° of rotation. Channel 1 turns off the 12 volt current to 272 on the excitation board for 135° of rotation. Channel 2 of the PLC opens MOSFET 209 for 180° of rotation. DC current (20 volts, 6.2 amps) flows from battery B into "cathode B (in)" through resistor 261 (3.2 ohms). When power is on to cathode B and anode B, MOSFET 256 opens and allows current to flow through MOSFET 256, conduit 271 into MOSFET 272 on through conduit 273 into cathode C #2 post on contact block 278. A jumper carries current from cathode post C #2 on contact block 278 (FIG. 54) to contact block post 216 (FIG. 53). The current then flows into "(cathode C #2 in)" through conduit 276 with anode #2 in connected through 227 on pole switching board FIG. 53. Current flows through open MOSFET 223 on through conduit 223a to rotor contact block 219 through lead 220 to south pole wound coil out through lead 221 and through conduit 207a and 208 then out through open MOSFET 209 through conduit 210 to earth ground. After 135° of rotation, the second 180° rotation MOSFET 272 closes and after 180° of rotation MOSFET 209 closes and the cycle begins all over again.

This same sequence of events is repeated for two times over a complete cycle of 16.66 milliseconds. Accordingly, salient pole #1 in each group is excited as just described above. Salient pole #1 is excited in a first polarity and 2.084 milliseconds later salient pole #2 is excited in a first polarity, 2.084 milliseconds later salient pole #3 is excited in a first polarity and 2.084 milliseconds later salient pole #4 is excited in a first polarity and 2.084 milliseconds later salient pole #1 is again excited however this alternate excitation is in a second polarity. 2.084 milliseconds later salient pole #2 is excited in a second polarity, 2.084 milliseconds later salient pole #3 is excited in a second polarity and 2.084 milliseconds later salient pole #4 is excited in a second polarity and 2.084 milliseconds later salient pole #1 is again excited in a first polarity. Adjoining pole groups to the segment just discussed will have the excitation sequence carried out in an opposite polarity.

Figure 55:
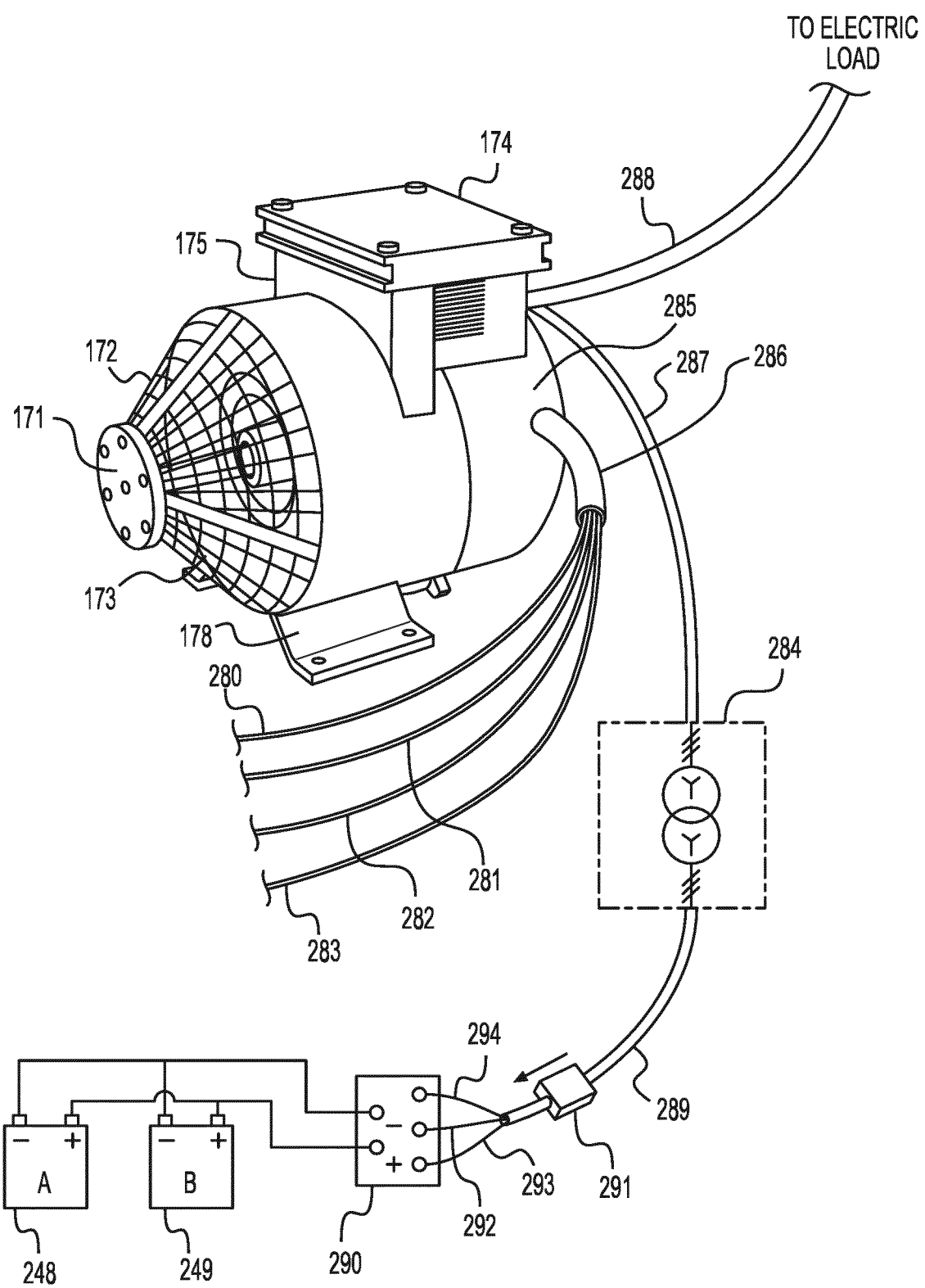
FIG. 55 is an exemplary solid state generator connected to rotor excitation circuits along with a power cable to an electrical load and regenerative circuits to a battery rectifier interface, consistent with embodiments of the present disclosure.

FIG. 55 is a depiction of a solid state three-phase generator 285 revealing input connections from the rotor circuits 280, 281, 282, 283 from rotor excitation circuits along with a power cable 288 to au electrical load and regenerative circuits to a battery rectifier interface, consistent with embodiments of the present disclosure. The input circuits may enter the unit through conduit 286. The solid state rotor 173 is visible and is protected by a safety cage 172 which may be attached to end plate 171 and back to the body of the stator. Cable 288 may be made up in junction box 175. Cable 288 may carry a 3-phase power to an electrical load. The regenerative power to the batteries may exit the junction box 175 through conduit 287. 480 volts and 25 amps power may be put through a 3-phase step-down transformer 284 to drop the voltage to, for example 24 volts and 500 amps. The 3-phase power may go through a conduit 289 traversing a single direction diode 291 and through a 3-phase bridge rectifier to convert to DC power to charge battery A 248 and battery B 249. Power storage devices and mechanisms other than batteries may be used, for example, an electric power grid or other types of energy storage. At least a portion of the stored power may be used to re-excite the rotor.

The invention claimed is:

1. An assembly for providing power generation, comprising:
   an electric power generator stator having a stator housing;
   an electromagnetic rotor placed into and attached to the stator housing, wherein the electromagnetic rotor remains stationary and generates a rotating magnetic field sequentially excited using an electric excitation system, wherein a portion of output power from the assembly is fed back to the electric excitation system;
   the electromagnetic rotor including a plurality of salient pole pieces arranged around a supporting shaft, wherein a first end of each salient pole piece is attached to the supporting shaft and a second end of each salient pole piece points outward away from the supporting shaft;
   wires wound around each salient pole piece, wherein when the wires of the plurality of salient pole pieces are sequentially excited by the electric excitation system, the salient pole pieces are energized to provide a moving polarmagnetic field in the form of distinct magnetic poles as desired to accomplish power generation; and
   at least one processor configured to:
     control a power generator having the electromagnetic rotor;
     determine an excitation cycle based on a target frequency of the power generator; and
     switch an electric circuit connected to the wires to excite the wires to energize the plurality of salient pole pieces sequentially according to the excitation cycle such that each salient pole piece is energized in a first polarity in a first half of the excitation cycle and energized in a second polarity in a second half of the excitation cycle.

2. The assembly of claim 1, wherein the plurality of salient pole pieces are divided into N groups, and the salient pole pieces within each group are configured to be sequentially excited each for a predetermined amount of time.

3. The assembly of claim 2, wherein the salient pole pieces within each group are excited, after a delay relative to a previous salient pole piece and for the predetermined amount of time.

4. The assembly of claim 2, wherein the electric excitation system is configured to excite the salient poles within each group sequentially such that discrete alternating magnetic poles rotate parallel to a surface of the electromagnetic rotor at a predetermined speed and frequency.

5. The assembly of claim 2, wherein switching the electric circuit further includes exciting the salient pole pieces within each group sequentially each for a predetermined amount of time.

6. The assembly of claim 1, wherein the wires wound around each salient pole piece include an inner wire closer to the supporting shaft and an outer wire farther away from the supporting shaft, wherein the inner wire and the outer wire are excited so that the salient pole piece forms a dipole magnet.

7. The assembly of claim 1, and further including: a stator, wherein the electromagnetic rotor is placed inside the stator; and power leads configured to provide at least a portion of output power to a storage device where a portion of stored power is utilized to re-excite the electromagnetic rotor.

8. The assembly of claim 7 wherein the power storage device includes a battery or a storage capacitor.

9. The assembly of claim 1, wherein the electric excitation system includes a computer-controlled electronic gating system.

10. The assembly of claim 1, further comprising receiving a signal from a frequency generator and determining a target frequency of the power generator based on the signal.

11. A power generator comprising:
a stator having a cavity and stator wires configured to provide output power;
a static rotor inserted in the cavity and outside the stator wires, wherein during operation, the static rotor remains stationary within the cavity of the stator of the power generator and generates a rotating magnetic field sequentially excited by an electric excitation system, wherein the static rotor includes:
a supporting shaft;
a plurality of salient pole pieces circularly arranged around the supporting shaft, wherein a first end of each salient pole piece is attached to the supporting shaft and a second end of each salient pole piece is toward an inner circumference of the cavity; and
wires wound around each salient pole piece, wherein when the wires of the plurality of salient pole pieces are sequentially excited by the electric excitation circuit, the salient pole pieces are energized to provide a moving magnetic field comprised of distinct poles; and
a controller for controlling a power generator having the static rotor, the controller comprising:
connection terminals coupled to an electric circuit connected to the wires through terminal blocks;
a processor configured to:
determine an excitation cycle based on a target frequency of the power generator; and
switch the electric circuit to excite the wires to energize the plurality of salient pole pieces sequentially according to the excitation cycle such that each salient pole piece is energized in a first polarity in a first half of the excitation cycle and energized in a second polarity in a second half of the excitation cycle.

12. The power generator of claim 11, wherein the stator further includes wire slots in the cavity, wherein the stator wires are wound in the wire slots such that current flow in a first portion of the stator wires is in a first direction in all wire slots and current flow in a second portion of the stator wires is in a second direction opposite to the first direction in all wire slots.

13. The power generator of claim 11, wherein the plurality of salient pole pieces are divided into N groups, wherein each group of salient pole pieces is excited in a different polarity at any given time.

14. The power generator of claim 11, wherein the static rotor is a uni-pole rotor and the plurality of salient pole pieces are excited in a single polarity at any given time.

15. The power generator of claim 11, wherein the processor is further configured to receive a signal from a frequency generator and determine a target frequency of the power generator based on the signal.

16. The power generator of claim 11, wherein the electric circuit includes a plurality of switching elements, wherein the processor is configured to sequentially switch on and off the plurality of switching elements within the excitation cycle.

17. A computer-controlled excitation system, comprising:
an electric circuit connected to wires of a static rotor in a power generator, wherein during operation, the static rotor remains stationary within a cavity of the stator of the power generator and generates a rotating magnetic field sequentially excited by an electric excitation system, wherein the static rotor includes a plurality of salient pole pieces wound with the wires, the electronic circuit comprising:
the computer-controlled excitation system having at least two controlled channels;
a plurality of pole switching circuits coupled to at least two control channels,
wherein the pole switching circuits are connected to the wires of the plurality of salient pole pieces, wherein each pole switching circuit includes a plurality of switching elements switched on and off by at least two control channels to excite the wires to energize the plurality of salient pole pieces sequentially; and
a non-transitory computer readable medium having instructions stored thereon, wherein the instructions, when executed by a processor performs a method for controlling the power generator, the method comprising:
determining an excitation cycle based on a target frequency of the power generator; and
switching an electric circuit connected to the wires to excite the wires to energize the plurality of salient pole pieces sequentially according to the excitation cycle such that each salient pole piece is energized in a first polarity in a first half of the excitation cycle and energized in a second polarity in a second half of the excitation cycle.

18. The computer-controlled excitation system of claim 17, wherein the plurality of switching elements are switched according to an excitation cycle such that each salient pole piece is energized in a first polarity in a first half of the excitation cycle and energized in a second polarity in a second half of the excitation cycle.

19. The computer-controlled excitation system of claim 17, wherein the plurality of switching elements are switched on and off to provide pulsed current to excite the wires.

20. The computer-controlled excitation system of claim 17, wherein the computer-controlled excitation system is a programmable logic center (PLC) circuit.

* * * * *